United States Patent
Conrad

(10) Patent No.: US 10,925,451 B2
(45) Date of Patent: *Feb. 23, 2021

(54) SURFACE CLEANING APPARATUS, CYCLONIC AIR TREATMENT MEMBER AND SURFACE CLEANING APPARATUS INCLUDING THE SAME

(71) Applicant: Omachron Intellectual Property Inc., Hampotn (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,272

(22) Filed: Jun. 20, 2019

(65) Prior Publication Data

US 2020/0229663 A1 Jul. 23, 2020

Related U.S. Application Data

(63) Continuation-in-part of application No. 16/254,918, filed on Jan. 23, 2019.

(51) Int. Cl.
*B01D 50/00* (2006.01)
*A47L 9/16* (2006.01)
(Continued)

(52) U.S. Cl.
CPC .......... *A47L 9/1608* (2013.01); *A47L 9/1625* (2013.01); *A47L 9/1666* (2013.01); *A47L 9/1683* (2013.01); *A47L 9/32* (2013.01); *A47L 9/122* (2013.01); *A47L 9/165* (2013.01); *A47L 9/1675* (2013.01); *A47L 9/20* (2013.01); *A47L 9/325* (2013.01);
(Continued)

(58) Field of Classification Search
CPC ............ B01D 46/0068; B01D 46/2411; B01D 46/0075; B01D 46/002; B01D 46/0065; B04C 5/081; B04C 5/04; B04C 5/103; B04C 9/00; B04C 5/185; B04C 2009/004; A47L 9/1608; A47L 9/165; A47L 9/1683; A47L 9/122; A47L 5/28; A47L 9/1675; A47L 9/106; A47L 9/325; A47L 9/20; A47L 9/162
See application file for complete search history.

(56) References Cited

U.S. PATENT DOCUMENTS 394,240 A * 12/1888 Allington .................. B04C 5/13
55/394
1,779,023 A * 10/1930 Waters ................... B01D 19/00
55/446

(Continued)

FOREIGN PATENT DOCUMENTS

GB 2370006 B 10/2003
JP 2002315701 A * 10/2002

OTHER PUBLICATIONS

International Search Report and Written Opinion, received in connection to international patent application No. PCT/CA2020/050054, dated Apr. 8, 2020.

*Primary Examiner* — Dung H Bui
(74) *Attorney, Agent, or Firm* — Philip C. C. Mendes da Costa; BERESKIN & PARR LLP/ S.E.N.C.R.L., s.r.l.

(57) ABSTRACT

A surface cleaning apparatus comprises a cyclone with a cleaning member axially moveable in the cyclone chamber and a drive handle exterior to the cyclone chamber.

23 Claims, 100 Drawing Sheets

(51) Int. Cl.
*A47L 9/32* (2006.01)
*B01D 46/00* (2006.01)
*B01D 46/24* (2006.01)
*B04C 5/081* (2006.01)
*B04C 9/00* (2006.01)
*B04C 5/04* (2006.01)
*B04C 5/185* (2006.01)
*A47L 9/12* (2006.01)
*A47L 9/20* (2006.01)

(52) U.S. Cl.
CPC ........ *B01D 46/002* (2013.01); *B01D 46/0065* (2013.01); *B01D 46/0068* (2013.01); *B01D 46/2411* (2013.01); *B04C 5/04* (2013.01); *B04C 5/081* (2013.01); *B04C 5/185* (2013.01); *B04C 9/00* (2013.01); *B04C 2009/004* (2013.01)

(56) References Cited

U.S. PATENT DOCUMENTS

| | | | |
|---|---|---|---|
| 2,754,968 A * | 7/1956 | Hage | B04C 5/28 209/729 |
| 2,840,240 A * | 6/1958 | Snyder | E21B 21/065 210/512.1 |
| 3,349,548 A * | 10/1967 | Boyen | B04C 5/103 55/457 |
| 3,636,682 A * | 1/1972 | Rush | B04C 5/04 55/459.1 |
| 3,933,450 A * | 1/1976 | Percevaut | B01D 47/06 96/319 |
| 3,990,870 A * | 11/1976 | Miczek | B01D 47/06 95/217 |
| 4,203,961 A * | 5/1980 | Cowley | B01J 19/006 261/79.2 |
| 4,276,262 A * | 6/1981 | Cowley | B01J 7/02 422/187 |
| 4,336,228 A * | 6/1982 | Cowley | B01J 19/006 422/129 |
| 4,394,143 A * | 7/1983 | O'Dell | A62C 3/04 96/372 |
| 4,713,096 A * | 12/1987 | Kajihara | B04C 5/10 209/148 |
| 5,221,299 A * | 6/1993 | Boring | B01D 45/12 55/459.1 |
| 5,961,701 A * | 10/1999 | Hlynsky | B01D 45/12 55/355 |
| 6,156,106 A * | 12/2000 | Kamata | B01D 45/08 55/459.1 |
| 6,251,296 B1 * | 6/2001 | Conrad | A47L 9/1683 210/806 |
| 6,406,505 B1 * | 6/2002 | Oh | A47L 5/362 15/353 |
| 6,432,154 B2 * | 8/2002 | Oh | A47L 9/165 55/423 |
| 6,599,348 B2 * | 7/2003 | Chosnek | B01D 45/12 55/416 |
| 6,625,845 B2 * | 9/2003 | Matsumoto | A47L 9/108 15/352 |
| 6,810,557 B2 * | 11/2004 | Hansen | A47L 9/1666 15/352 |
| 6,811,584 B2 * | 11/2004 | Oh | A47L 9/20 15/352 |
| 6,837,912 B1 * | 1/2005 | Heumann | B04C 5/103 55/424 |
| 6,979,358 B2 * | 12/2005 | Ekker | B04C 5/081 55/345 |
| 7,022,154 B2 * | 4/2006 | Oh | A47L 9/1666 55/426 |
| 7,293,657 B1 * | 11/2007 | Kelton | B04C 5/081 209/715 |
| 7,398,578 B2 * | 7/2008 | Lee | A47L 9/1683 15/327.2 |
| 7,494,520 B2 * | 2/2009 | Nam | A47L 9/1666 15/347 |
| 7,662,201 B2 * | 2/2010 | Lee | A47L 9/165 55/419 |
| 7,803,207 B2 | 9/2010 | Conrad | |
| 7,867,310 B2 * | 1/2011 | Baten | F01K 23/10 55/459.1 |
| 7,882,593 B2 | 2/2011 | Beskow et al. | |
| 7,922,794 B2 | 4/2011 | Morphey | |
| 7,958,597 B2 | 6/2011 | Frantzen et al. | |
| 8,069,529 B2 | 12/2011 | Groff et al. | |
| 8,152,877 B2 * | 4/2012 | Greene | A47L 9/165 55/337 |
| 8,156,609 B2 | 4/2012 | Milne et al. | |
| 8,236,077 B2 | 8/2012 | Gomiciaga-Pereda et al. | |
| 8,424,154 B2 | 4/2013 | Beskow et al. | |
| 8,549,704 B2 | 10/2013 | Milligan et al. | |
| 8,567,008 B2 | 10/2013 | Conrad | |
| 8,607,406 B2 | 12/2013 | Miefalk et al. | |
| 8,607,407 B2 | 12/2013 | Conrad | |
| 8,640,304 B2 | 2/2014 | Conrad | |
| 8,657,910 B2 * | 2/2014 | Park | B04C 5/081 55/419 |
| 8,764,886 B2 * | 7/2014 | Halpap | B04C 5/181 95/271 |
| 8,769,764 B2 | 7/2014 | Crouch et al. | |
| 9,009,912 B2 | 4/2015 | Conrad | |
| 9,027,198 B2 | 5/2015 | Conrad | |
| 9,204,773 B2 * | 12/2015 | Conrad | A47L 9/009 |
| 9,521,936 B2 * | 12/2016 | Holz | A47L 9/1608 |
| 9,808,134 B2 * | 11/2017 | Hyun | A47L 9/1608 |
| 2002/0011053 A1 * | 1/2002 | Oh | A47L 9/1683 55/426 |
| 2002/0112998 A1 * | 8/2002 | Bosman | B04C 5/04 209/734 |
| 2003/0106182 A1 * | 6/2003 | Lee | A47L 9/165 15/353 |
| 2003/0159235 A1 * | 8/2003 | Oh | A47L 9/1666 15/352 |
| 2003/0208879 A1 * | 11/2003 | Oh | A47L 9/1666 15/352 |
| 2004/0187253 A1 * | 9/2004 | Jin | A47L 9/20 15/352 |
| 2006/0042039 A1 * | 3/2006 | McDowell | A47L 5/362 15/353 |
| 2006/0042202 A1 * | 3/2006 | Lee | A47L 9/20 55/289 |
| 2006/0090290 A1 | 5/2006 | Lau | |
| 2007/0079587 A1 * | 4/2007 | Kim | A47L 9/1641 55/349 |
| 2007/0084160 A1 * | 4/2007 | Kim | A47L 9/1641 55/345 |
| 2008/0047091 A1 * | 2/2008 | Nguyen | A47L 9/1625 15/300.1 |
| 2008/0172992 A1 * | 7/2008 | Conrad | A47L 9/1625 55/323 |
| 2008/0264016 A1 * | 10/2008 | Oh | A47L 5/28 55/429 |
| 2008/0295466 A1 * | 12/2008 | Cha | A47L 9/1666 55/296 |
| 2009/0165431 A1 * | 7/2009 | Oh | B04C 5/04 55/337 |
| 2011/0000047 A1 * | 1/2011 | Ji | A47L 9/108 15/347 |
| 2011/0289720 A1 | 12/2011 | Han et al. | |
| 2012/0036675 A1 * | 2/2012 | Conrad | A47L 9/1625 15/347 |
| 2012/0151888 A1 * | 6/2012 | Yoshimura | F25B 43/02 55/462 |
| 2012/0222252 A1 * | 9/2012 | Conrad | A47L 5/362 15/347 |
| 2012/0311979 A1 * | 12/2012 | Conrad | A47L 9/1683 55/394 |
| 2013/0269147 A1 * | 10/2013 | Conrad | A47L 9/1683 15/329 |
| 2014/0366310 A1 | 12/2014 | Conrad | |

(56) References Cited

U.S. PATENT DOCUMENTS

| | | | |
|---|---|---|---|
| 2014/0366311 A1* | 12/2014 | Han | A47L 9/16 |
| | | | 15/339 |
| 2016/0000284 A1* | 1/2016 | Gui | A47L 9/1683 |
| | | | 55/327 |
| 2016/0100728 A1* | 4/2016 | Lavoie | B01D 46/2403 |
| | | | 55/447 |
| 2016/0158681 A1* | 6/2016 | Kim | B01D 45/16 |
| | | | 55/462 |
| 2016/0206167 A1* | 7/2016 | Kim | A47L 9/1633 |
| 2018/0238620 A1* | 8/2018 | Baxter | F25J 3/0625 |
| 2019/0090710 A1* | 3/2019 | Marcus | A47L 9/12 |

* cited by examiner

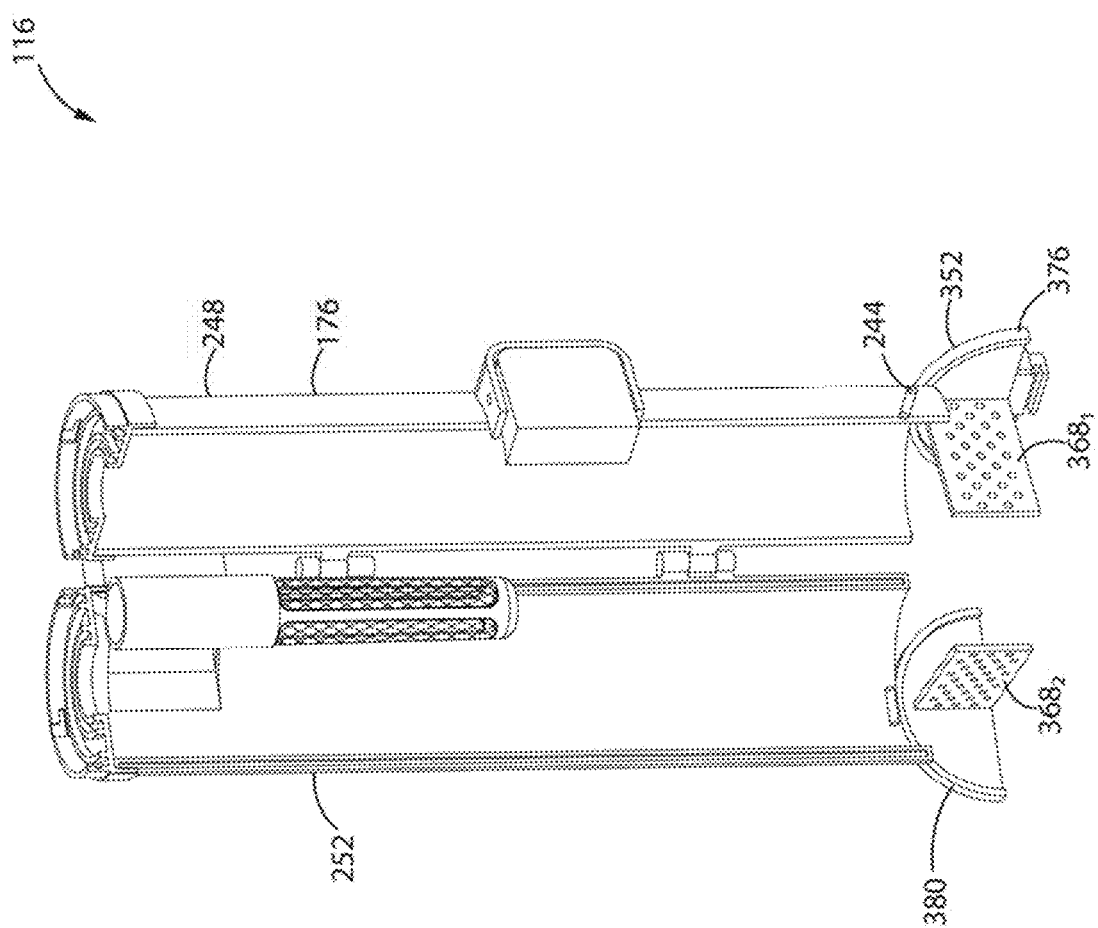

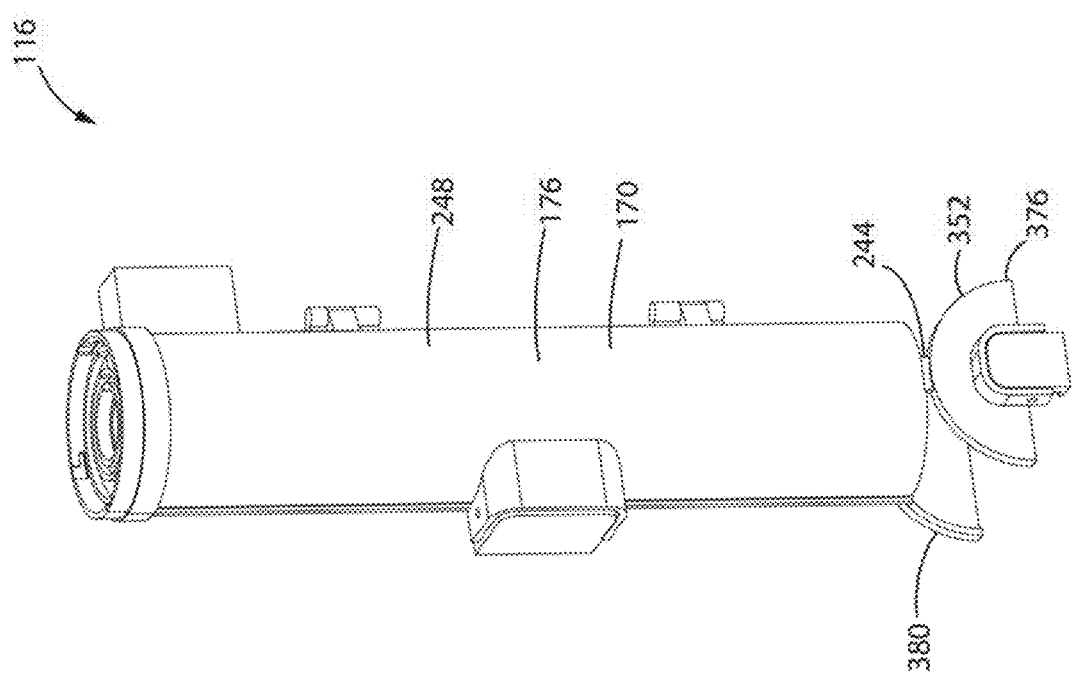

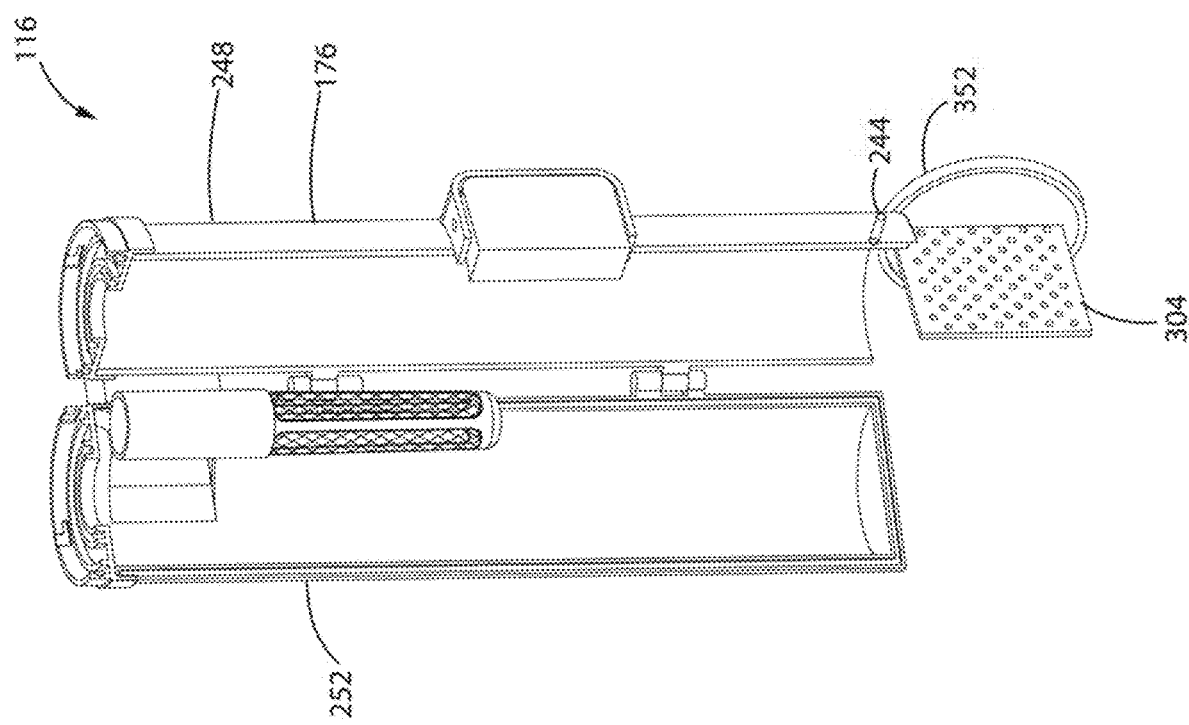

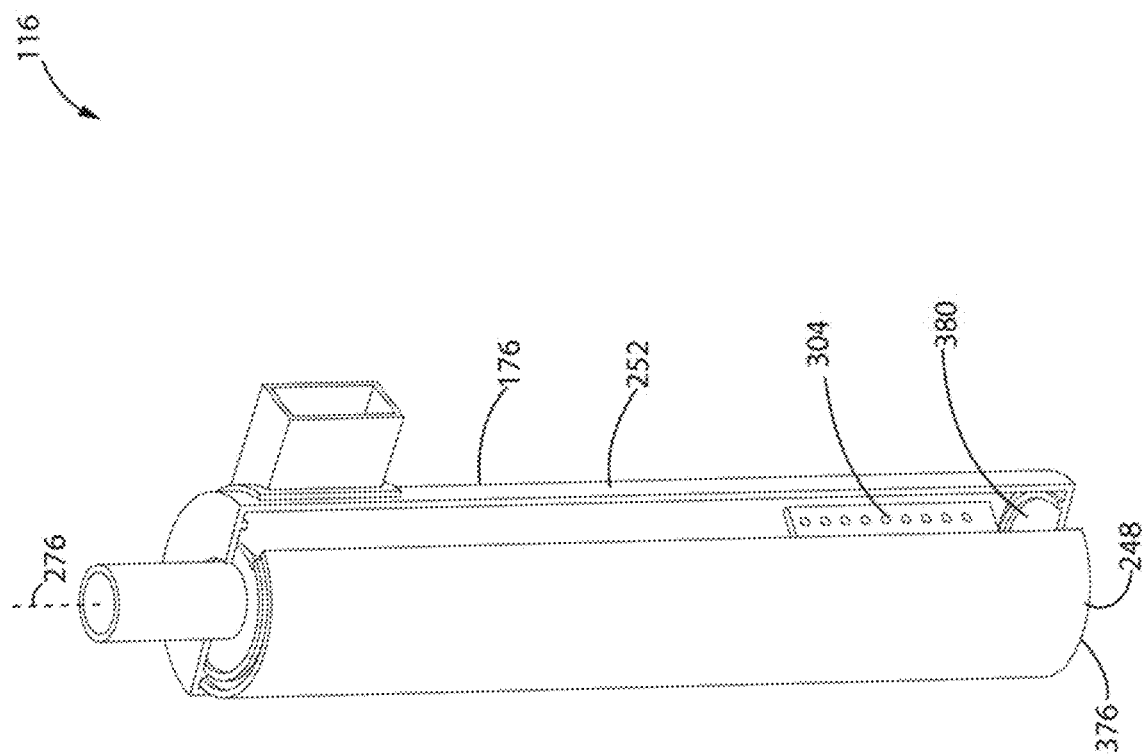

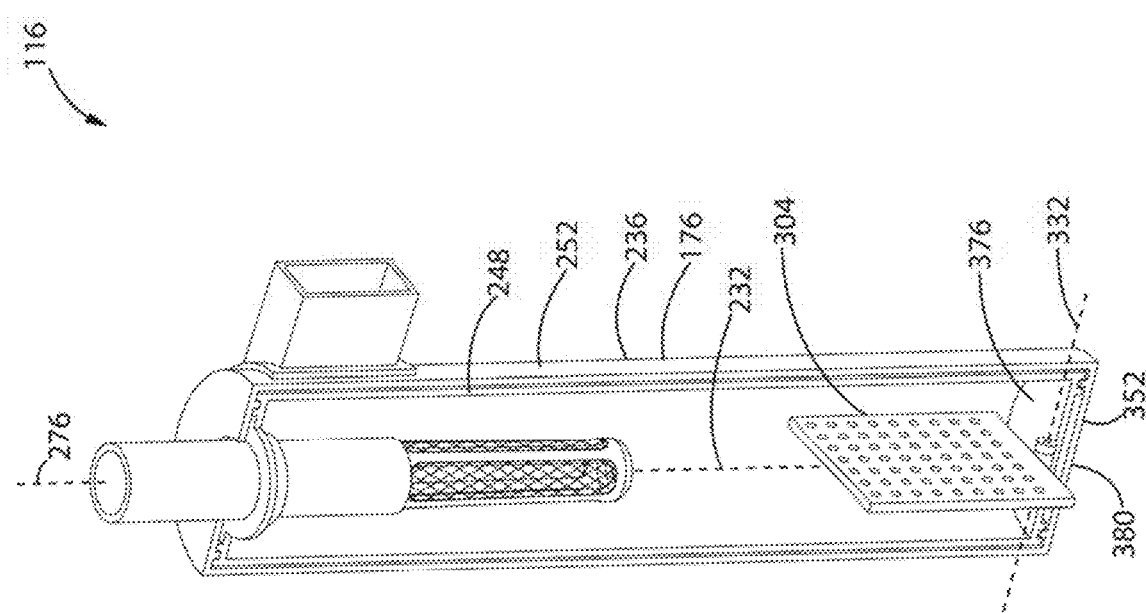

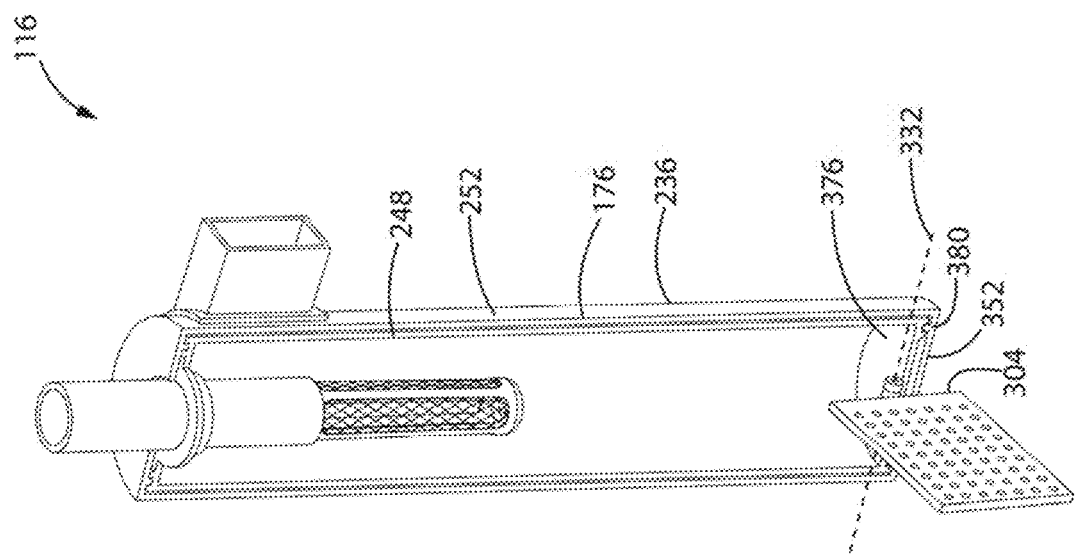

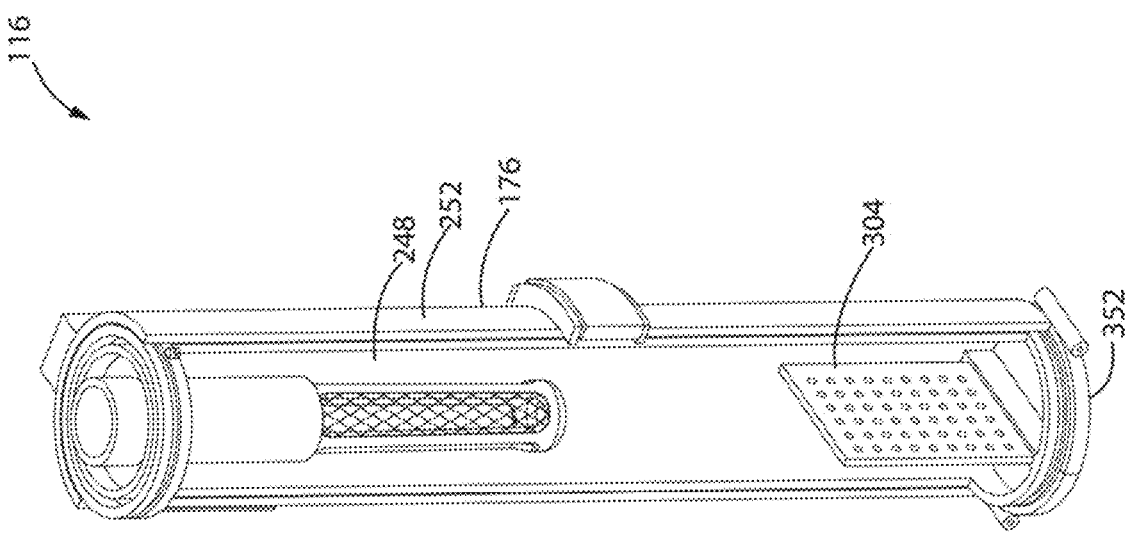

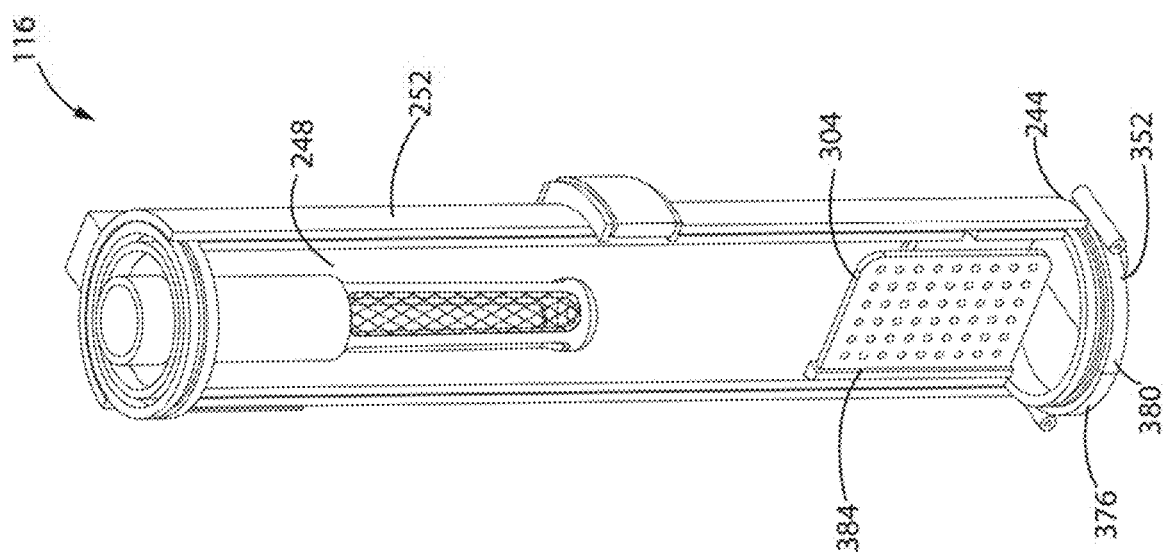

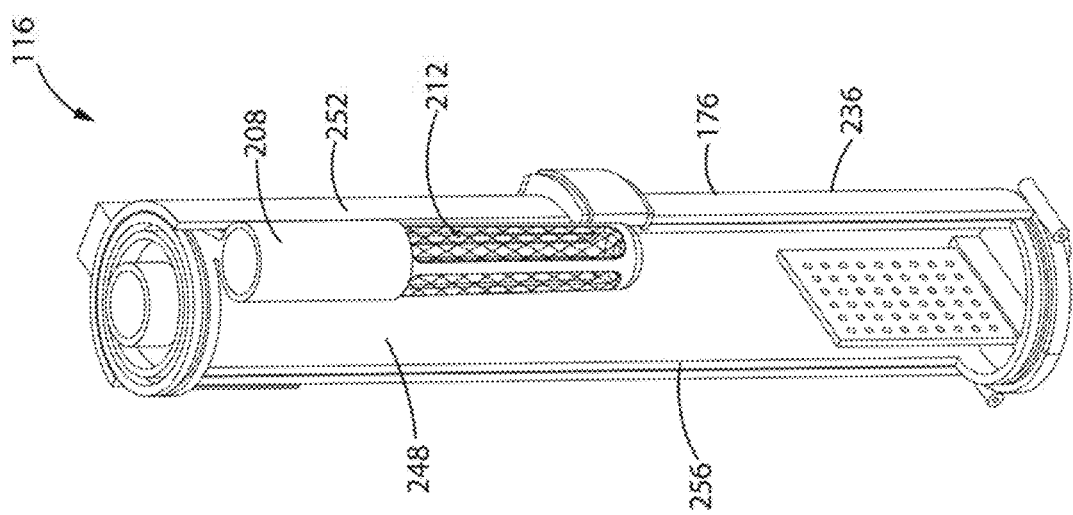

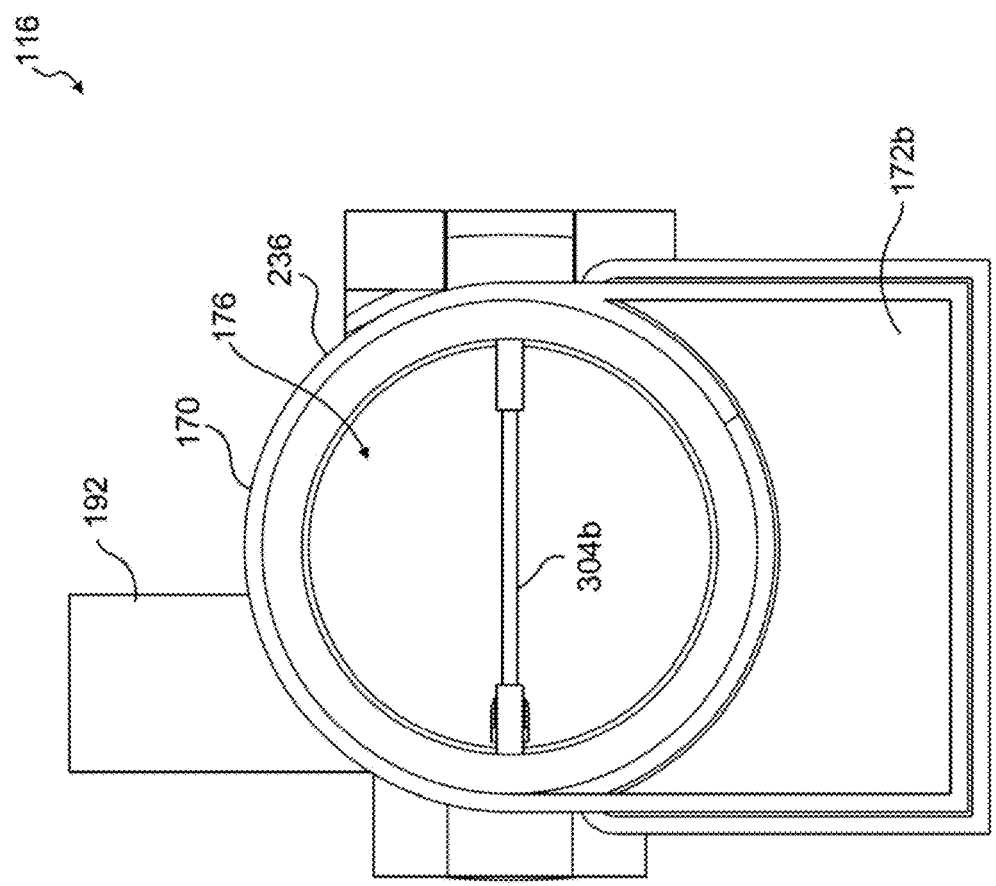

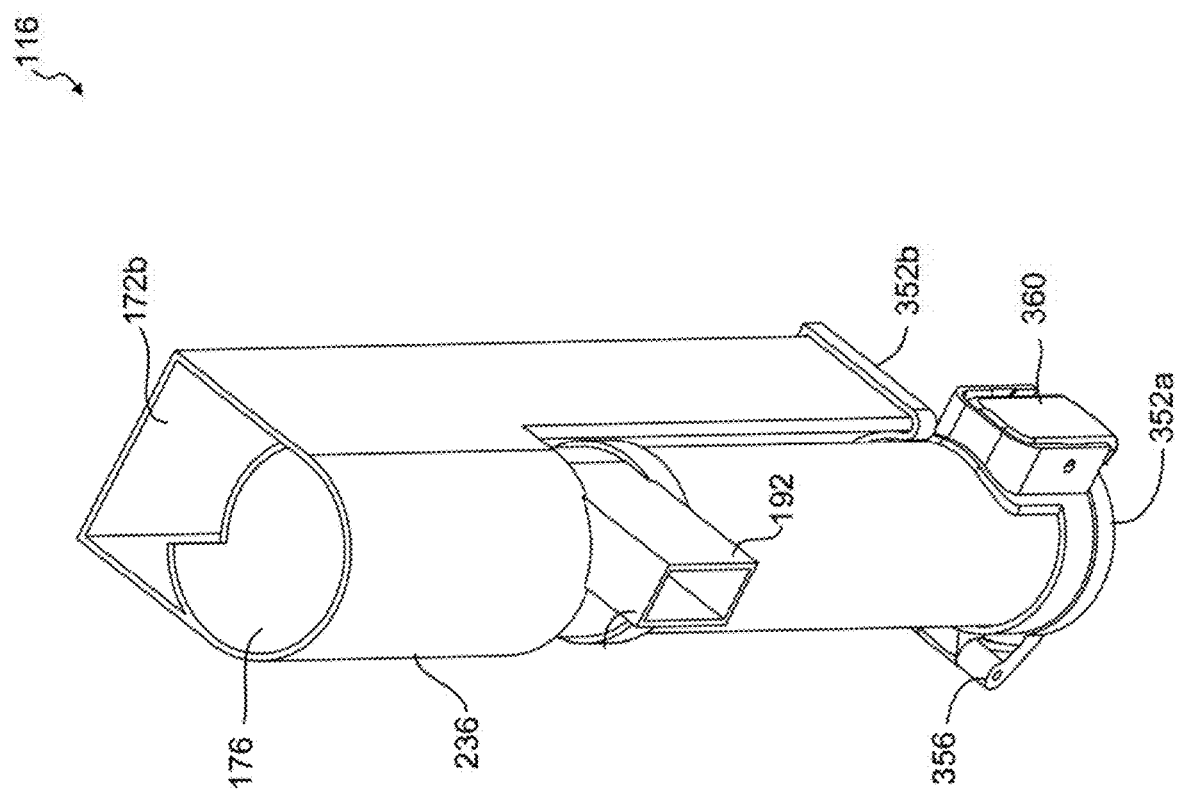

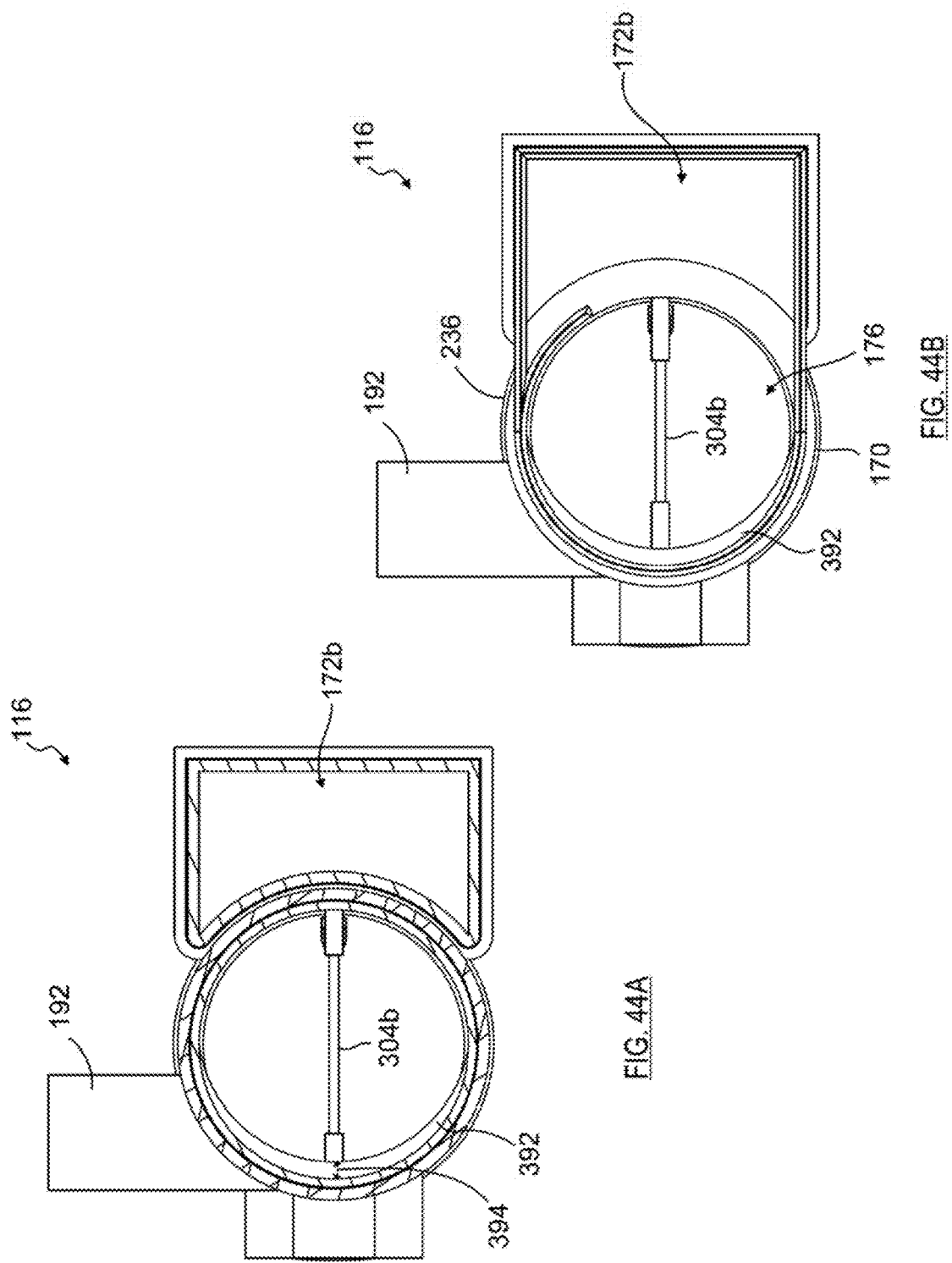

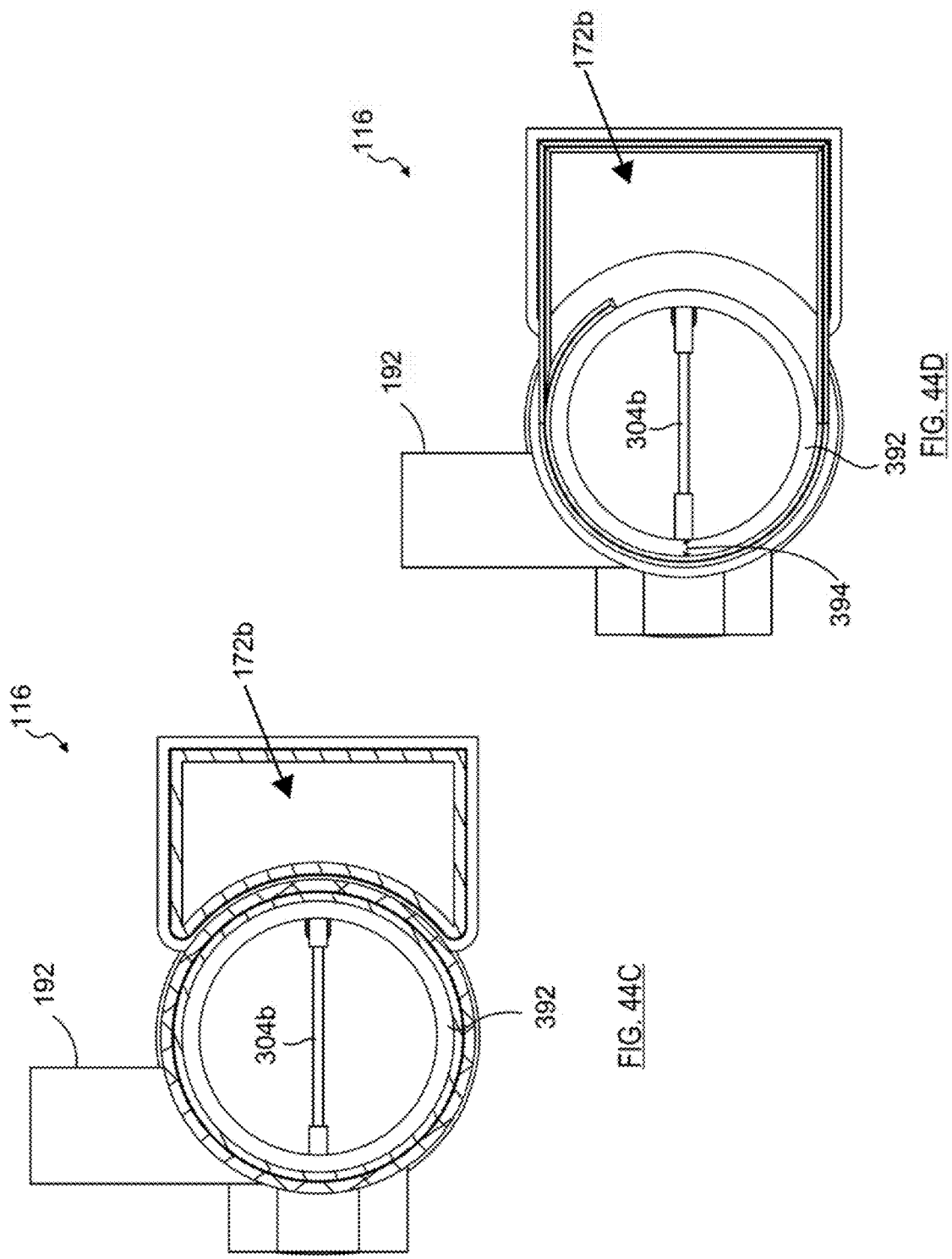

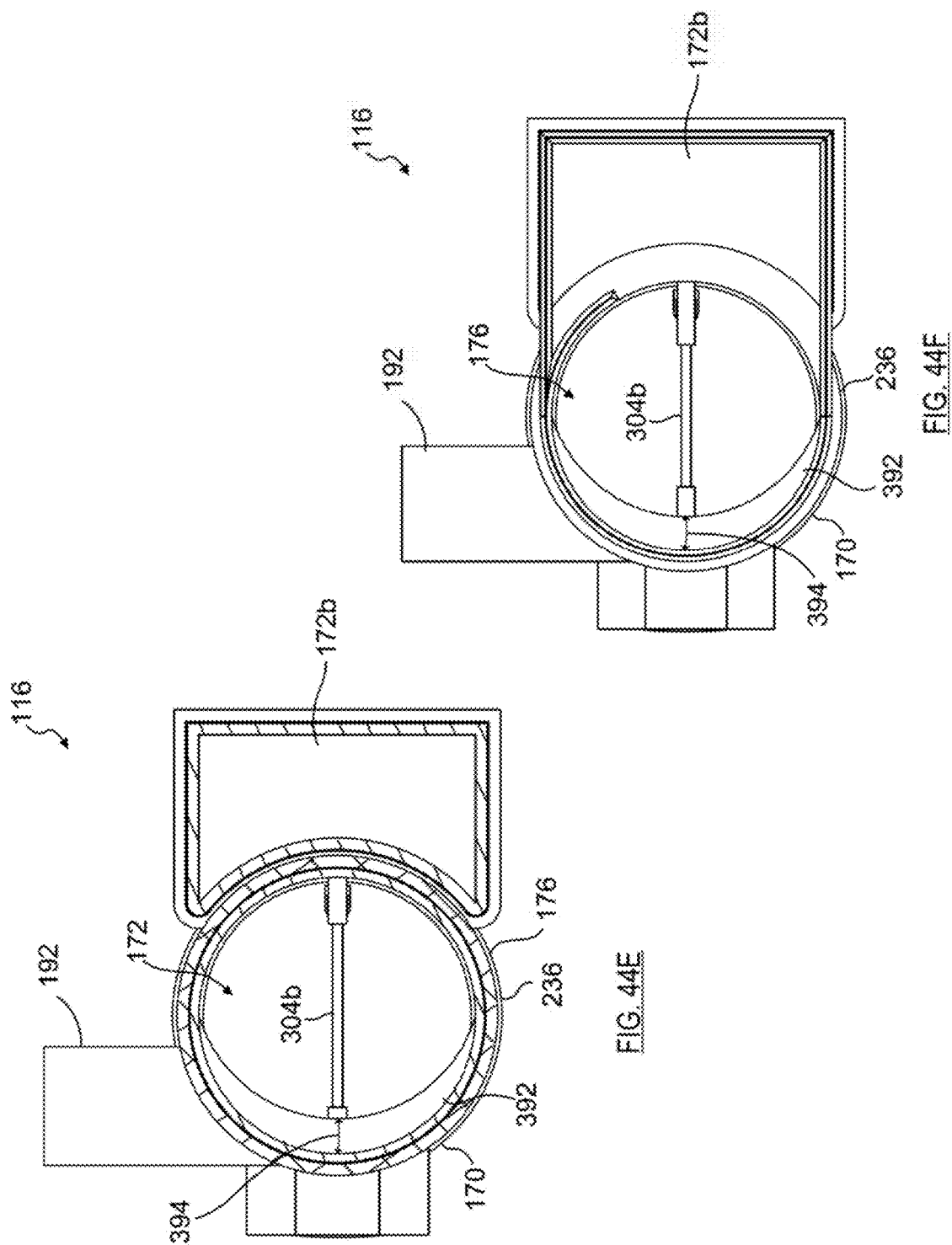

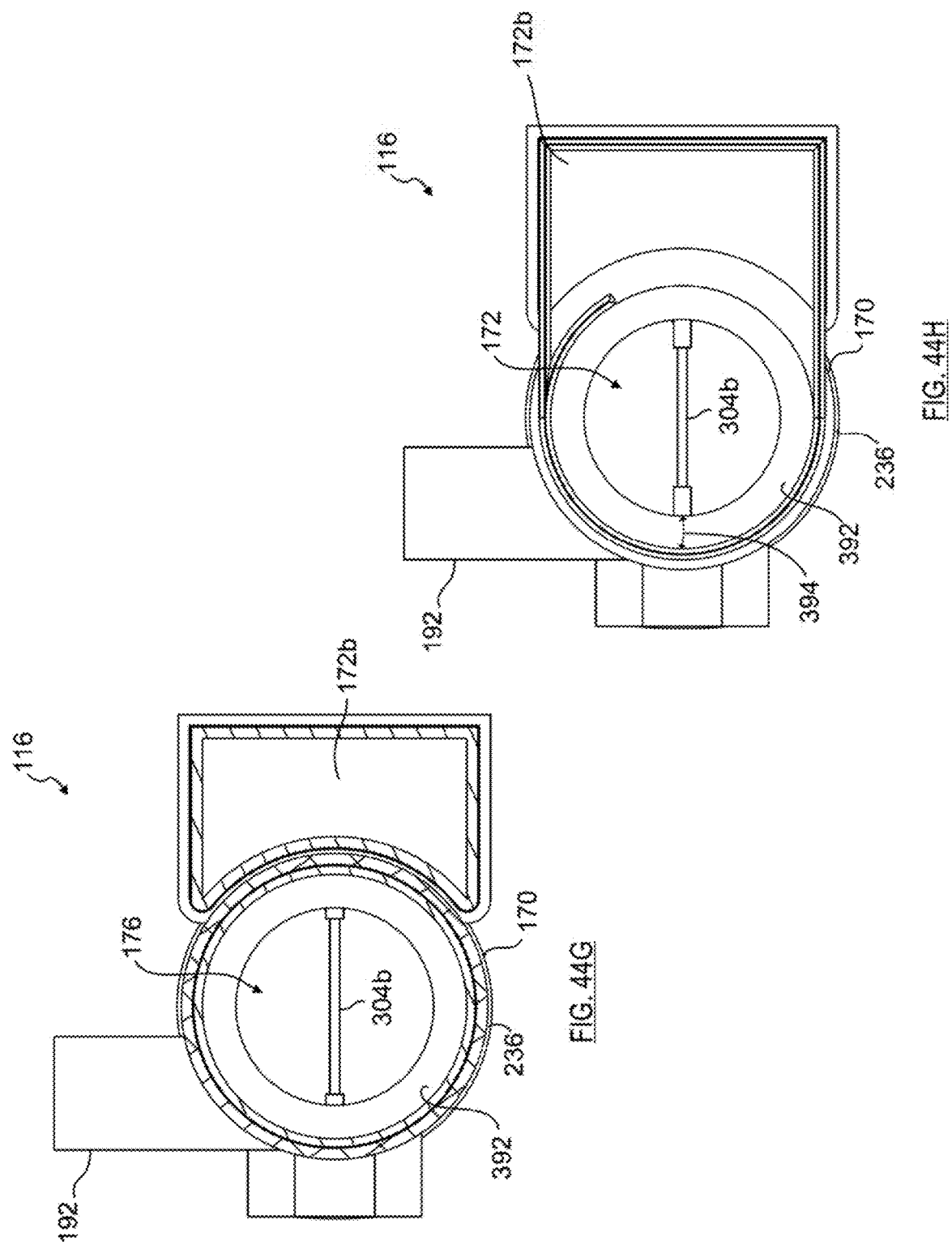

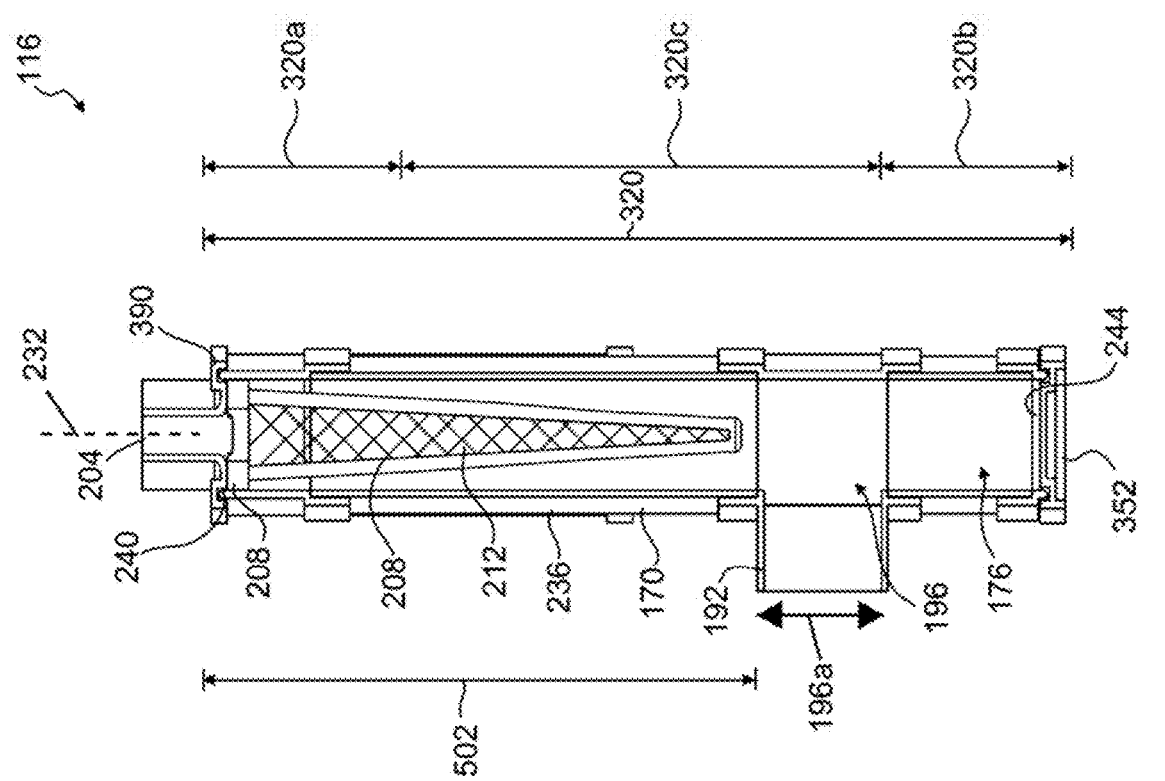

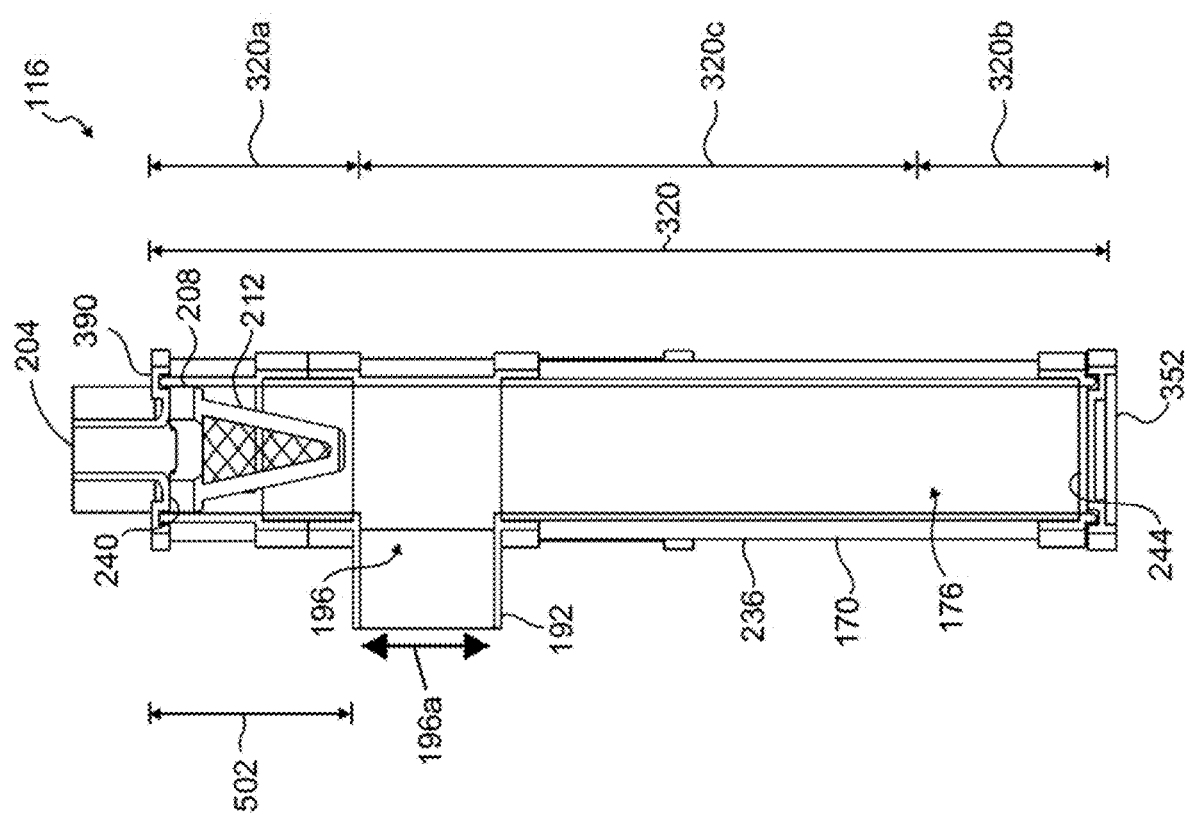

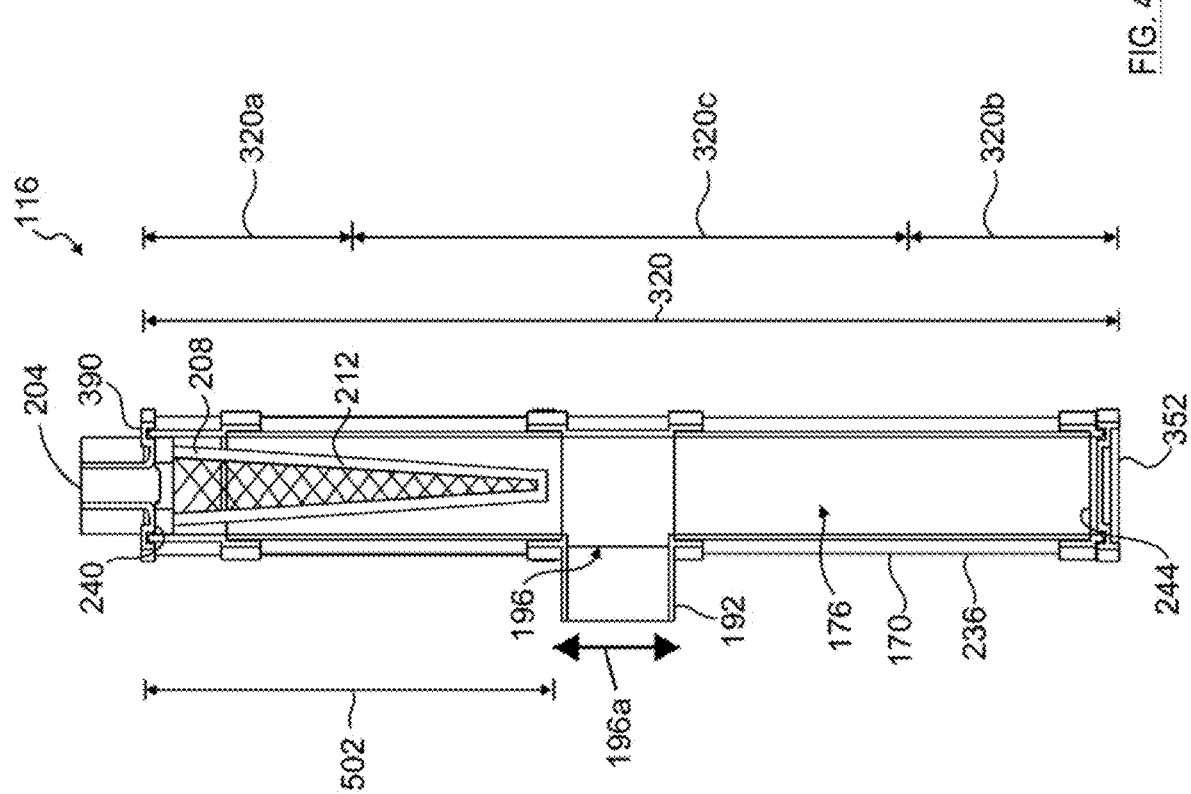

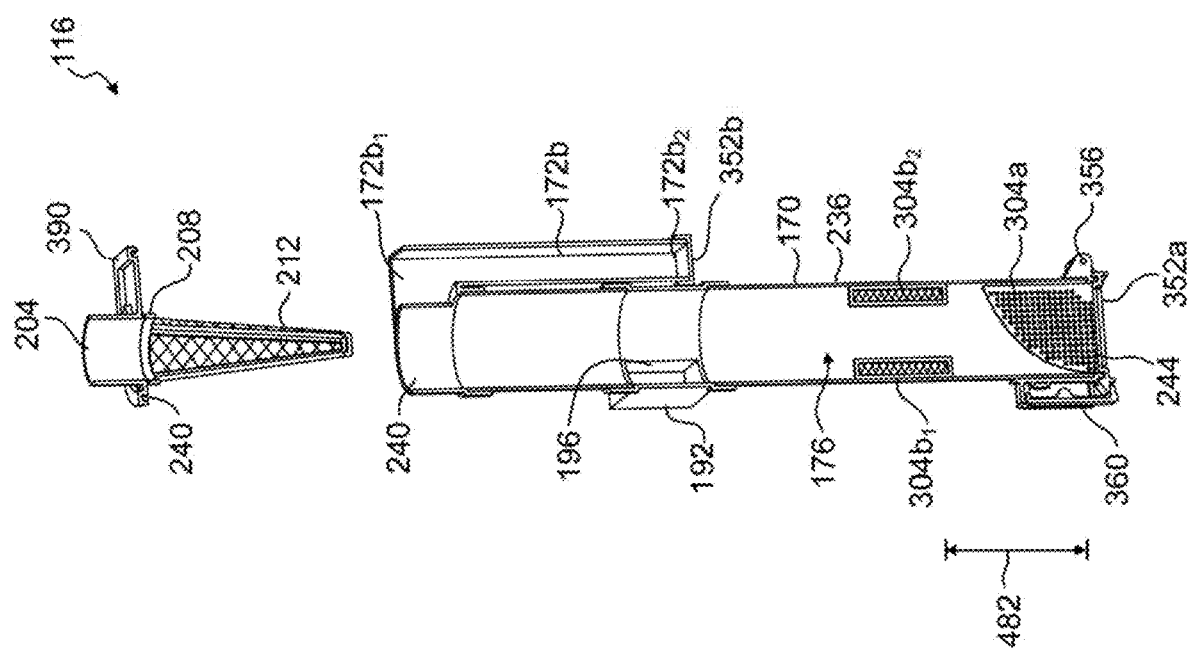

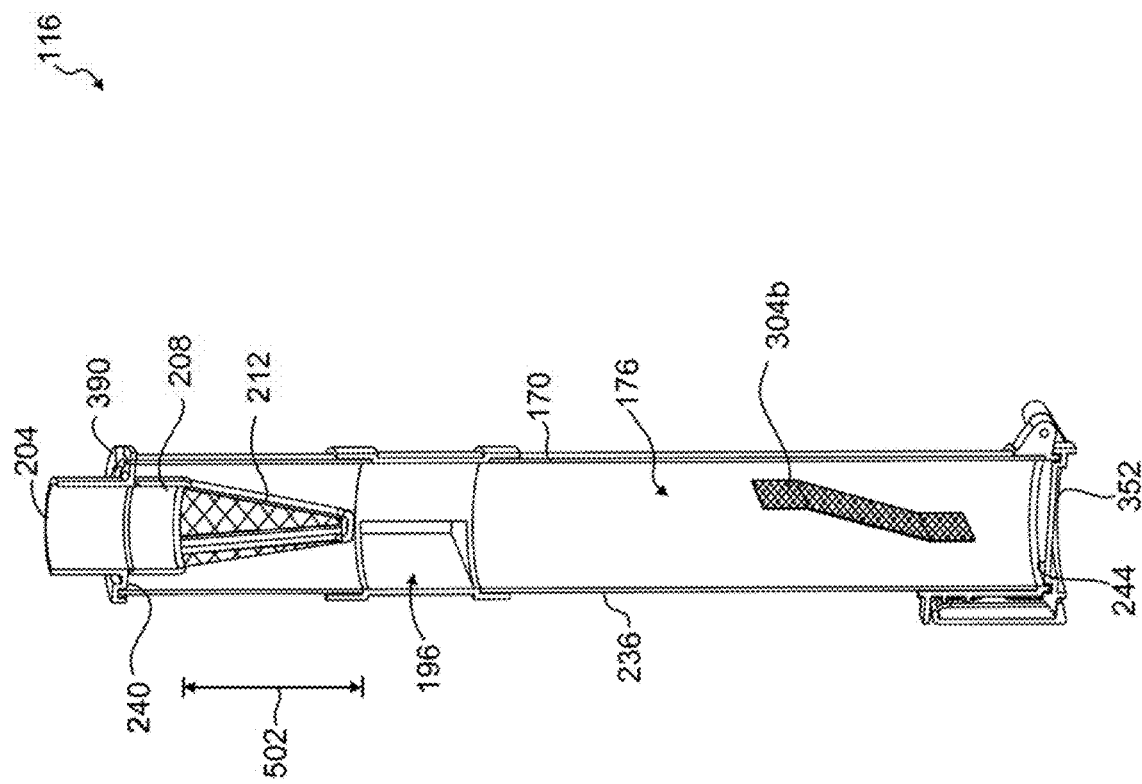

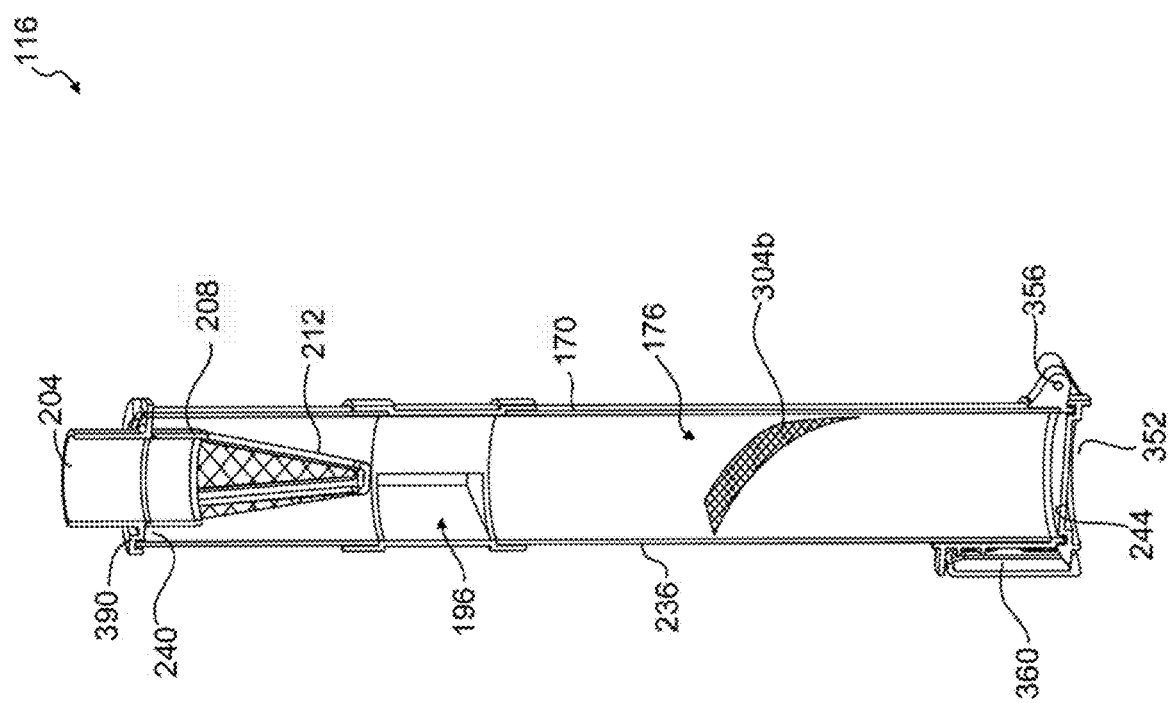

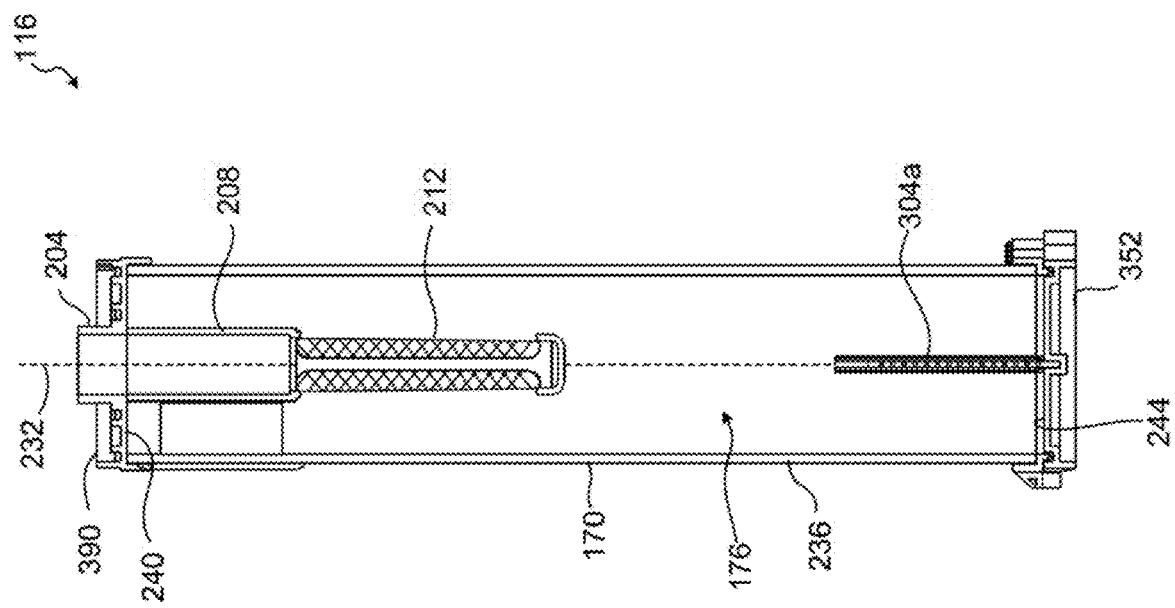

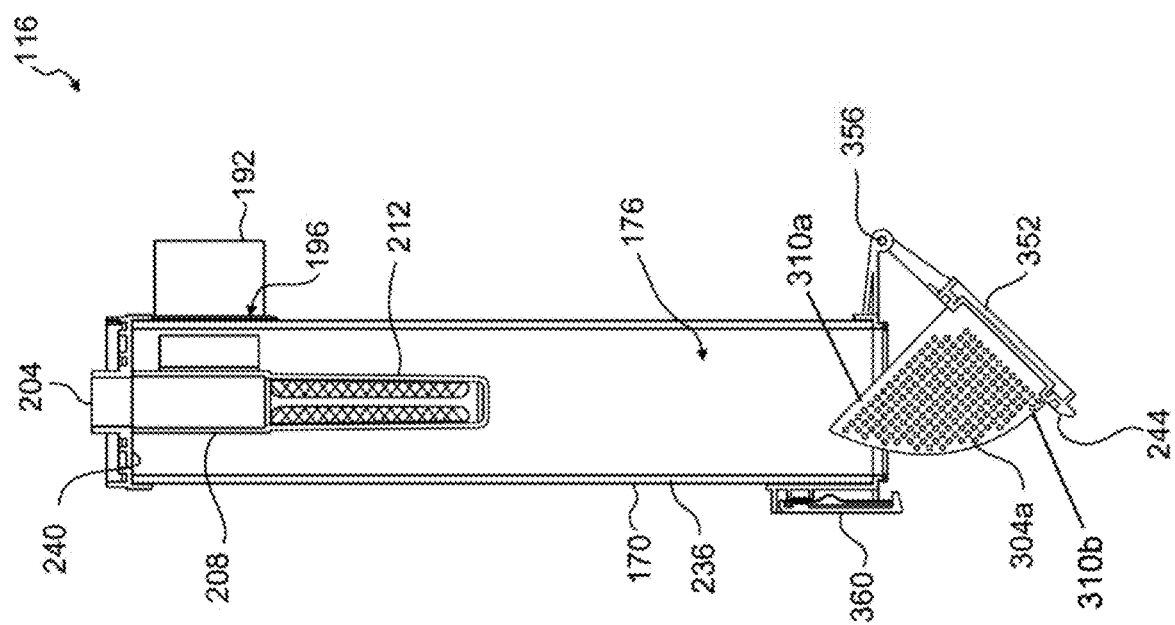

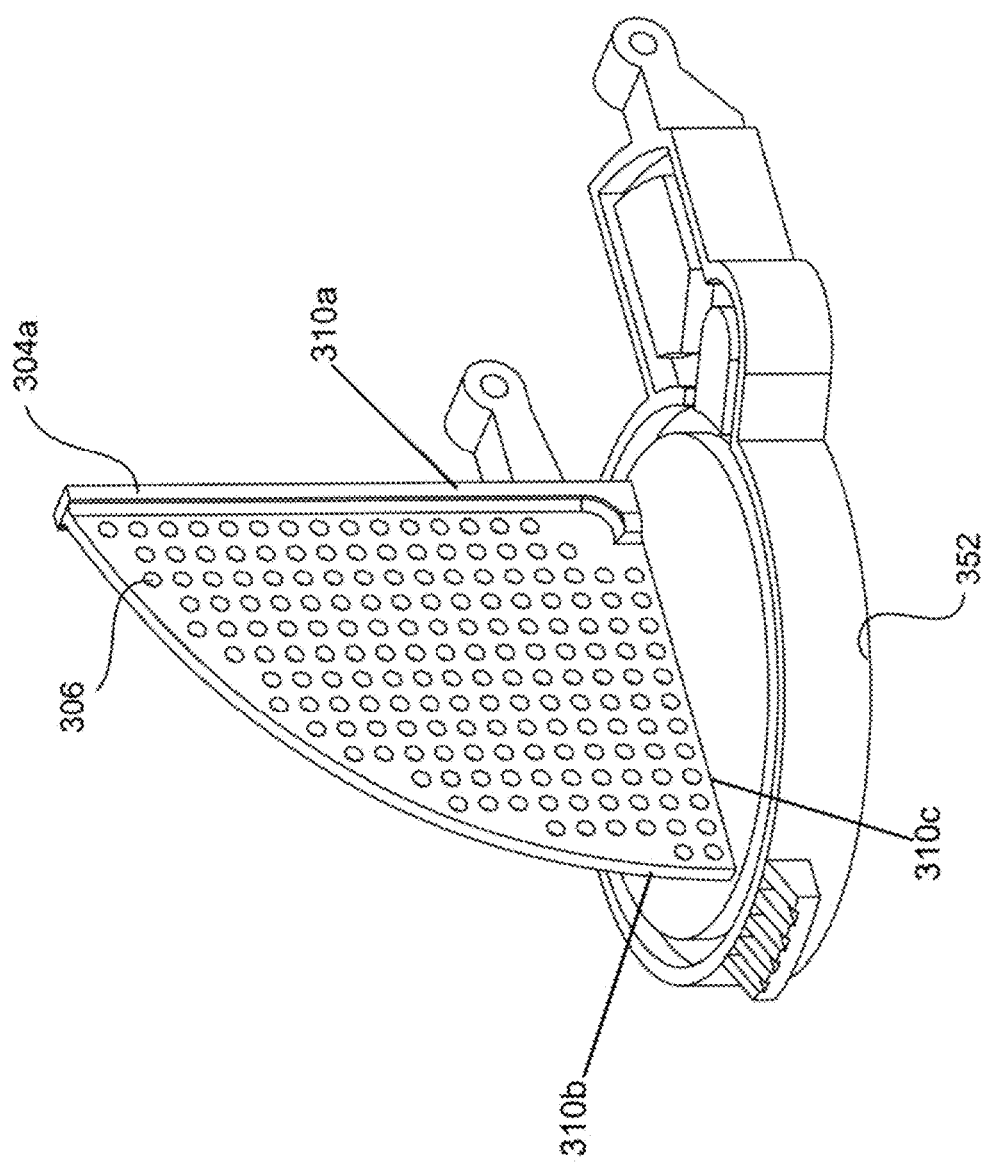

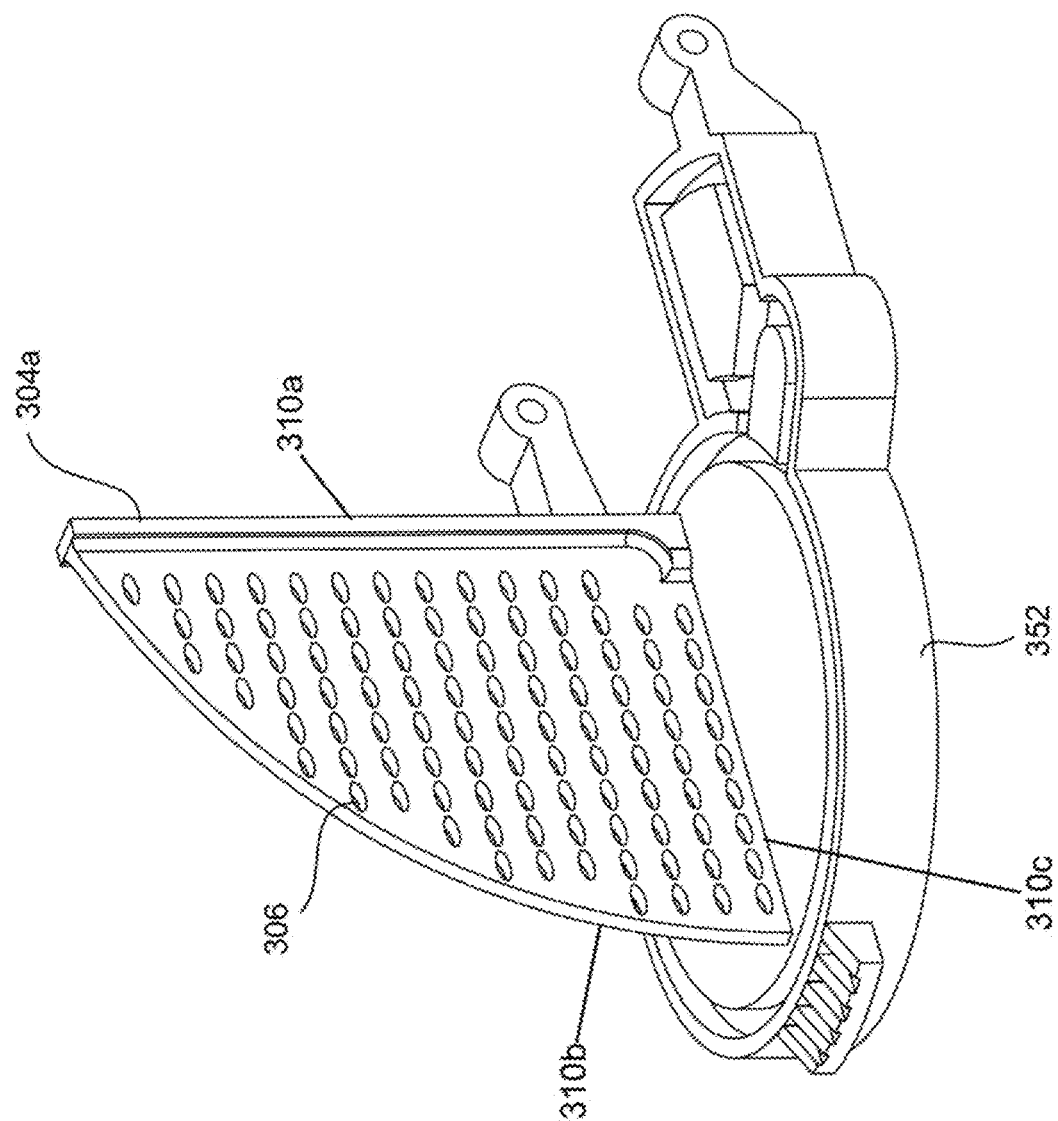

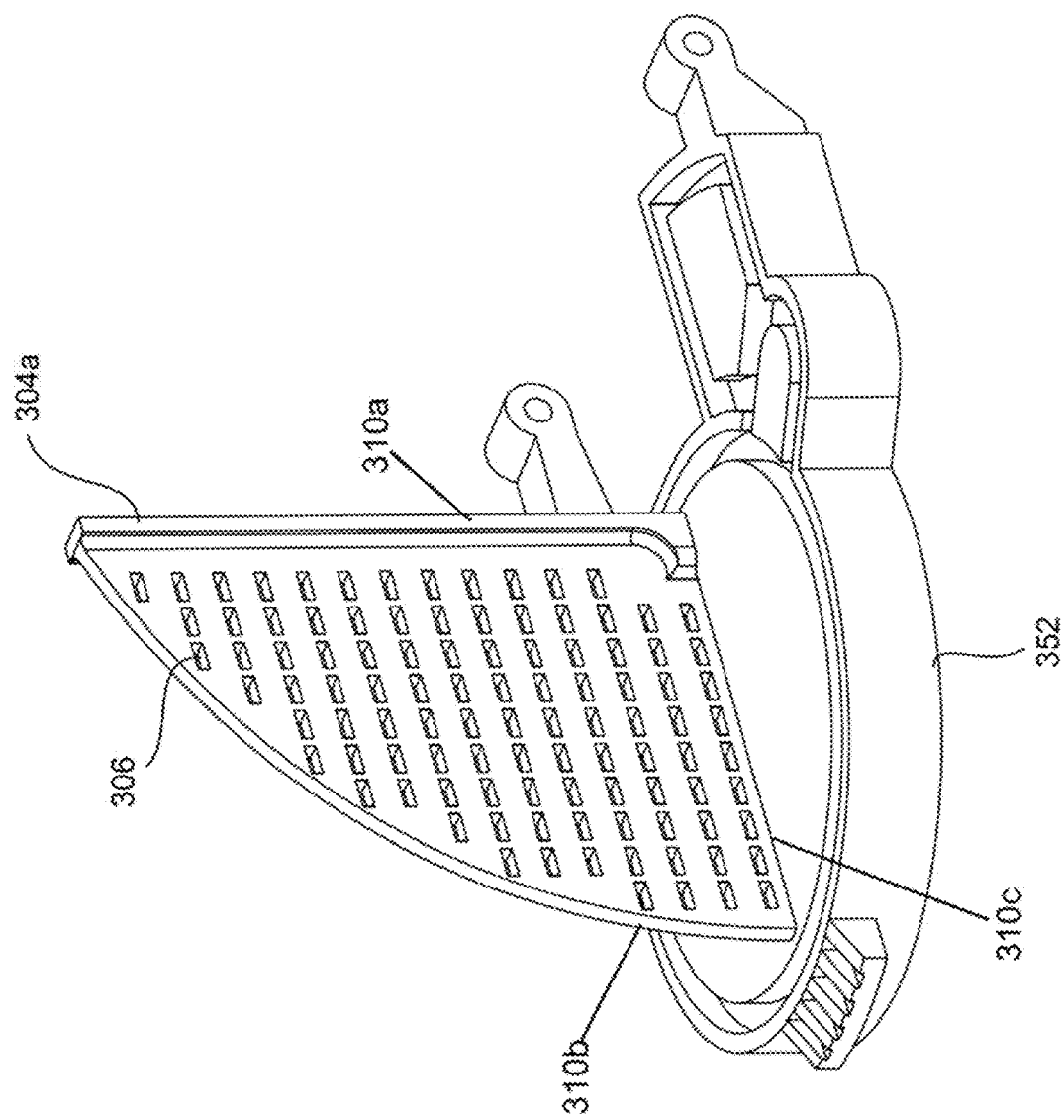

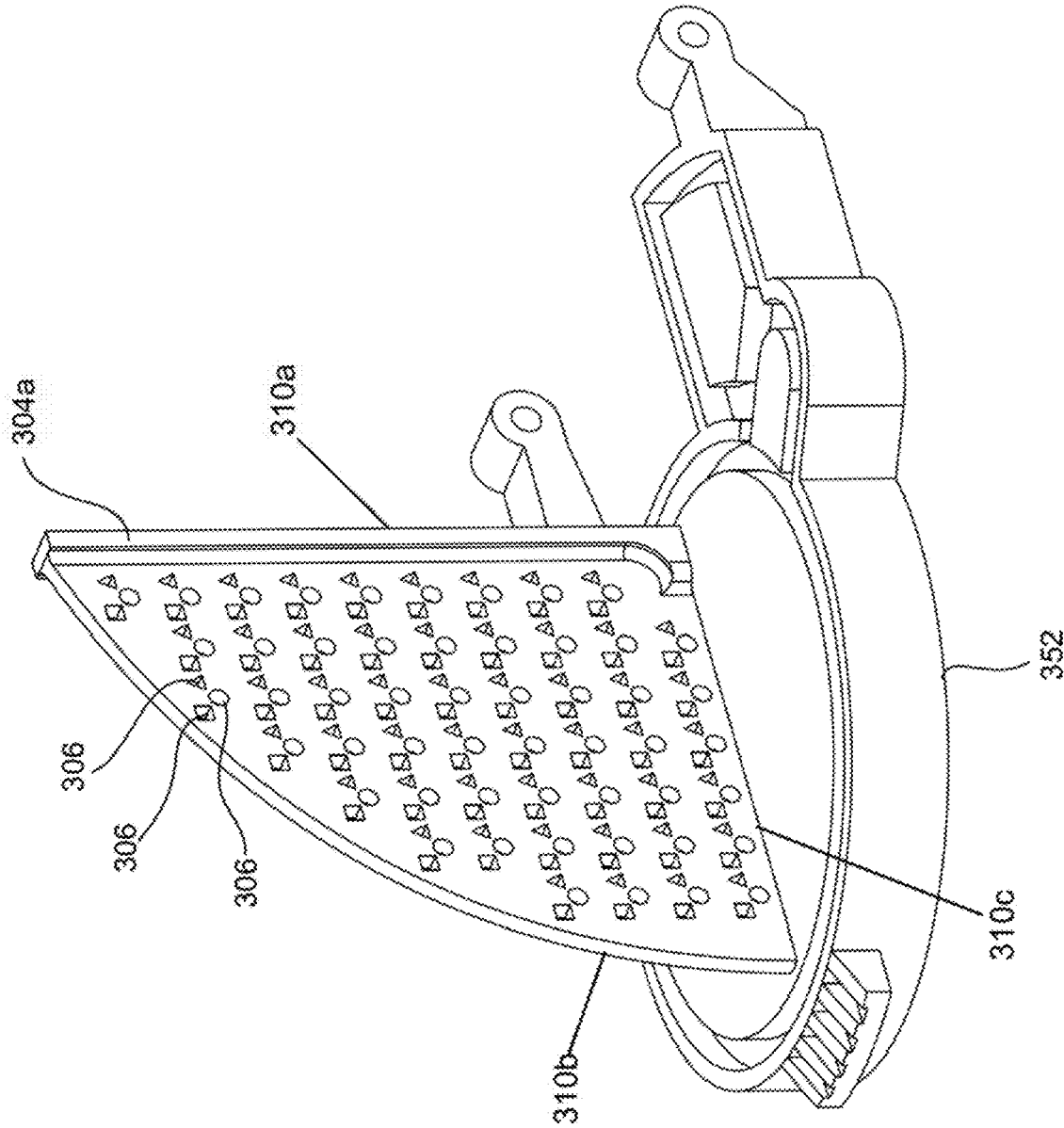

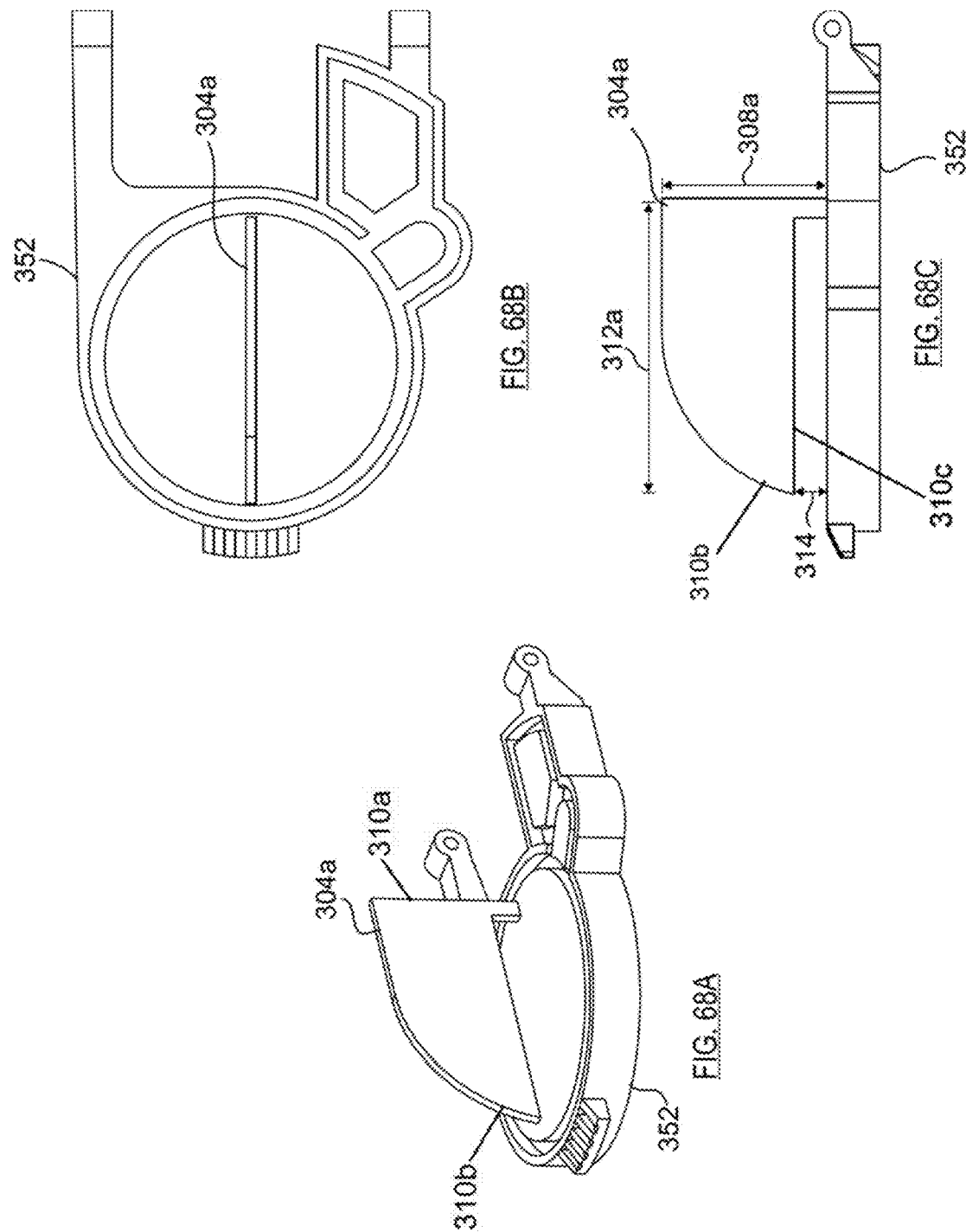

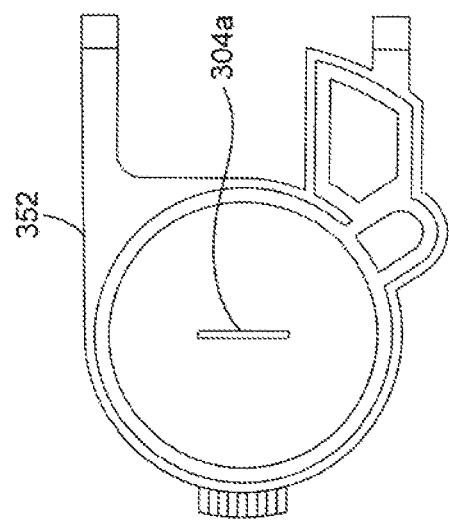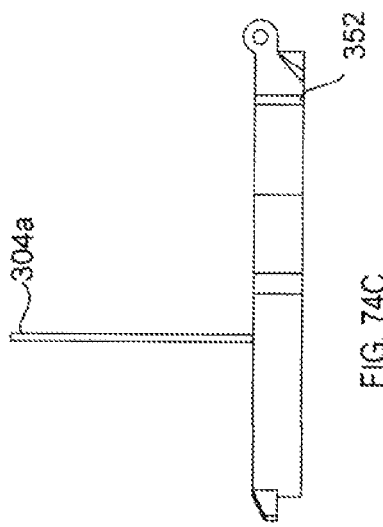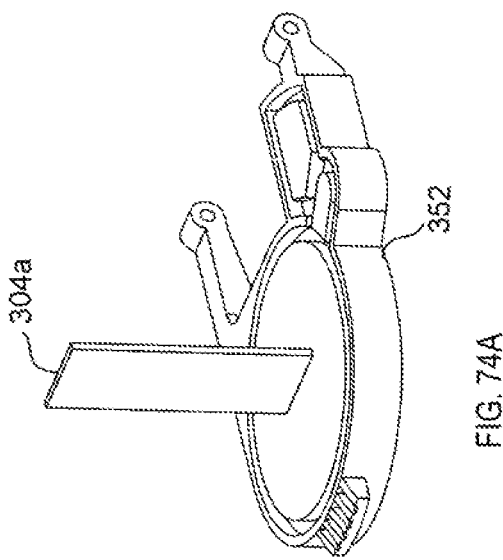

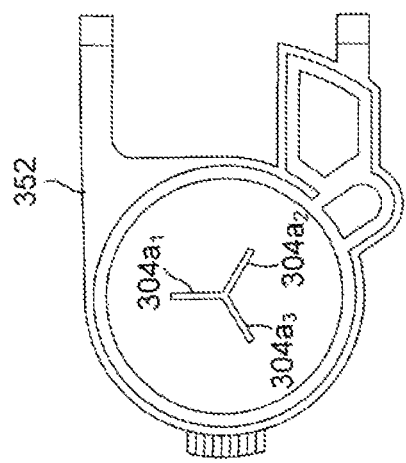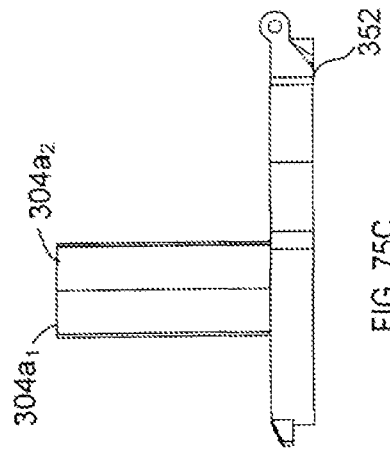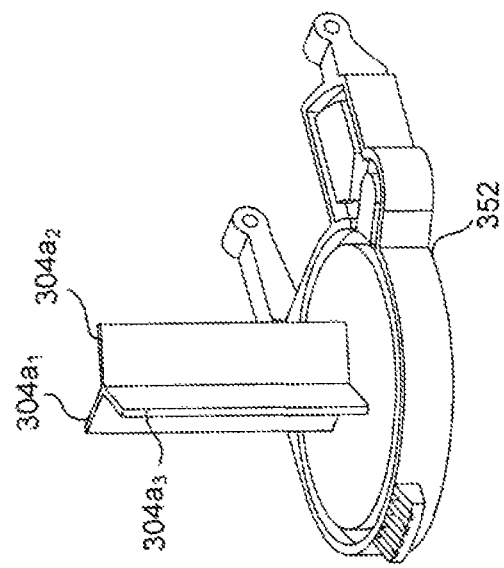

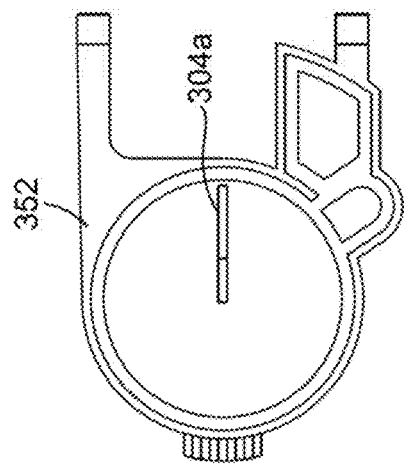
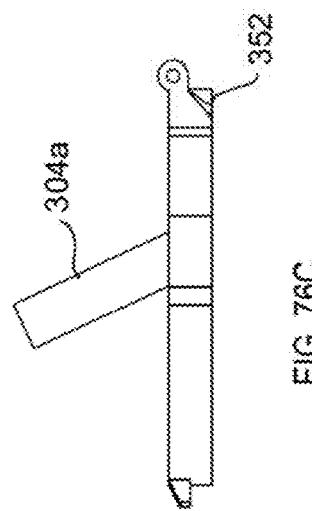
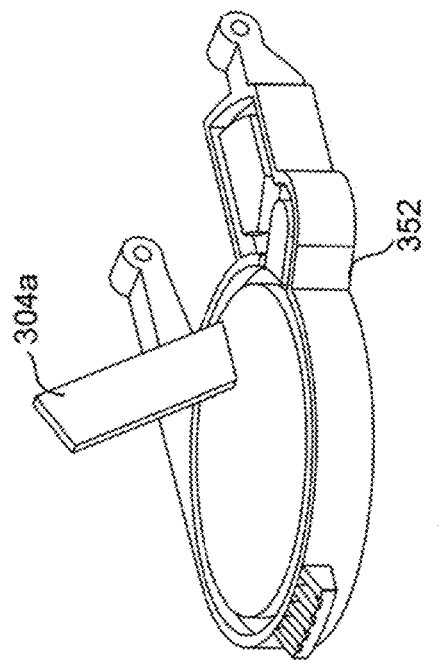

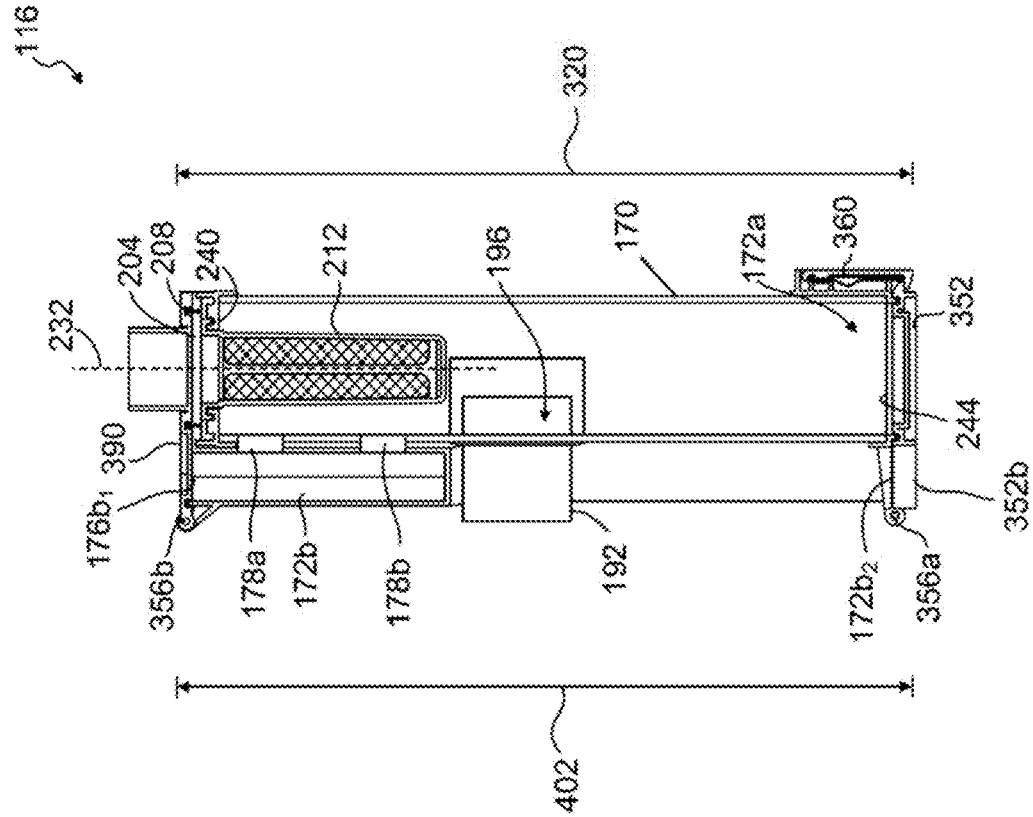

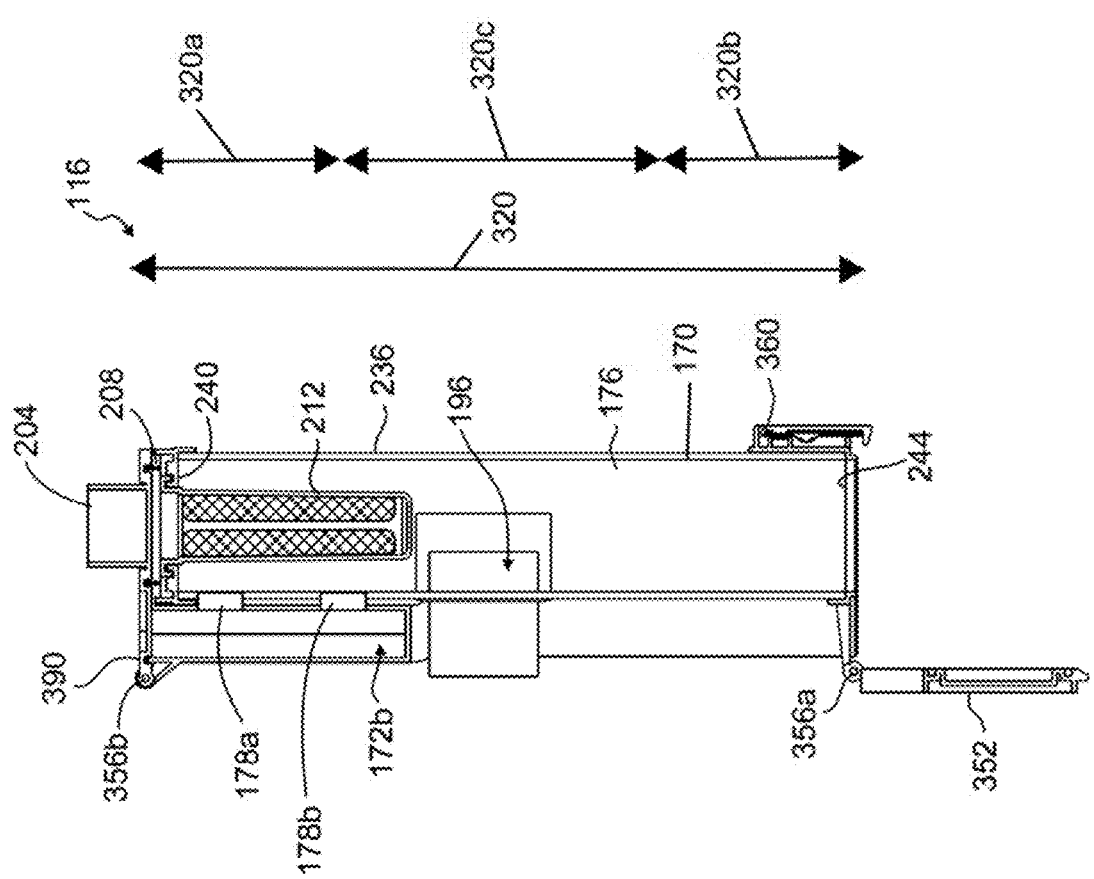

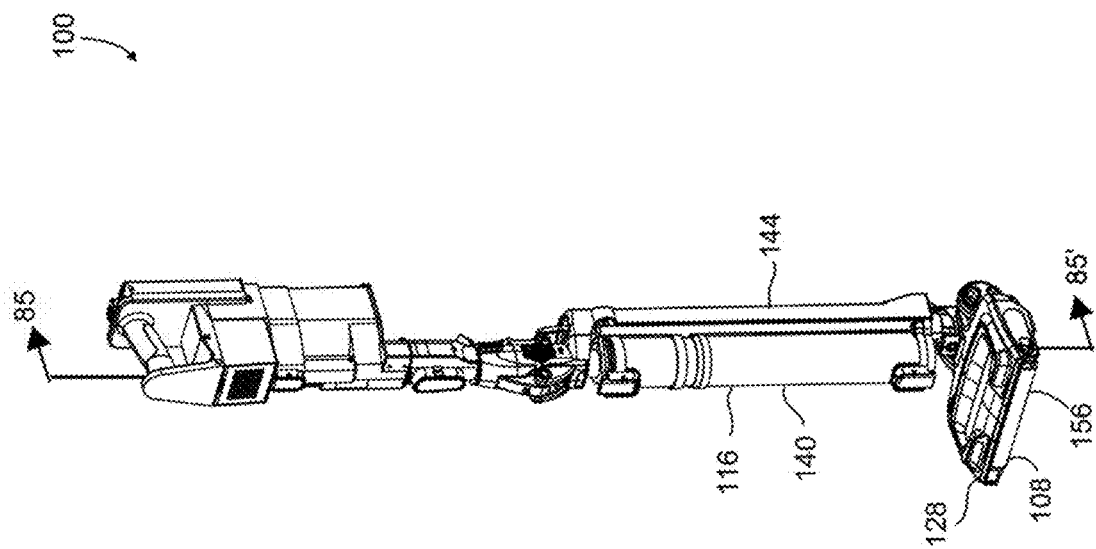

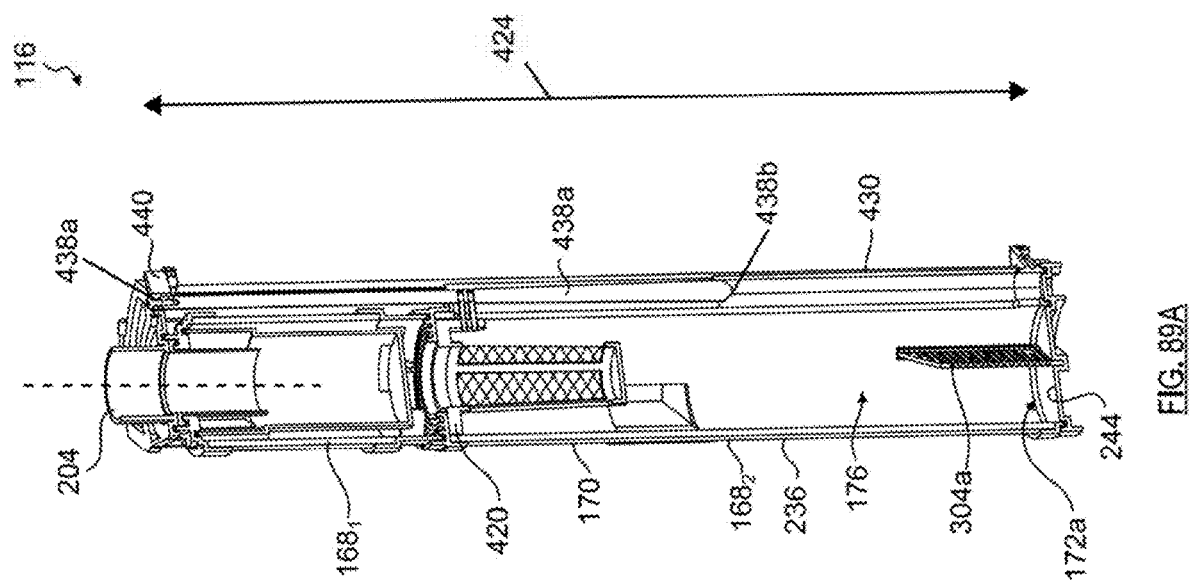

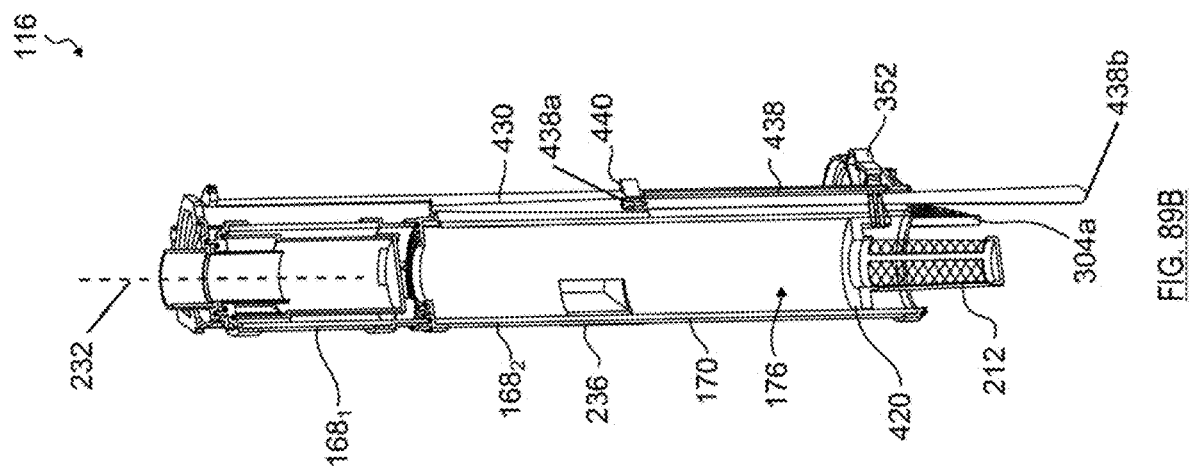

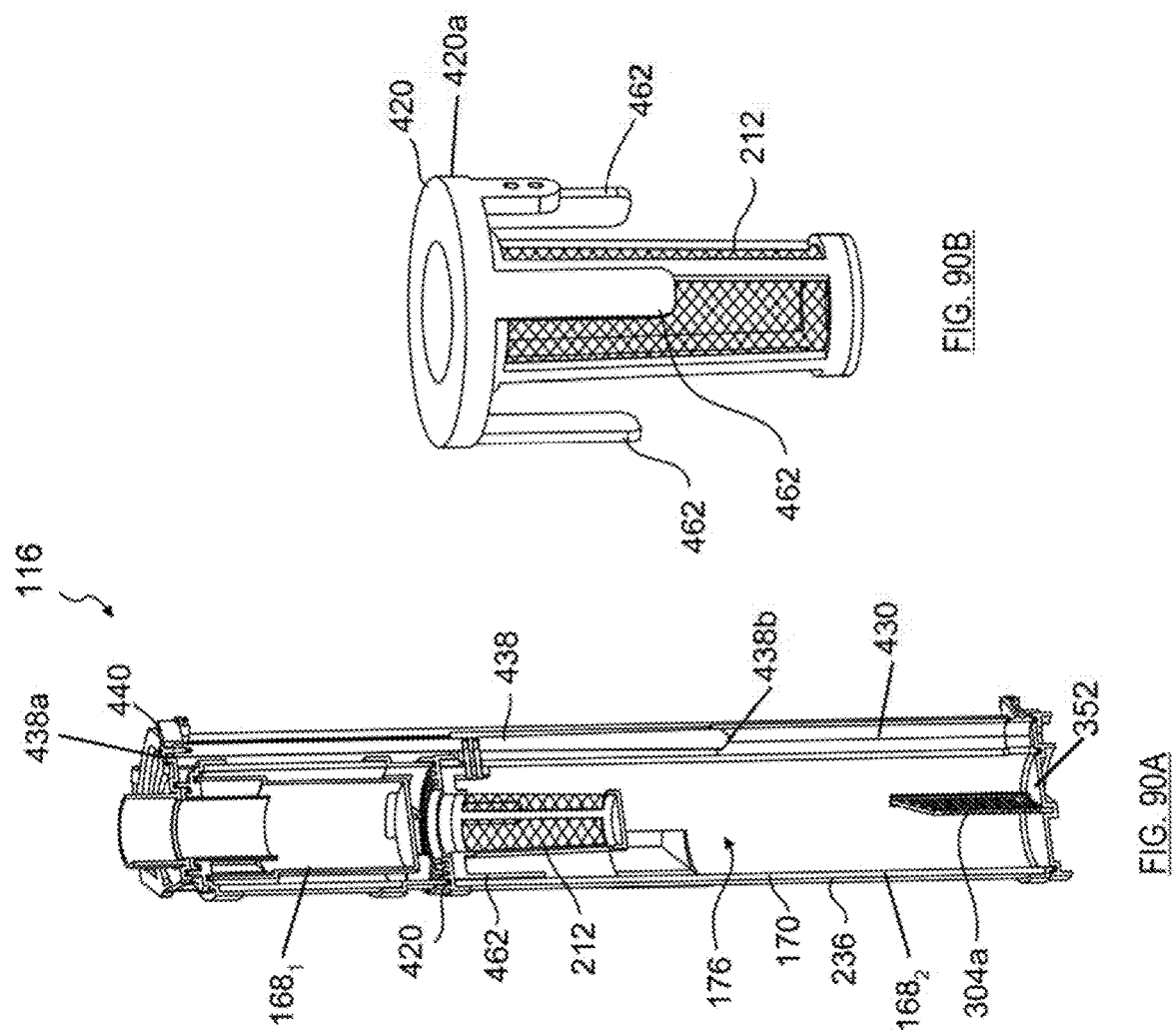

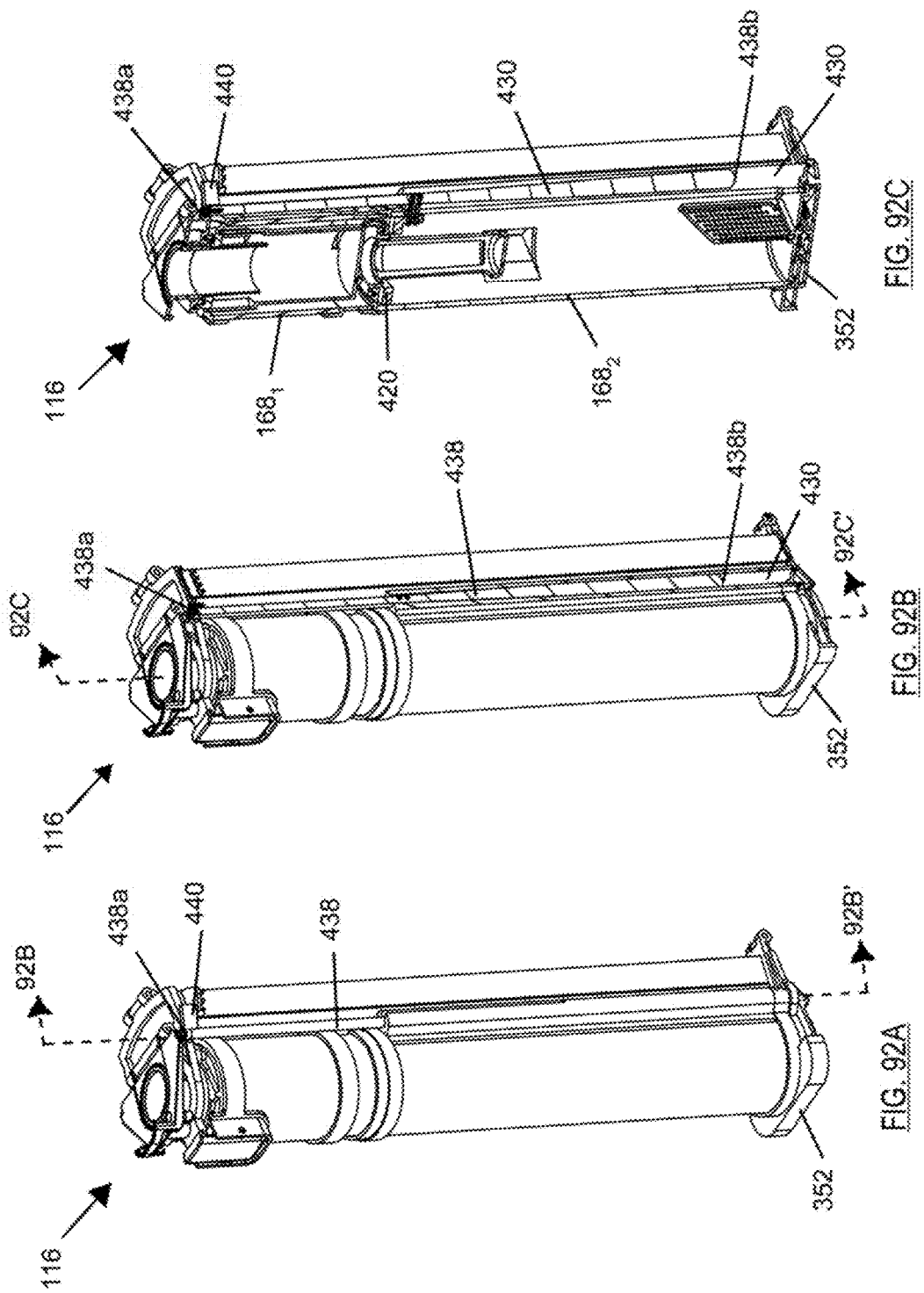

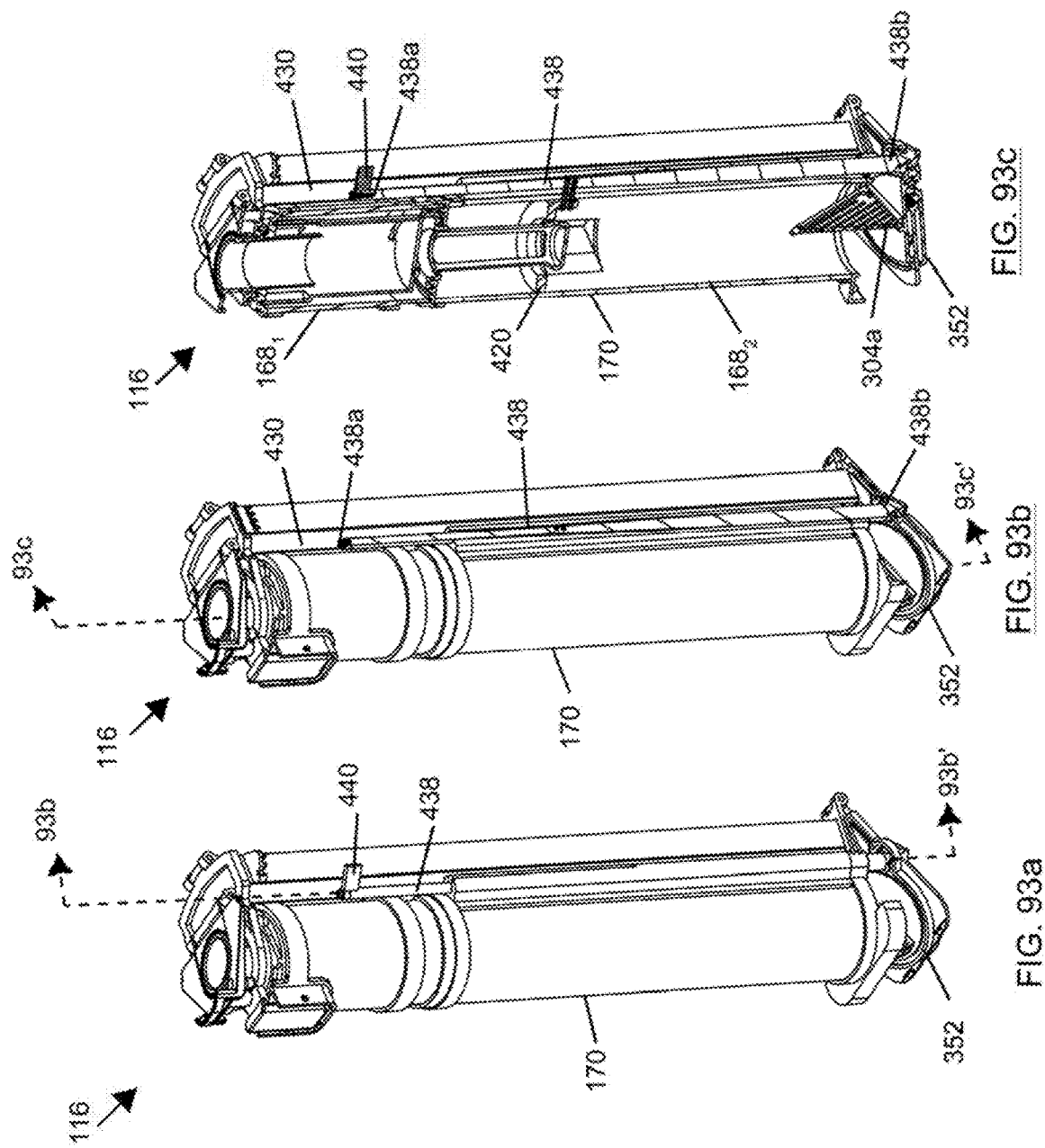

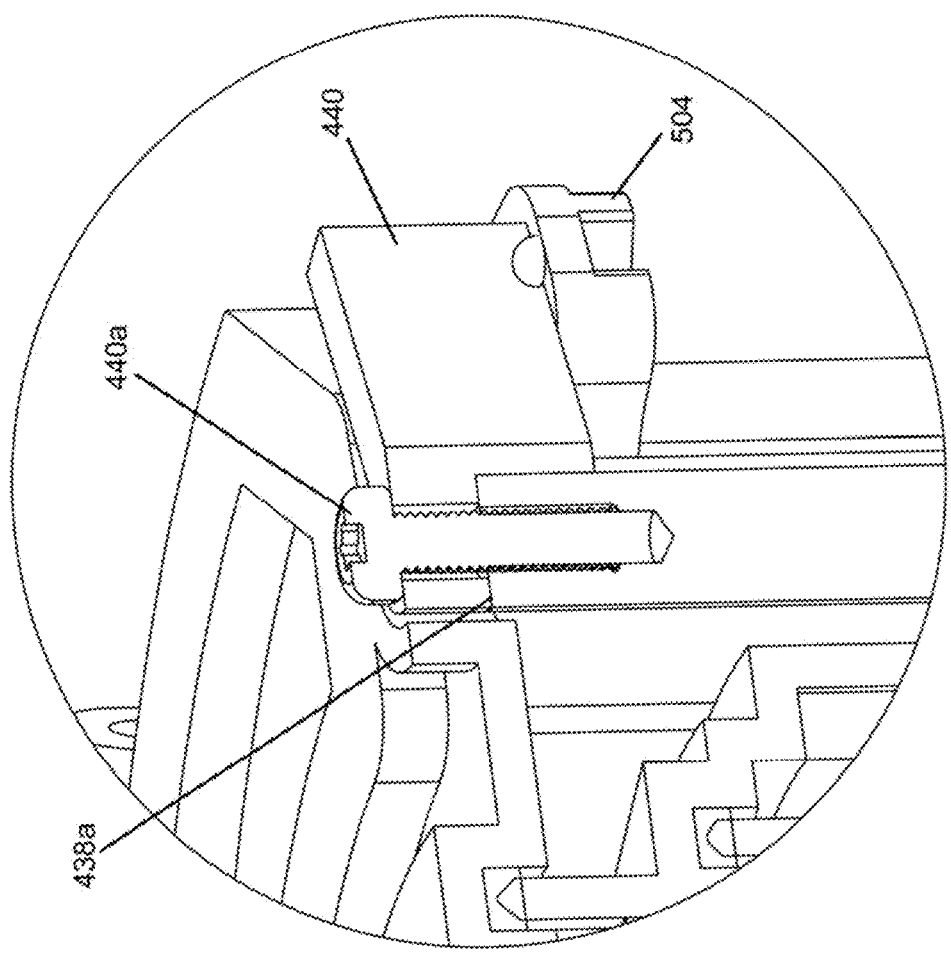
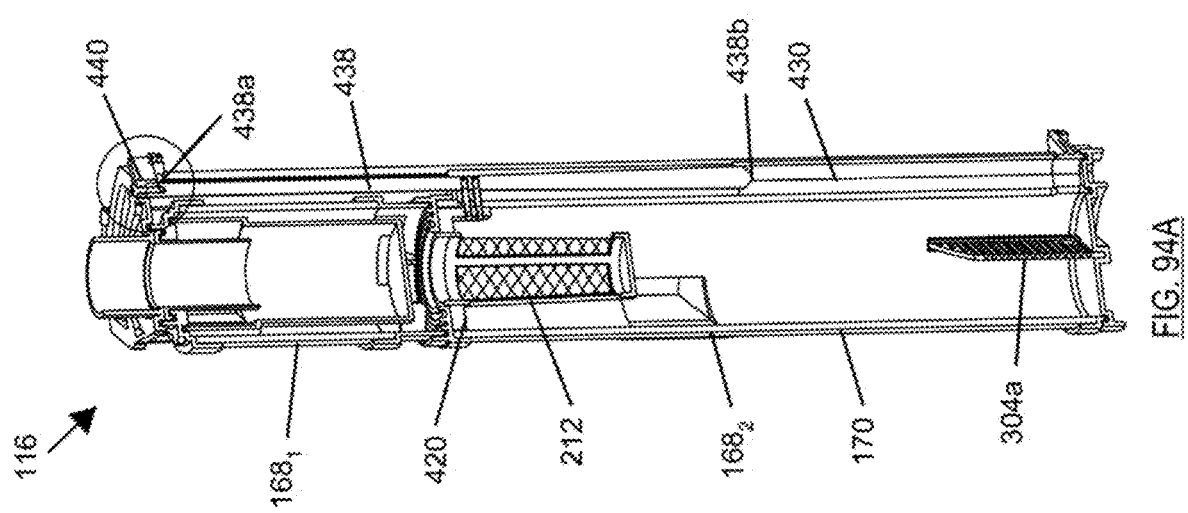
FIG. 94B
FIG. 94A

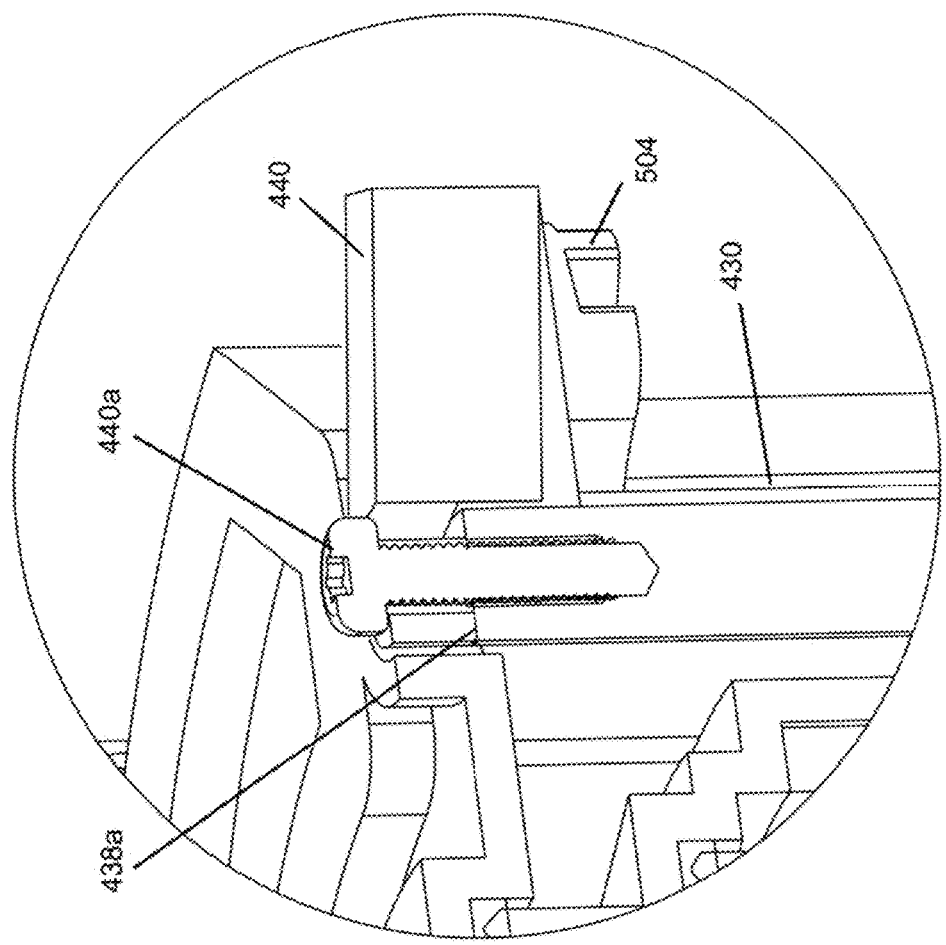
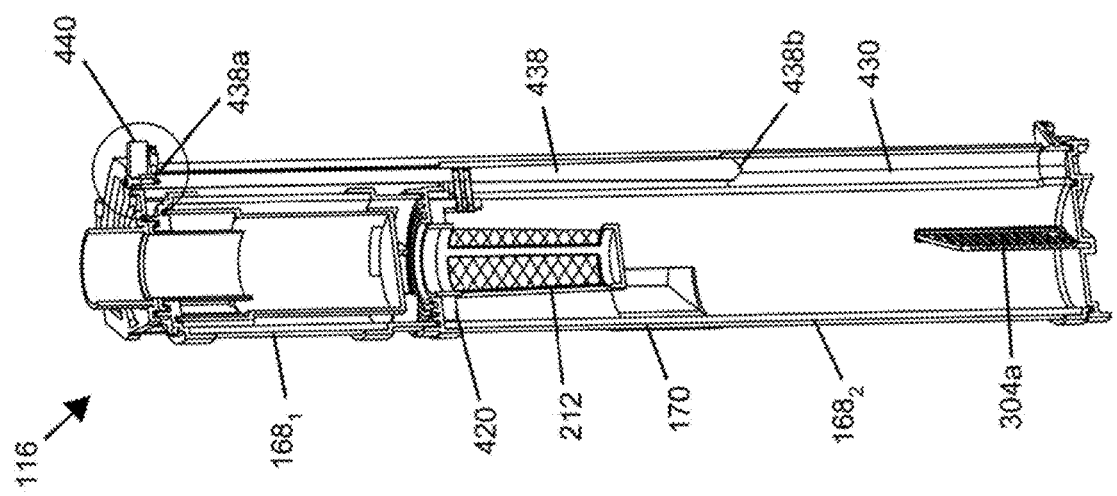

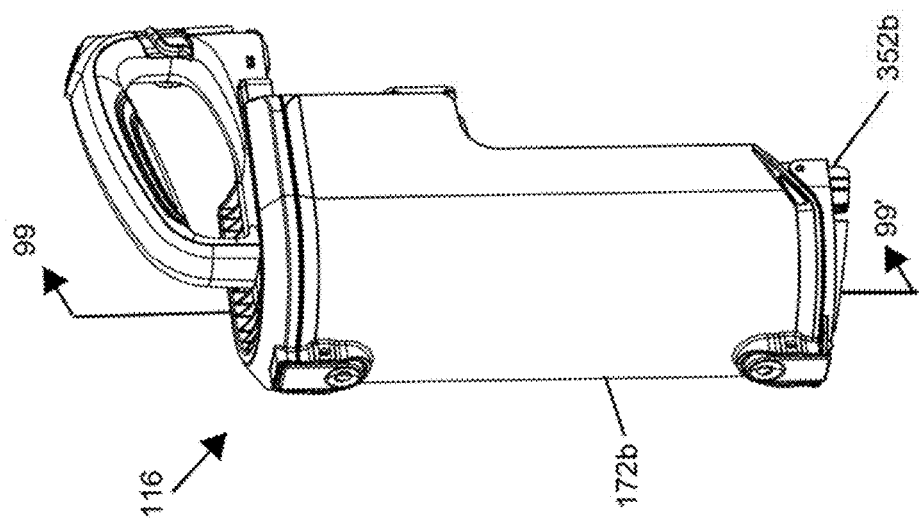

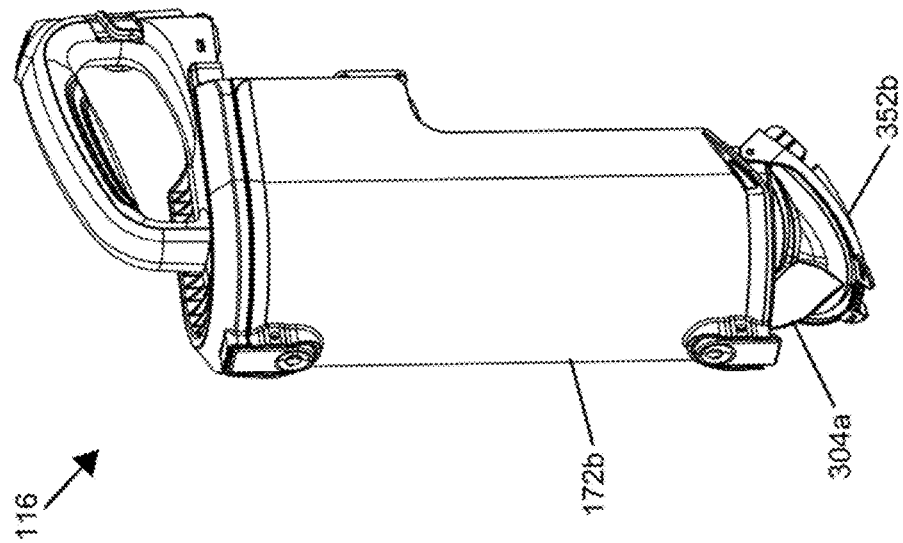

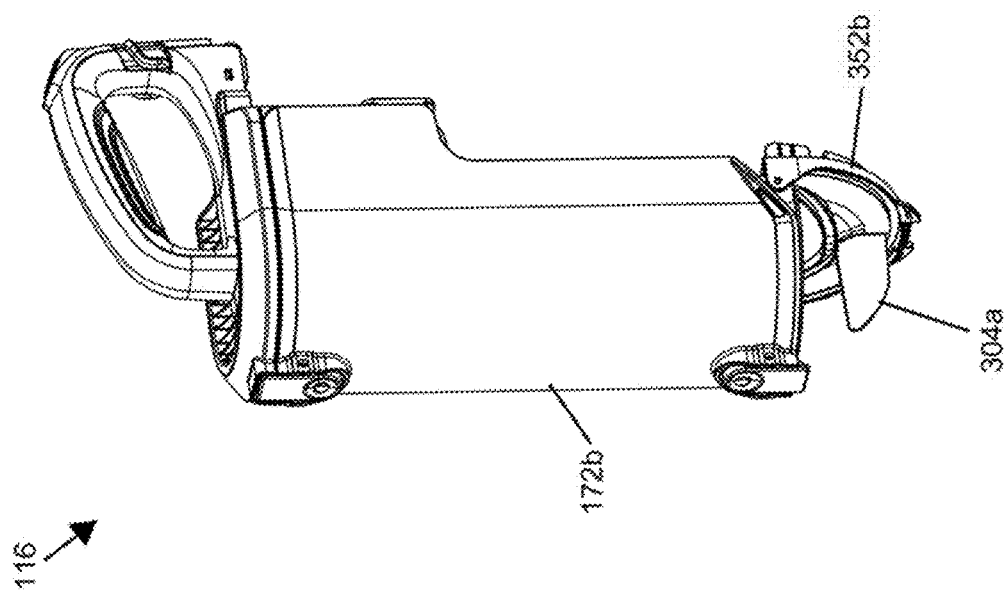

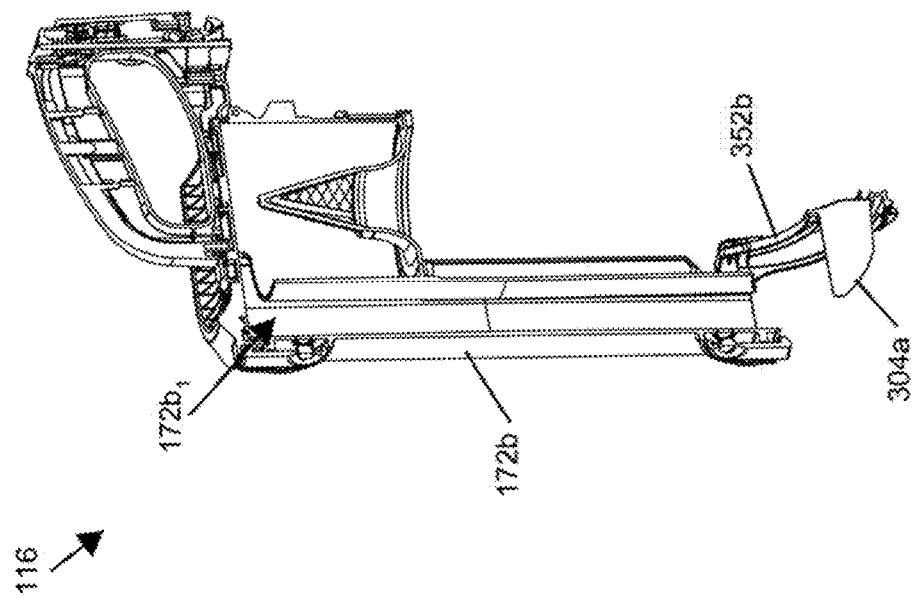

SURFACE CLEANING APPARATUS, CYCLONIC AIR TREATMENT MEMBER AND SURFACE CLEANING APPARATUS INCLUDING THE SAME

CROSS-REFERENCE TO RELATED APPLICATIONS

This application is a continuation-in-part of U.S. patent application Ser. No. 16/254,918, filed on Jan. 23, 2019, the entirety of which is incorporated herein by reference.

FIELD

This application relates to the field of cyclonic air treatment members and surface cleaning apparatus including the same.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, and hand carriable surface cleaning apparatus such as hand vacuums. Further, various designs for cyclonic hand vacuum cleaners, including battery operated cyclonic hand vacuum cleaners, are known in the art.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

In accordance with one broad aspect of this disclosure, which may be used by itself or any other aspect set out herein, a cyclone assembly is provided wherein the cyclone chamber includes a cyclone air inlet located in a medial position between a first cyclone end and a second cyclone end, and on the cyclone sidewall. For example, the cyclone air inlet may be located at a midpoint of the cyclone between the first and second cyclone ends. Alternately, the cyclone air inlet may be located in a medial position but closer to one of the first and second cyclone ends. For example, the cyclone may have an axial length (which may be a height of the cyclone if the cyclone is disposed with the first end positioned above the second end). Accordingly, the cyclone air inlet could be positioned towards the first end but spaced from the first end by, e.g., 10%, 20%, 30% or more of the axial length of the cyclone. Similarly, the cyclone air inlet could be positioned towards the second end but spaced from the second end by, e.g., 10%, 20%, 30% or more of the axial length of the cyclone. In this configuration, dirty air may enter the medial air inlet, and may flow inside of the cyclone chamber in two directions: (a) towards the first cyclone end, and (b) towards the second cyclone end. An advantage of this configuration is that cyclonic action may be promoted in both the upper and lower portions of the cyclone unit, which may tend to improve the dirt separation efficiency of the cyclone unit.

In accordance with this broad aspect, there is provided a surface cleaning apparatus having an air flow path from a dirty air inlet to a clean air outlet with a cyclone positioned in the air flow path, the cyclone comprising:

(a) a cyclone chamber having a cyclone axis of rotation, a first end, an axially spaced apart second end, a cyclone sidewall extending between first and second axially spaced apart end walls, a cyclone air inlet and a cyclone air outlet;

(b) the cyclone air outlet comprises an outlet conduit provided in the cyclone chamber and extending axially inwardly from the first end wall towards the second end wall; and, (c) the cyclone air inlet is provided in the cyclone sidewall adjacent an axially inward end of the outlet conduit, wherein the cyclone air inlet has first and second axially spaced apart ends, the first end of the cyclone air inlet is positioned closer to the first end wall of the cyclone chamber than the second end of the cyclone inlet.

In some embodiments, the first end of the cyclone air inlet may be positioned adjacent the axially inward end of the outlet conduit.

In some embodiments, the first end of the cyclone inlet may be positioned axially inwardly from the axially inward end of the outlet conduit.

In some embodiments, a flange may be provided extending at least part way around an inner surface of the cyclone sidewall and positioned overlying the first end of the cyclone air inlet.

In some embodiments, the cyclone air inlet may be a tangential inlet whereby air travels in a rotational direction in the cyclone chamber and the flange overlies the cyclone air inlet and has an angular extent at least a third of a perimeter of the cyclone sidewall in the rotational direction. Alternately, the flange may extend around 40%, 50%, 60%, 70%, 80%, 90% or all of the inner surface of the cyclone sidewall and has a central opening.

In some embodiments, the flange may be positioned axially inwardly from the axially inward end of the outlet conduit. In such a case, the first end of the cyclone inlet may be positioned axially inwardly from the axially inward end of the outlet conduit.

In some embodiments, the flange may extend radially into the cyclone chamber a particular distance and the flange may be adjustable whereby the variable distance is adjustable.

In some embodiments, the flange may comprises a resilient material.

In some embodiments, the cyclone chamber may have an axial length, a first portion at the first end of the cyclone chamber, a lower portion at the second end of the cyclone chamber and a medial portion between the first and second portions, the first portion has a length that is 20%, 25%, 30%, 35% or 40% of the axial length, the second portion has a length that is 20%, 25%, 30%, 35% or 40% of the axial length and the cyclone air inlet is provided on the medial portion.

In some embodiments, the outlet conduit may comprise a physical filtration material.

In some embodiments, the second end wall of the cyclone chamber may be openable.

In some embodiments, the surface cleaning apparatus may further comprise a generally axially extending member provided at the second end of the cyclone chamber.

In some embodiments, the generally axially extending member may be provided on the second end wall of the cyclone chamber.

In some embodiments, the cyclone chamber may further comprise a dirt outlet provided at the first end of the cyclone chamber and a dirt collection chamber exterior to the cyclone chamber. Optionally, the cyclone chamber and the dirt collection chamber may be concurrently openable.

In accordance with another broad aspect of this disclosure, which may be used by itself or any other aspect set out herein, a cyclone having a medial air inlet may have an external dirt collection chamber. Dust and dirt particles ejected into the external dirt chamber may be separated from the cyclonic air flow, and accordingly, may be prevented from being re-entrained into the flow of air. This, in turn, may increase the dirt separation efficiency of the cyclone unit. On entering the cyclone chamber at a medial location, heavier or denser dirt may travel to one end (e.g., a lower end) of the cyclone chamber with air that travels in that direction. Lighter or less dense dirt may travel to the other end (e.g., an upper end) of the cyclone chamber and may exit the cyclone chamber via a dirt outlet that is in communication with the external dirt collection chamber.

In accordance with this broad aspect, there is provided a surface cleaning apparatus having an air flow path from a dirty air inlet to a clean air outlet with a cyclone positioned in the air flow path, the cyclone comprising:
(a) a cyclone chamber having a cyclone axis of rotation, and axial length, a first end, an axially spaced apart second end, a cyclone sidewall extending between first and second axially spaced apart end walls, a cyclone air inlet, a cyclone air outlet and a dirt outlet provided at the first end of the cyclone chamber, wherein the cyclone chamber has a first portion at the first end of the cyclone chamber, a second portion at the second end of the cyclone chamber and a medial portion between the first and second portions, and the cyclone air inlet is provided in the medial portion; and,
(b) a dirt collection chamber exterior to the cyclone chamber.

In some embodiments, the first portion may have a length that is 10%, 20%, 25%, 30%, 35%, 40% or 50% of the axial length of the cyclone chamber, the second portion may have a length that is 10%, 20%, 25%, 30%, 35%, 40% or 50% of the axial length of the cyclone chamber.

In some embodiments, the cyclone air outlet may comprise an outlet conduit provided in the cyclone chamber and extending axially inwardly from the first end wall towards the second end wall and the cyclone inlet may be provided at an axial inward end of the outlet conduit.

In some embodiments, the cyclone inlet may be positioned axially inwardly from the axially inward end of the outlet conduit.

In some embodiments, the cyclone chamber and the dirt collection chamber may be concurrently openable.

In some embodiments, the dirt collection chamber may have a first end and an axially spaced apart second end wherein the second end of the cyclone chamber and the second end of the dirt collection chamber may be positioned proximate each other and are concurrently openable.

In some embodiments, the dirt collection chamber may have a first end and an axially spaced apart second end wherein the second end of the cyclone chamber and the second end of the dirt collection chamber may extend in a common plane and may be concurrently openable.

In some embodiments, the dirt outlet may be located between the first end wall and an end of the cyclone sidewall.

In some embodiments, the dirt outlet may comprise an opening in the cyclone sidewall.

In some embodiments, the dirt collection chamber may have a first end and an axially spaced apart second end wherein the second end of the cyclone chamber may comprise a dirt collection surface for coarser material entrained in an air stream entering the cyclone chamber and the second end of the dirt collection chamber may comprise a dirt collection surface for finer material entrained in the air stream entering the cyclone chamber.

In some embodiments, the surface cleaning apparatus may further comprise an energy storage member and a suction motor, and the surface cleaning apparatus may be operable in at least a low power mode in which the suction motor operates at a first power level and a high power mode in which the suction motor operates at a second power level that is higher than the first power level.

In some embodiments, the cyclone air outlet may comprise an outlet conduit provided in the cyclone chamber and extending axially inwardly from the first end wall towards the second end wall and the outlet conduit comprises a physical filtration material.

In some embodiments, the physical filtration material may comprise a screen.

In some embodiments, the physical filtration material may comprise a filter.

In accordance with another broad aspect of this disclosure, which may be used by itself or any other aspect set out herein, the cyclone chamber and/or the external dirt chamber may be provided with an axially extending member which may be planar and which may be porous. The axially extending member may help to dis-entrain dirt and debris from any air flow that is circulating in the external dirt chamber. Alternatively or in addition, the axially extending member may help to prevent dirt and debris being re-entrained into the air flow inside the cyclone chamber and/or the external dirt chamber.

In accordance with this broad aspect, there is provided a surface cleaning apparatus having an air flow path from a dirty air inlet to a clean air outlet the surface cleaning apparatus comprising:
(a) a cyclone comprising a cyclone chamber having a cyclone axis of rotation, an axial length, a first end, an axially spaced apart second end, a cyclone sidewall extending between first and second axially spaced apart end walls, a cyclone air inlet, a cyclone air outlet and a dirt outlet; and,
(b) a dirt collection chamber exterior to the cyclone chamber and in communication with the cyclone chamber via the dirt outlet, the dirt collection chamber comprising a first end, an axially spaced apart openable second end, a dirt collection chamber sidewall extending between first and second axially spaced apart end walls and at least one vertically extending member,
wherein the dirt outlet directs dirt into the first end of the dirt collection chamber and,
wherein the at least one vertically extending member is provided at the second end of the dirt collection chamber.

In some embodiments, the at least one vertically extending member may be positioned radially inwardly from the dirt collection chamber sidewall.

In some embodiments, the at least one vertically extending member may be generally planar.

In some embodiments, the at least one vertically extending member may be porous.

In some embodiments, the at least one vertically extending member may be removably mounted in the dirt collection chamber.

In some embodiments, the second end of the dirt collection chamber may be openable and the at least one vertically extending member may be removable from the dirt collection chamber when the second end is opened.

In some embodiments, the second end wall may be moveable between a closed position and an open position and the at least one vertically extending member may be mounted to the second end wall.

In some embodiments, the second end wall may be moveable between a closed position and an open position, the second end wall may have a first side that is moveably mounted to the dirt collection chamber sidewall and an opposed second side and a first portion of the at least one vertically extending member towards the first side may have a first axial length and a second portion of the at least one vertically extending member towards the second side may have a second axial length, which is less than the first axial length.

In some embodiments, the at least one vertically extending member may be generally planar and may have a generally right angle shape.

In accordance with another broad aspect of this disclosure, which may be used by itself or any other aspect set out herein, there is provided a surface cleaning apparatus having an air flow path from a dirty air inlet to a clean air outlet the surface cleaning apparatus comprising:
  (a) a cyclone comprising a cyclone chamber having a cyclone axis of rotation, an axial length, a first end, an axially spaced apart second end, a cyclone sidewall extending between first and second axially spaced apart end walls, a cyclone air inlet, a cyclone air outlet and a dirt outlet; and,
  (b) a dirt collection chamber exterior to the cyclone chamber and in communication with the cyclone chamber via the dirt outlet, the dirt collection chamber comprising a first end, an axially spaced apart second end, a dirt collection chamber sidewall extending between first and second axially spaced apart end walls and at least one vertically extending member.

In some embodiments, the at least one vertically extending member may be positioned in the dirt collection chamber at a location that is axially spaced from the dirt outlet.

In some embodiments, the at least one vertically extending member may be provided at an end of the cyclone chamber.

In some embodiments, the dirt outlet may be provided at a first end of the dirt collection chamber and the at least one vertically extending member may be provided at the second end of the dirt collection chamber.

In some embodiments, the at least one vertically extending member may be positioned radially inwardly from the dirt collection chamber sidewall.

In some embodiments, the at least one vertically extending member may be generally planar.

In some embodiments, the at least one vertically extending member may be porous.

In some embodiments, the at least one vertically extending member may be removably mounted in the dirt collection chamber.

In some embodiments, the second end of the dirt collection chamber may be openable and the at least one vertically extending member may be removable from the dirt collection chamber when the second end is opened.

In some embodiments, the second end wall may be moveable between a closed position and an open position and the at least one vertically extending member may be mounted to the second end wall.

In some embodiments, the second end wall may be moveable between a closed position and an open position, the second end wall may have a first side that is moveably mounted to the dirt collection chamber sidewall and an opposed second side and a first portion of the at least one vertically extending member towards the first side may have a first axial length and a second portion of the at least one vertically extending member towards the second side may have a second axial length, which is less than the first axial length.

In accordance with another broad aspect of this disclosure, which may be used by itself or any other aspect set out herein, a dirt ejection mechanism may be provided inside of the cyclone chamber. The dirt ejection mechanism may comprise a cleaning member which is configurable to translate axially inside of the cyclone chamber. Optionally, the cleaning member may axially translate inside of the cyclone chamber using a handle assembly which is driving connected to the cleaning member, and which is located external to the cyclone chamber. The cleaning member may contact part or all of a screen or shroud (a porous member) to remove dirt which aggregates on the screen or shroud.

In accordance with this broad aspect, there is provided a surface cleaning apparatus having an air flow path from a dirty air inlet to a clean air outlet with a cyclone positioned in the air flow path, the cyclone comprising:
  (a) a cyclone chamber having a cyclone axis of rotation, an axial length, a first end, an axially spaced apart second end, a cyclone sidewall extending between first and second axially spaced apart end walls, a cyclone air inlet, a cyclone air outlet provided at the first end of the cyclone chamber and comprising a porous member;
  (b) an cleaning member positioned in an annular region that is located between an inner surface of the cyclone sidewall and an outer surface of the porous member, the cleaning member is moveably mounted in the cyclone chamber and axially translatable in the annular region along an axial length of the porous member to the second end of the cyclone chamber; and,
  (c) an emptying handle assembly positioned exterior to the cyclone chamber and drivingly connected to the cleaning member.

In some embodiments, the cleaning member may be moveably mounted between a storage position in which the cleaning member is positioned adjacent the first end of the cyclone air outlet and an emptying position in which the cleaning member is positioned adjacent the second end of the cyclone chamber.

In some embodiments, the cyclone air outlet may comprise an outlet conduit extending axially into the cyclone chamber, the conduit may comprise an air impermeable portion and, when the cleaning member is in the first position, the cleaning member may be positioned at an axial elevation of the air impermeable portion.

In some embodiments, the cleaning member may engage at least a portion of the radial outer surface of the porous member as the cleaning member is translated in the annular region towards the second end.

In some embodiments, the surface cleaning apparatus may comprise a track, wherein at least a portion of the track may be positioned between the cyclone air outlet and the second end, and the emptying handle assembly travels in the track. In some embodiments, at least a portion of the track may be provided on the cyclone sidewall In some embodiments, the surface cleaning apparatus may further comprise a dirt collection chamber exterior to the cyclone chamber and the cyclone may comprise a dirt outlet provided at the first end.

In some embodiments, the cleaning member may be moveably mounted between a storage position in which the cleaning member may be positioned adjacent the first end of the cyclone air outlet and an emptying position.

In some embodiments, the dirt outlet may have an axial length extending axially between a first side and an axially spaced apart second side and the first side is positioned closer to the first end of the cyclone chamber than the second side of the dirt outlet and, when the cleaning member is in the storage position, the cleaning member may be located closer to the first end than the second side of the dirt outlet.

In some embodiments, the cyclone chamber may have a first portion at the first end of the cyclone chamber, a second portion at the second end of the cyclone chamber and a medial portion between the first and second portions and the cyclone air inlet may be provided in the medial portion.

In some embodiments, at least one vertically extending member may be axially positioned in the cyclone chamber between the cyclone air outlet and the second end of the cyclone chamber and the cleaning member may travel along at least a portion of an axial length of the vertically extending member as the cleaning member travels to the second end of the cyclone chamber.

In some embodiments, the second end wall may be openable, the second end wall may be securable in a closed position by a door lock and at least one of the emptying handle assembly and the cleaning member may be operatively engageable with the door lock.

In some embodiments, the emptying handle assembly may comprise a handle and the emptying handle assembly is reconfigurable between an emptying configuration and a storage configuration in which the handle is recessed towards the cyclone.

In accordance with another broad aspect of this disclosure, which may be used by itself or any other aspect set out herein, there is provided a surface cleaning apparatus having an air flow path from a dirty air inlet to a clean air outlet with a cyclone positioned in the air flow path, the cyclone comprising:
 (a) a cyclone chamber having a cyclone axis of rotation, an axial length, a first end, an axially spaced apart second end, a cyclone sidewall extending between first and second axially spaced apart end walls, a cyclone air inlet, a cyclone air outlet provided at the first end of the cyclone chamber and comprising a porous member; the axially spaced apart second end wall is moveable between a closed position and an open position in which the cyclone chamber is emptyable;
 (b) an cleaning member positioned in an annular region that is located between an inner surface of the cyclone sidewall and an outer surface of the porous member, the cleaning member is moveably mounted in the cyclone chamber and axially translatable in the annular region along an axial length the porous member to the second end of the cyclone chamber;
 (c) an emptying handle assembly; and,
 (d) a door lock securing the openable second end wall in a closed position and at least one of the emptying handle assembly and the cleaning member is operatively engageable with the door lock.

In some embodiments, the cleaning member may be moveable mounted between a storage position in which the cleaning member is positioned adjacent the first end of the cyclone air outlet and an emptying position in which cleaning member is positioned adjacent the second end of the cyclone chamber.

In some embodiments, the surface cleaning apparatus may comprise a track, wherein at least a portion of the track is positioned between the cyclone air outlet and the second end, and the emptying handle assembly travels in the track.

In some embodiments, at least a portion of the track may be provided on the cyclone sidewall.

In some embodiments, the surface cleaning apparatus may further comprise a dirt collection chamber exterior to the cyclone chamber and the cyclone comprises a dirt outlet provided at the first end.

In some embodiments, the cleaning member may be moveable mounted between a storage position in which the cleaning member is positioned adjacent the first end of the cyclone air outlet and an emptying position.

In some embodiments, the cyclone chamber may have a first portion at the first end of the cyclone chamber, a second portion at the second end of the cyclone chamber and a medial portion between the first and second portions and the cyclone air inlet is provided in the medial portion.

In some embodiments, the at least one vertically extending member may be axially positioned in the cyclone chamber between the cyclone air outlet and the second end of the cyclone chamber and the cleaning member travels along at least a portion of an axial length of the vertically extending member as the cleaning member travels to the second end of the cyclone chamber.

In some embodiments, the emptying handle assembly may comprise a handle and the emptying handle assembly is reconfigurable between an emptying configuration and a storage configuration in which the handle is recessed towards the cyclone.

In accordance with another broad aspect of this disclosure, which may be used by itself or any other aspect set out herein, there is provided a surface cleaning apparatus having an air flow path from a dirty air inlet to a clean air outlet with a cyclone positioned in the air flow path, the cyclone comprising:
 (a) a cyclone chamber having a cyclone axis of rotation, an axial length, a first end, an axially spaced apart second end, a cyclone sidewall extending between first and second axially spaced apart end walls, a cyclone air inlet, a cyclone air outlet provided at the first end of the cyclone chamber and comprising a porous member;
 (b) an cleaning member positioned in an annular region that is located between an inner surface of the cyclone sidewall and an outer surface of the porous member, the cleaning member is moveably mounted in the cyclone chamber and axially translatable in the annular region along an axial length the porous member towards the second end of the cyclone chamber;
 (c) an emptying handle assembly; and,
 (d) at least one vertically extending member axially positioned in the cyclone chamber between the cyclone air outlet and the second end of the cyclone chamber and the cleaning member travels along at least a portion of an axial length of the vertically extending member as the cleaning member travels towards the second end of the cyclone chamber.

In accordance with another broad aspect of this disclosure, which may be used by itself or any other aspect set out herein, a vertically extending member is provided in the cyclone chamber. The vertically extending member may be solid (i.e., it may have no holes or air permeable media). Alternately, the vertically extending member may be porous (e.g., a screen). The porous member may be planar and may extend upwardly from, e.g., the floor of the cyclone chamber. Alternately, it may be positioned spaced from the cyclone chamber floor and below the cyclone air outlet and/or it may extend upwardly and extend around part of the cyclone chamber (e.g., it may be configured as part of a spiral).

In accordance with this aspect, there is provided a surface cleaning apparatus having an air flow path from a dirty air inlet to a clean air outlet with a cyclone positioned in the air flow path, the cyclone comprising:
 (a) a cyclone chamber having a cyclone axis of rotation, and axial length, a first end, an axially spaced apart second end, a cyclone sidewall extending between first and second axially spaced apart end walls, a cyclone air inlet, a cyclone air outlet provided at the first end of the cyclone chamber and a dirt outlet provided at the first end of the cyclone chamber, wherein the cyclone chamber has a first portion at the first end of the cyclone chamber, a second portion at the second end of the cyclone chamber and a medial portion between the first and second portions and the cyclone air inlet is provided in the medial portion; and,
 (b) at least one vertically extending member positioned in the cyclone chamber positioned between the cyclone air outlet and the second end of the cyclone chamber.

In some embodiments, the at least one vertically extending member may be provided at the second end of the cyclone chamber.

In some embodiments, at least one vertically extending member may be positioned radially inwardly from the cyclone sidewall.

In some embodiments, the at least one vertically extending member may be generally planar.

In some embodiments, the at least one vertically extending member may be generally planar.

In some embodiments, the at least one vertically extending member may be porous.

In some embodiments, the at least one vertically extending member may be removably mounted in the cyclone chamber.

In some embodiments, the second end of the cyclone chamber may be openable and the at least one vertically extending member may be removable from the cyclone chamber when the second end is opened.

In some embodiments, the second end wall may be moveable between a closed position and an open position and the at least one vertically extending member may be mounted to the second end wall.

In some embodiments, the second end wall may be moveable between a closed position and an open position, the second end wall may have a first side that is moveably mounted to the cyclone sidewall and an opposed second side and a first portion of the at least one vertically extending member towards the first side may have a first axial length and a second portion of the at least one vertically extending member towards the second side has a second axial length, which is less than the first axial length.

In some embodiments, the at least one vertically extending member may be generally planar and has a generally right angle shape.

In some embodiments, the at least one vertically extending member may be provided on the cyclone sidewall.

In some embodiments, the at least one vertically extending member may comprise a first vertically extending member provided on the cyclone sidewall and a second vertically extending member provided on the cyclone sidewall and angularly rotated around the cyclone sidewall from the first vertically extending member.

In some embodiments, the cyclone air outlet may comprise an outlet conduit provided in the cyclone chamber and extending axially inwardly from the first end wall towards the second end wall and the cyclone inlet may be provided at an axial inward end of the outlet conduit.

In accordance with this aspect, there is also provided a surface cleaning apparatus having an air flow path from a dirty air inlet to a clean air outlet with a cyclone positioned in the air flow path, the cyclone comprising:
 (a) a cyclone chamber having a cyclone axis of rotation, an axial length, a first end, an axially spaced apart second end, a cyclone sidewall extending between first and second axially spaced apart end walls, a cyclone air inlet, a cyclone air outlet provided at the first end of the cyclone chamber and a dirt outlet provided at the first end of the cyclone chamber, wherein the cyclone chamber has a first portion at the first end of the cyclone chamber, a second portion at the second end of the cyclone chamber and a medial portion between the first and second portions; and,
 (b) at least one vertically extending member positioned in the cyclone chamber between the cyclone air outlet and the second end of the cyclone chamber.

In some embodiments, the at least one vertically extending member may be provided at the second end of the cyclone chamber and radially inwardly from the cyclone sidewall.

In some embodiments, the at least one vertically extending member may be generally planar.

In some embodiments, the at least one vertically extending member may be porous.

In some embodiments, the at least one vertically extending member may be porous.

In some embodiments, the second end of the cyclone chamber may be openable and the at least one vertically extending member may be removable from the cyclone chamber when the second end is opened.

In some embodiments, the second end wall may be moveable between a closed position and an open position and the at least one vertically extending member is mounted to the second end wall.

In some embodiments, the second end wall may be moveable between a closed position and an open position, the second end wall has a first side that may be moveably mounted to the cyclone sidewall and an opposed second side and a first portion of the at least one vertically extending member towards the first side may have a first axial length and a second portion of the at least one vertically extending member towards the second side has a second axial length, which is less than the first axial length.

In some embodiments, the at least one vertically extending member may be generally planar and has a generally right angle shape.

In some embodiments, the at least one vertically extending member may be provided on the cyclone sidewall.

In some embodiments, the at least one vertically extending member may comprise a first vertically extending member provided on the cyclone sidewall and a second vertically extending member provided on the cyclone sidewall and angularly rotated around the cyclone sidewall from the first vertically extending member.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 16 is a perspective view of an air treatment member in an open position with the cyclone outlet passage rotated out of the cyclone chamber and an open end door in accordance with an embodiment;

FIG. 17 is a perspective view of the air treatment member of FIG. 16 with a closed sidewall and an open end door in accordance with an embodiment;

FIG. 18 is a perspective view of an air treatment member in an open position with an open end door in accordance with an embodiment;

FIG. 19 is a perspective view of an air treatment member with a sidewall portion opened slightly;

FIG. 20 is a perspective view of the air treatment member of FIG. 19 with the sidewall portion opened fully;

FIG. 21 is a perspective view of the air treatment member of FIG. 19 with the sidewall portion opened fully and an axially extending member rotated;

FIG. 22 is a perspective view of an air treatment member in an open position in accordance with an embodiment;

FIG. 25 is a perspective view of an air treatment member in an open position in accordance with an embodiment;

FIG. 26 is a perspective view of the air treatment member of FIG. 25 in the open position with the cyclone outlet passage rotated out of the cyclone chamber;

FIG. 42 is a cross-sectional view of the air treatment member of FIG. 39 taken along the section line 42-42', according to some embodiments;

FIG. 43 is a sectional perspective of view of the air treatment member of FIG. 35 taken along the section line 43-43' of FIG. 35;

FIGS. 44A-44H are cross-sectional views of the air treatment member of FIG. 39 taken along the section line 42-42' in FIG. 39, according to various different embodiments;

FIG. 45 is a cross-sectional view of the air treatment member of FIG. 35 taken along the section line 36-36' in FIG. 35, in accordance with another embodiment;

FIG. 46 is a cross-sectional view of the air treatment member of FIG. 35 taken along the section line 36-36' in FIG. 35, in accordance with another embodiment;

FIG. 47 is a cross-sectional view of the air treatment member of FIG. 35 taken along the section line 36-36' in FIG. 35, in accordance with another embodiment;

FIG. 48 is a perspective cross-sectional view of the air treatment member of FIG. 37 taken along the section line 36-36' in FIG. 35 and showing an opened end wall;

FIG. 60 is a perspective cross-sectional view of the air treatment member of FIG. 35 taken along the section line 37-37' in FIG. 35, according to some embodiments;

FIG. 61 is a perspective cross-sectional view of the air treatment member of FIG. 35 taken along the section line 37-37' in FIG. 35, according to some embodiments;

FIG. 62 is a cross-sectional view of the air treatment member of FIG. 35 taken along the section line 37-37' in FIG. 35, according to some embodiments;

FIG. 63 is a cross-sectional view of the air treatment member of FIG. 35 taken along the sectional line 36-36' in FIG. 35 and showing an opened end wall, in accordance with some embodiments;

FIGS. 64-67 are perspective views of vertical screens, according to various different embodiments;

FIG. 68A is a perspective view of a vertical screen, according to another embodiment;

FIG. 68B is a top-down view of the vertical screen of FIG. 68A;

FIG. 68C is a side-view of the vertical screen of FIG. 68A;

FIG. 74A is a perspective view of a vertical screen, according to another embodiment;

FIG. 74B is a top-down view of the vertical screen of FIG. 74A;

FIG. 74C is a side-view of the vertical screen of FIG. 74A;

FIG. 75A is a perspective view of vertical screens, according to another embodiment;

FIG. 75B is a top-down view of the vertical screens of FIG. 75A;

FIG. 75C is a side-view of the vertical screens of FIG. 75A;

FIG. 76A is a perspective view of a vertical screen, according to another embodiment;

FIG. 76B is a top-down view of the vertical screen of FIG. 76A;

FIG. 76C is a side-view of the vertical screen of FIG. 76A;

FIG. 79 is a cross-sectional view of the air treatment member of FIG. 35 taken along the section line 79-79' in FIG. 35, in accordance with some embodiments;

FIG. 80 is the cross-sectional view of the air treatment member of FIG. 79 with an opened end wall;

FIG. 84 is a perspective view of a surface cleaning apparatus in accordance with an embodiment;

FIGS. 89A-89C are perspective cross-sectional views of the air treatment member of FIG. 84 taken along the section line 85-85' in FIG. 84 in accordance with another embodiment, and showing the cleaning member and handle assembly transitioning from a storage configuration to an emptying configuration;

FIG. 90A is a perspective cross-sectional view of the air treatment member of FIG. 84 taken along the section line 85-85' in FIG. 84 and showing a multi-inlet cyclone, in accordance with some embodiments;

FIG. 90B is a side perspective view of a cleaning member, in accordance with some embodiments;

FIG. 92A is a perspective view of an air treatment member, in accordance with an embodiment;

FIG. 92B is a perspective view of the air treatment member of FIG. 92A and showing a perspective cross-sectional view of a track for a handle assembly which is taken along section line 92B-92B' of FIG. 92A;

FIG. 92C is a perspective cross-sectional view of the air treatment member of FIG. 92A, taken along the section line 92C-92C' of FIG. 92B, and showing the cleaning member and handle assembly in a storage configuration;

FIG. 93A is a perspective view of the air treatment member of FIG. 92A and showing an opened end wall;

FIG. 93B is a perspective view of the air treatment member of FIG. 93 and showing a perspective cross-sectional view of the track for the handle assembly taken along the section line 93B-93B' of FIG. 93A;

FIG. 93C is a perspective cross-sectional view of the air treatment member of FIG. 93A, taken along the section line 93C-93C' of FIG. 93B, and showing an opened end wall;

FIG. 94A is the perspective cross-sectional view of the air treatment member of FIG. 92C, and showing a handle of the handle assembly in a storage position;

FIG. 94B is an enlarged perspective view of a portion of the air treatment member of FIG. 94A, and showing the handle in the storage position;

FIG. 95A is the perspective cross-sectional view of the air treatment member of FIG. 92C, and showing a handle of the handle assembly in an in-use position;

FIG. 95B is an enlarged perspective view of a portion of the air treatment member of FIG. 95B, and showing the handle in the in-use position;

FIG. 96 is a perspective view of an external dirt chamber of an air treatment member, according to some embodiments;

FIG. 97 is a perspective view of the external dirt chamber of the air treatment member of FIG. 96, showing a partially opened end wall;

FIG. 98 is a perspective view of the external dirt chamber of the air treatment member of FIG. 96, showing an opened end wall;

FIG. 99 is a perspective cross-sectional view of the external dirt chamber of the air treatment member of FIG. 96 taken along section line 99-99' of FIG. 96, in accordance with some other embodiments;

FIG. 100 is a perspective cross-sectional view of the external dirt chamber of FIG. 99, showing a partially opened end wall; and, FIG. 101 is a perspective cross-sectional view of the external dirt chamber of FIG. 99, showing an opened end wall.

DESCRIPTION OF EXAMPLE EMBODIMENTS

Figure 1:
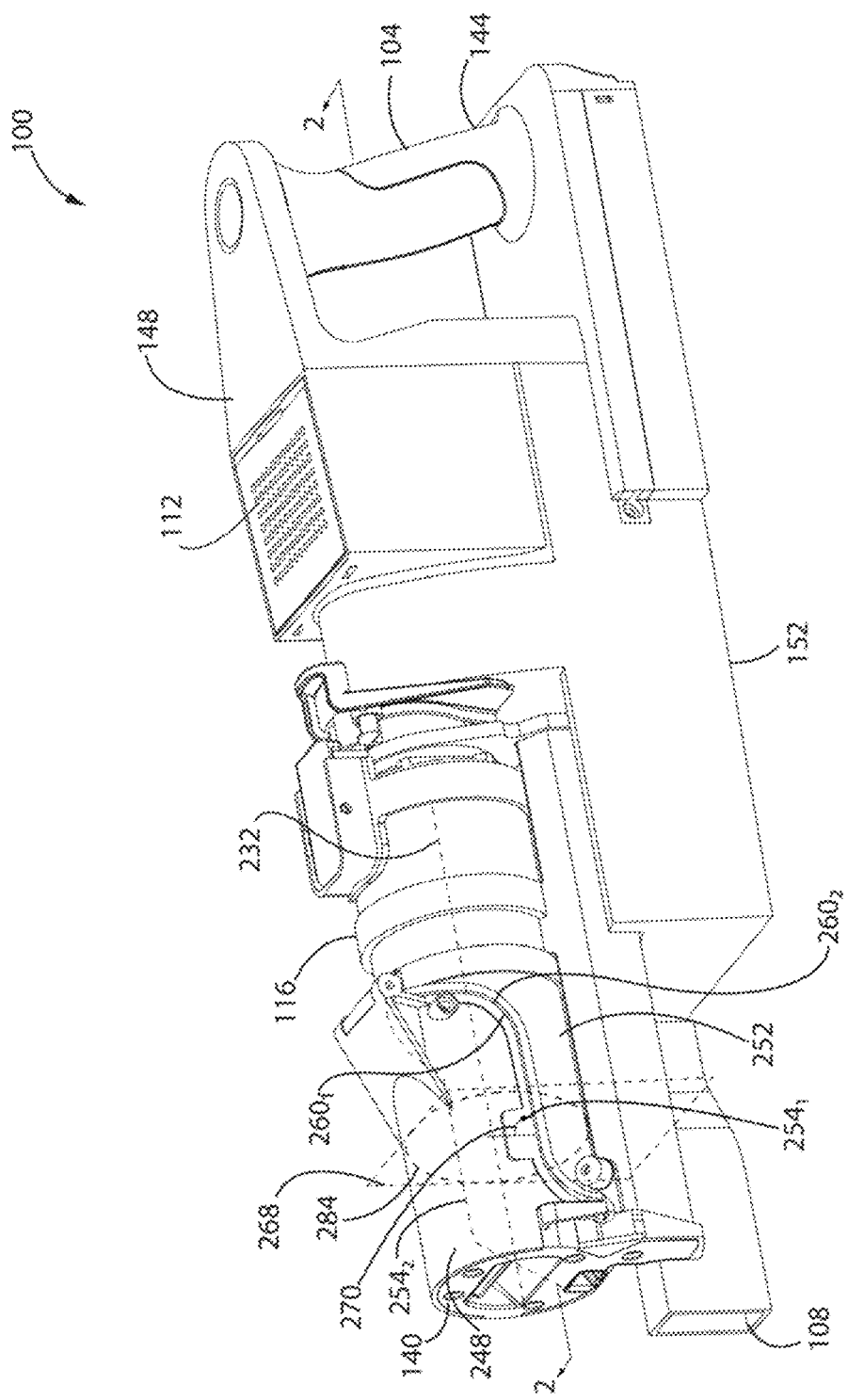
FIG. 1 is a perspective view of a surface cleaning apparatus in accordance with an embodiment.

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, two elements are said to be "parallel" where those elements are parallel and spaced apart, or where those elements are collinear.

Some elements herein may be identified by a part number, which is composed of a base number followed by an alphabetical or subscript-numerical suffix (e.g. 112a, or $112_1$). Multiple elements herein may be identified by part numbers that share a base number in common and that differ by their suffixes (e.g. $112_1$, $112_2$, and $112_3$). All elements with a common base number may be referred to collectively or generically using the base number without a suffix (e.g. 112).

General Description of a Hand Vacuum Cleaner

Referring to FIGS. 1-4, the following is a general discussion of embodiments of an apparatus 100, which provides a basis for understanding several of the features that are discussed herein. As discussed subsequently, each of the features may be used individually or in any particular combination or sub-combination in these or in other embodiments disclosed herein.

Embodiments described herein include an improved cyclonic air treatment member 116, and a surface cleaning apparatus 100 including the same. Surface cleaning apparatus 100 may be any type of surface cleaning apparatus, including for example a hand vacuum cleaner as shown in FIG. 1-2, a stick vacuum cleaner, an upright vacuum cleaner as shown in FIG. 3-4, a canister vacuum cleaner, an extractor, or a wet/dry type vacuum cleaner.

Figure 2:
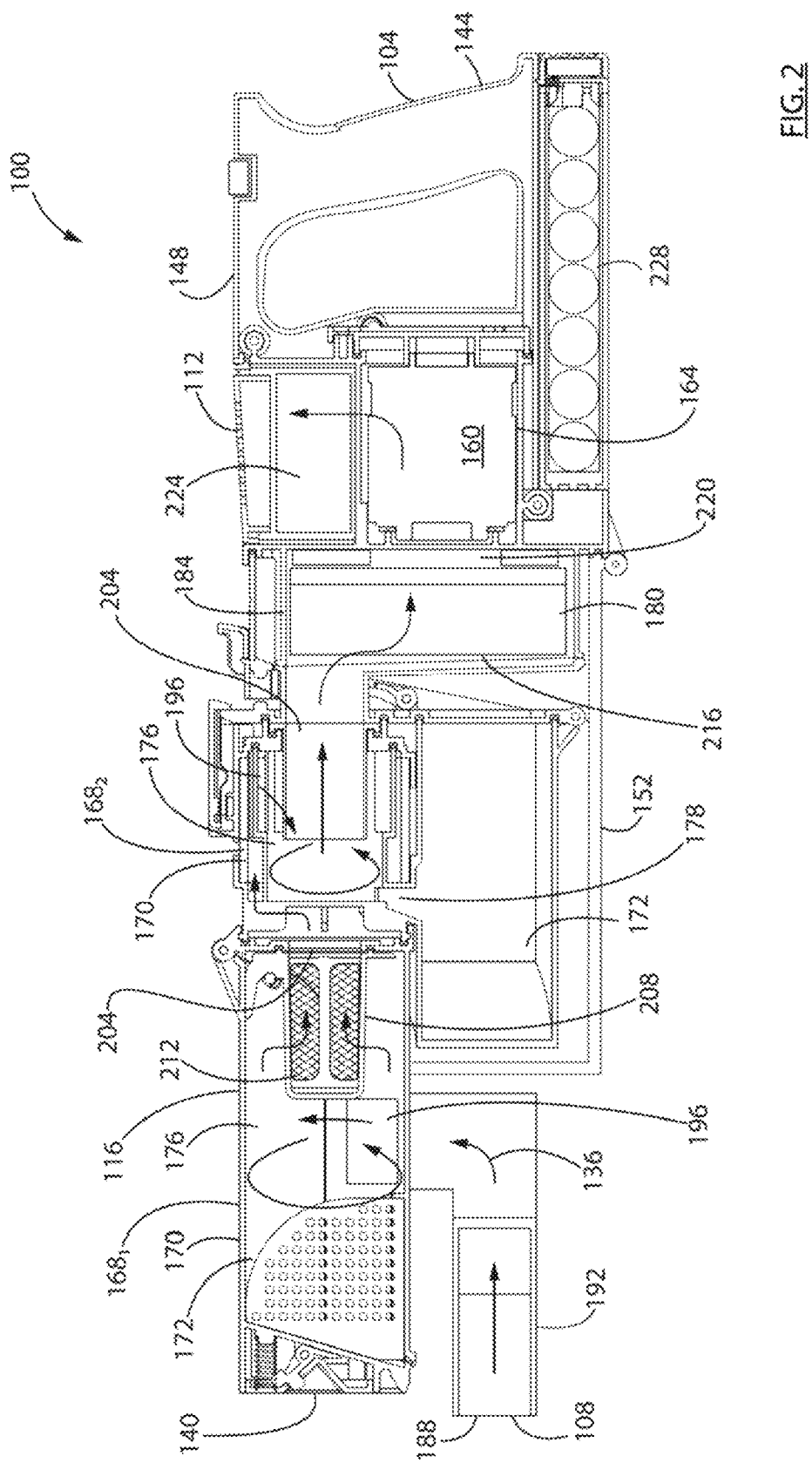
FIG. 2 is a cross-sectional view taken along line 2-2 in FIG. 1.

In FIGS. 1-2, surface cleaning apparatus 100 is illustrated as a hand vacuum cleaner, which may also be referred to also as a "handvac" or "hand-held vacuum cleaner". As used herein, a hand vacuum cleaner is a vacuum cleaner that can be operated to clean a surface generally one-handedly. That is, the entire weight of the vacuum may be held by the same one hand used to direct a dirty air inlet of the vacuum cleaner with respect to a surface to be cleaned. For example, handle 104 and dirty air inlet 108 may be rigidly coupled to each other (directly or indirectly), such as being integrally formed or separately molded and then non-removably secured together (e.g. adhesive or welding), so as to move as one while maintaining a constant orientation relative to each other. This is to be contrasted with canister and upright vacuum cleaners, whose weight is typically supported by a surface (e.g. a floor) during use. When a canister vacuum cleaner is operated, or when an upright vacuum cleaner is operated in a 'lift-away' configuration, a second hand is typically required to direct the dirty air inlet at the end of a flexible hose.

Figure 3:
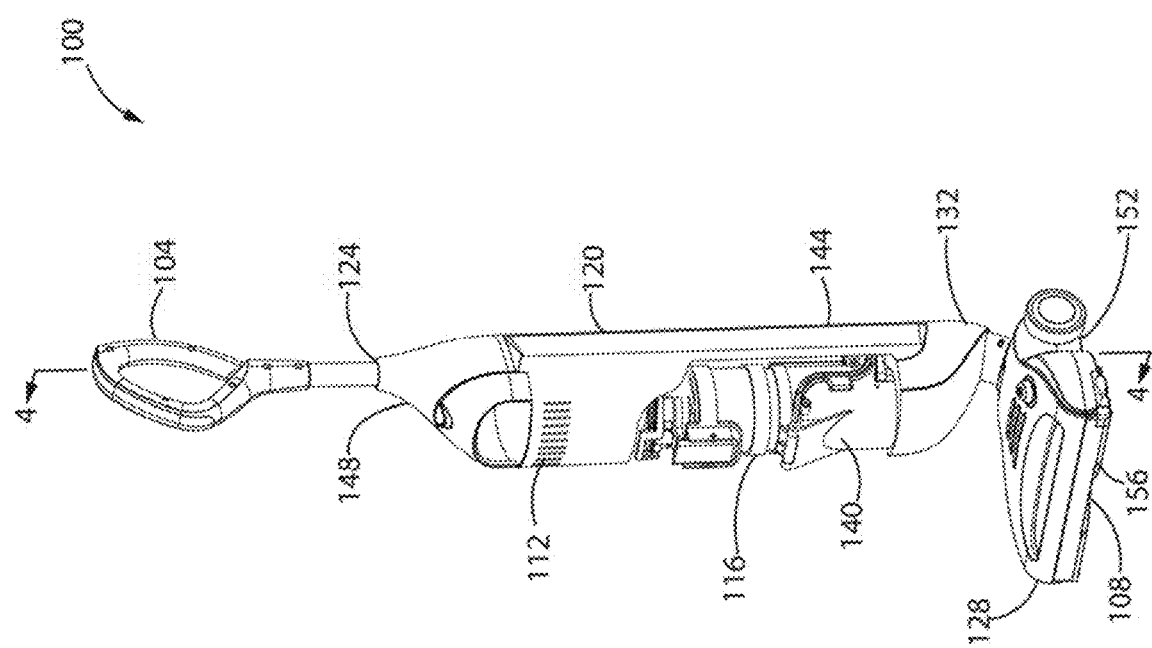
FIG. 3 is a perspective view of a surface cleaning apparatus in accordance with an embodiment.
Figure 4:
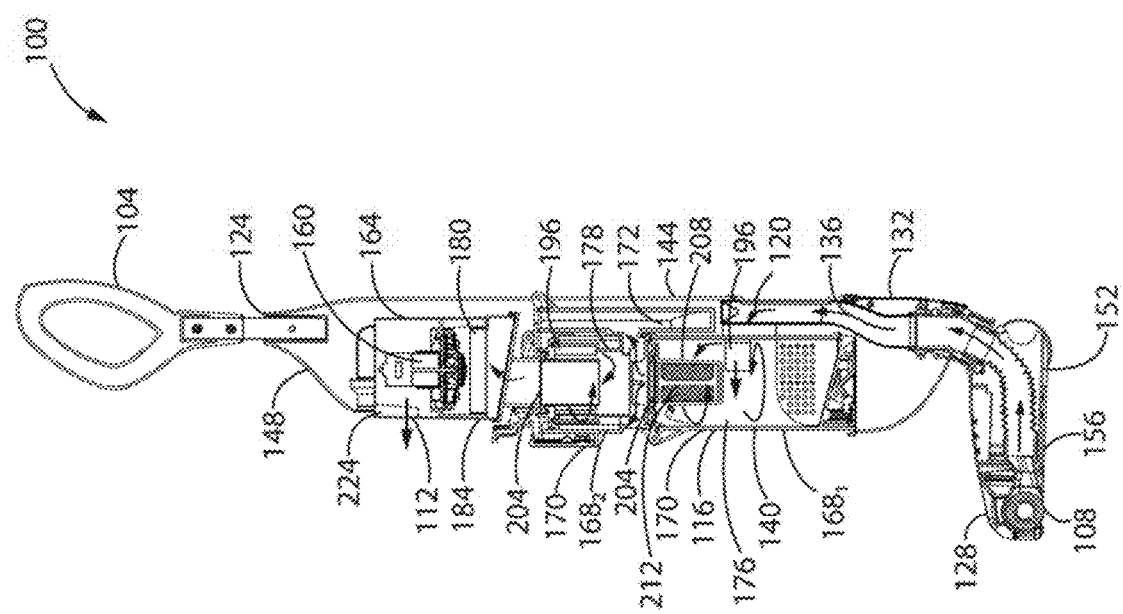
FIG. 4 is a cross-sectional view taken along line 4-4 in FIG. 3.

In the example of FIGS. 3-4, upright vacuum cleaner 100 is shown including an upright section 120. Handle 104 is connected to an upper end 124 of upright section 120, and a surface cleaning head 128 (also referred to as a 'floor cleaning head') is movably (e.g. pivotably) connected to a lower end 132 of upright section 120. Upright section 120 may be movable (e.g. pivotable) relative to surface cleaning head 128 between a storage position (shown) and a rearwardly reclined floor cleaning position.

Referring to FIGS. 1-4, surface cleaning apparatus 100 includes an air treatment member 116 (which may be permanently affixed to the main body or may be removable in part or in whole therefrom for emptying), a dirty air inlet 108, a clean air outlet 112, and an air flow path 136 extending between the dirty air inlet 108 and the clean air outlet 112.

Surface cleaning apparatus 100 has a front end 140, a rear end 144, an upper end (also referred to as the top) 148, and a lower end (also referred to as the bottom) 152. In the embodiment of FIGS. 1-2, dirty air inlet 108 is at a lower portion of apparatus front end 140 and clean air outlet 112 is at a rearward portion of apparatus 100 proximate apparatus rear end 144.

It will be appreciated that dirty air inlet 108 and clean air outlet 112 may be positioned in different locations of apparatus 100. For example, FIGS. 3-4 show an example in which dirty air inlet 108 is located at a lower end 156 of surface cleaning head 128, and clean air outlet 112 is located on apparatus front end 140.

Referring again to FIGS. 1-4, a suction motor 160 is provided to generate vacuum suction through air flow path 136, and is positioned within a motor housing 164. Suction motor 160 may be a fan-motor assembly including an electric motor and impeller blade(s). In the illustrated embodiment, suction motor 160 is positioned in the air flow path 136 downstream of air treatment member 116. In this configuration, suction motor 160 may be referred to as a "clean air motor". Alternatively, suction motor 160 may be positioned upstream of air treatment member 116, and referred to as a "dirty air motor".

In the illustrated embodiments, apparatus 100 is shown having two cyclonic cleaning stages $168_1$ and $168_2$ arranged in series with each other. It will be appreciated that air treatment member 116 may include a single cleaning stage (e.g., first cyclonic cleaning stage $168_1$ or second cyclonic cleaning stage $168_2$) or two or more cyclonic cleaning stages (e.g., both first and second cleaning stages $168_1$ and $168_2$). Each cyclonic cleaning stage 168 may include one cyclone 170 as shown, or many cyclones arranged in parallel with each other, and may include one dirt collection chamber 172 or many dirt collection chambers 172, of any suitable configuration. For example, FIG. 2 exemplifies an embodiment wherein second cyclonic cleaning stage $168_2$ includes a cyclone chamber 176 having a dirt outlet 178 to an external dirt collection chamber 172. Each cyclone 170 may have its own dirt collection chamber as shown. Alternatively or in addition, two or more cyclones 170 may share a common dirt collection chamber. Alternately, as also exemplified in FIG. 2, a cyclone $168_1$ may have a dirt collection region in a portion of the cyclone chamber (e.g., a lower end of a cyclone chamber or an end of the cyclone chamber distal to the air outlet end of the cyclone chamber).

Air treatment member 116 is configured to remove particles of dirt and other debris from the air flow. In the illustrated example, air treatment member 116 includes a cyclone assembly (also referred to as a "cyclone bin assembly") having at least a first cyclonic cleaning stage $168_1$ with a cyclone 170 and a dirt collection chamber 172 (also referred to as a "dirt collection region", "dirt collection bin", "dirt bin", or "dirt chamber"). Cyclone 170 has a cyclone chamber 176. As exemplified, dirt collection chamber 172 may be external to the cyclone chamber 176 (i.e. dirt collection chamber 172 may have a discrete volume from that of cyclone chamber 176), or dirt collection chamber 172 may be a dirt collection region located partially or entirely within a volume of cyclone chamber 176. Cyclone 170 and dirt collection chamber 172 may be of any configuration suitable for separating dirt from an air stream and collecting the separated dirt respectively.

Referring to FIGS. 2 and 4, surface cleaning apparatus 100 may include a pre-motor filter 180 provided in the air flow path 136 downstream of air treatment member 116 and upstream of suction motor 160. Pre-motor filter 180 may be formed from any suitable physical, porous filter media. For example, pre-motor filter 180 may be one or more of a foam filter, felt filter, HEPA filter, or other physical filter media. In some embodiments, pre-motor filter 180 may include an electrostatic filter, or the like. As shown, pre-motor filter 180 may be located in a pre-motor filter housing 184 that is external to the air treatment member 116.

As shown in FIG. 2, dirty air inlet 108 may be the inlet end 188 of an air inlet conduit 192. Optionally, inlet end 188 of air inlet conduit 192 can be used as a nozzle to directly clean a surface. Alternatively, or in addition to functioning as a nozzle, air inlet conduit 192 may be connected (e.g. directly connected) to the downstream end of any suitable accessory tool such as a rigid air flow conduit (e.g., an above floor cleaning wand), a crevice tool, a mini brush, and the like. As shown, dirty air inlet 108 may be positioned forward of air treatment member 116, although this need not be the case.

In the embodiments of FIGS. 2 and 4, the air treatment member 116 comprises one or more cyclonic cleaning stages 168, the air treatment air inlet is a cyclone air inlet 196 (e.g. a tangential air inlet of first stage 168₁), and the air treatment member air outlet is a cyclone air outlet 204 (e.g. of second stage 168₂). The cyclone air inlet 196 may have a length (or height) 196a in the direction of the cyclone axis 232 (see e.g., FIGS. 45-47). In operation, after activating suction motor 160, dirty air enters apparatus 100 through dirty air inlet 108 and is directed along air inlet conduit 192 to the cyclone air inlet 196 of first stage 168₁. As shown, cyclone air inlet 196 may direct the dirty air flow to enter cyclone chamber 176 in a tangential direction so as to promote cyclonic action. Dirt particles and other debris may be disentrained (i.e. separated) from the dirty air flow as the dirty air flow travels through first cyclonic stage 168₁—from the respective cyclone air inlet 196 to cyclone air outlet 204. The disentrained dirt particles and debris may collect in dirt collection chamber or region 172 of first stage 168₁, where the dirt particles and debris may be stored until the dirt collection region is emptied. From cyclone air outlet 204, the air may flow downstream through second stage 168₂—from the respective cyclone air inlet(s) 196 to cyclone air outlet 204, whereby separated dirt particles may discharge through dirt outlet 178 into dirt collection chamber 172.

Air exiting a cyclone chamber 176 may pass through an outlet passage 208 located upstream of the cyclone air outlet 204. Cyclone chamber outlet passage 208 may also act as a vortex finder to promote cyclonic flow within cyclone chamber 176. In some embodiments, cyclone outlet passage 208 may include a porous member, such as a screen or shroud 212 (e.g. a fine mesh screen) in the air flow path 136 to remove large dirt particles and debris, such as hair, remaining in the exiting air flow. The screen or shroud 212 may have any configurations known in the art. For example, the shroud 212 may be cylindrical (e.g., FIGS. 1-31, 49-50), conical or frusto-concial (see e.g., FIGS. 45-48). The shroud 212 may also have any suitable axial length 502. For example, the axial length 502 of the shroud 212 may be approximately $\frac{1}{5}^{th}$ of the cyclone height 320 (see e.g., FIG. 46), $\frac{2}{5}^{th}$ of the cyclone height (e.g., FIG. 47), $\frac{3}{5}^{th}$ of the cyclone height (e.g., FIG. 45), or $\frac{4}{5}^{th}$ of the cyclone height. In other cases, the axial height 502 of the shroud 212 may be expressed as a proportion of the cyclone inlet height 196a. For example, the axial height 502 of the shroud 212 may be in a range of 0.25-40, 0.50-20, 0.50-20, 1-5, or 1.5 to 3 times the cyclone inlet height 196a.

From cyclone air outlet 204 of second stage 168₂, the air flow may be directed into pre-motor filter housing 184 at an upstream side 216 of pre-motor filter 180. The air flow may pass through pre-motor filter 180, and then exit through pre-motor filter housing air outlet 220 into motor housing 164. At motor housing 164, the clean air flow may be drawn into suction motor 160 and then discharged from apparatus 100 through clean air outlet 112. Prior to exiting the clean air outlet 112, the treated air may pass through a post-motor filter 224, which may include one or more layers of filter media.

Power may be supplied to suction motor 160 and other electrical components of apparatus 100 from an onboard energy storage member 228 (FIG. 2) which may include, for example, one or more batteries or other energy storage device. The energy storage member 228 may be operable in either a low power mode or a high power mode. In the low power mode, the energy storage member 228 may operate the suction motor 160 at a low power level. For example, the low power mode may be used to extend the run time of the energy storage member 228. In contrast, in the high power mode, the energy storage member 228 may operate the suction motor 160 at a high power level. In various cases, the high power mode may be used to increase the cleaning performance of the apparatus 100, which may result in a shorter run time. In the example of FIG. 2, apparatus 100 includes a battery pack 228. Battery pack 228 may be permanently connected to apparatus 100 and rechargeable in-situ, or removable from apparatus 100. In the example shown, battery pack 228 is located below handle 104. Alternatively or in addition to battery pack 228, power may be supplied to apparatus 100 by an electrical cord (not shown) connected to apparatus 100 that can be electrically connected to mains power by at a standard wall electrical outlet.

Cyclone with an Openable Sidewall

The following is a discussion of a cyclone with an openable sidewall, which may be may be used by itself or with one or more of the moveable screen, the dual end walls, the medial cyclone air inlet, the exterior dirt collection chamber the axially extending member (vertically extending screen), and the dirt ejection mechanism.

A cyclone separates dirt and debris from an air stream that is moved through a cyclone chamber. Separated dirt and debris may be collected in a dirt collection chamber that is external to the cyclone chamber (e.g., vie a cyclone chamber dirt outlet) or separated dirt and debris may be collected in a dirt collection region that is interior of the cyclone as exemplified by cyclone 168₁ of FIG. 2. A cyclone may be emptyable through an openable end door. However, some separated dirt and debris may collect on other interior surfaces of the cyclone, which may not be easily removed through the openable end door. For example, dirt and debris may accumulate or become entangled on the screen of a vortex finder of the cyclone. If not removed, this dirt and debris will occupy space inside the cyclone thereby reducing the volume available for cyclonic flow, which may reduce the dirt separation efficiency of the air treatment member. According to this aspect, a cyclone chamber is openable other than by merely opening the end of the cyclone chamber.

Figure 5:
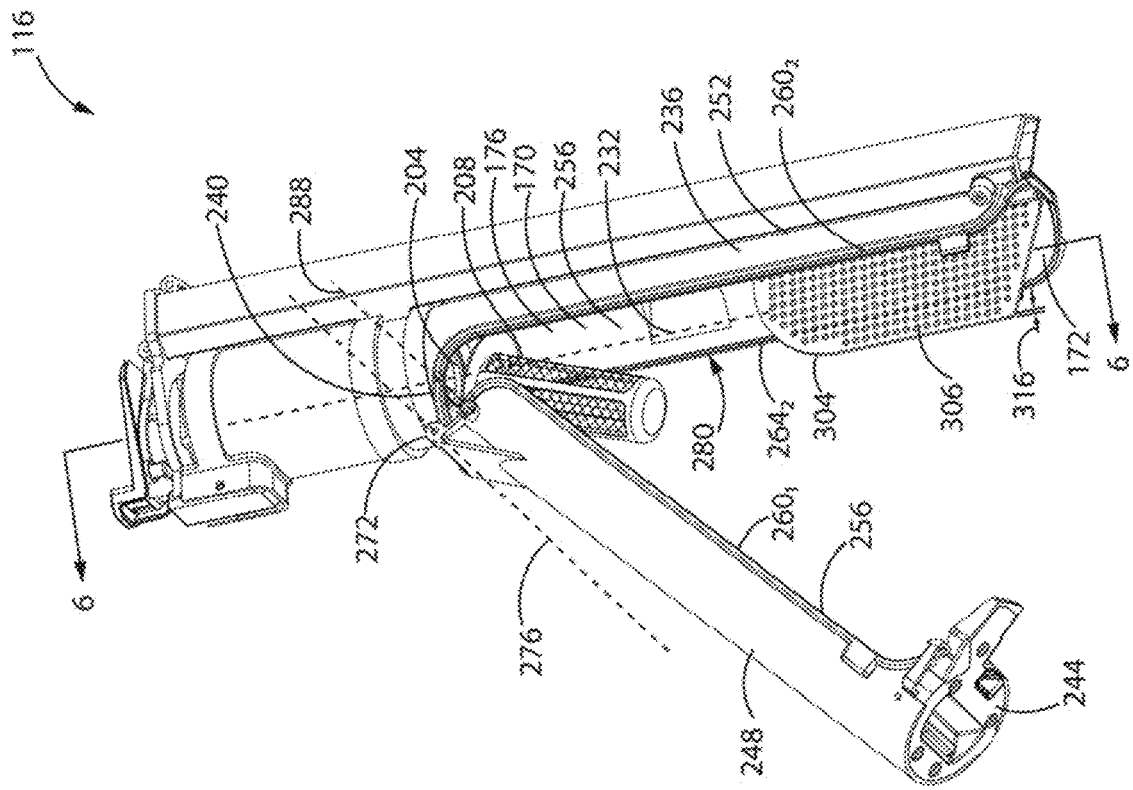
FIG. 5 is a perspective view of an air treatment member in an open position, in accordance with an embodiment.
Figure 6:
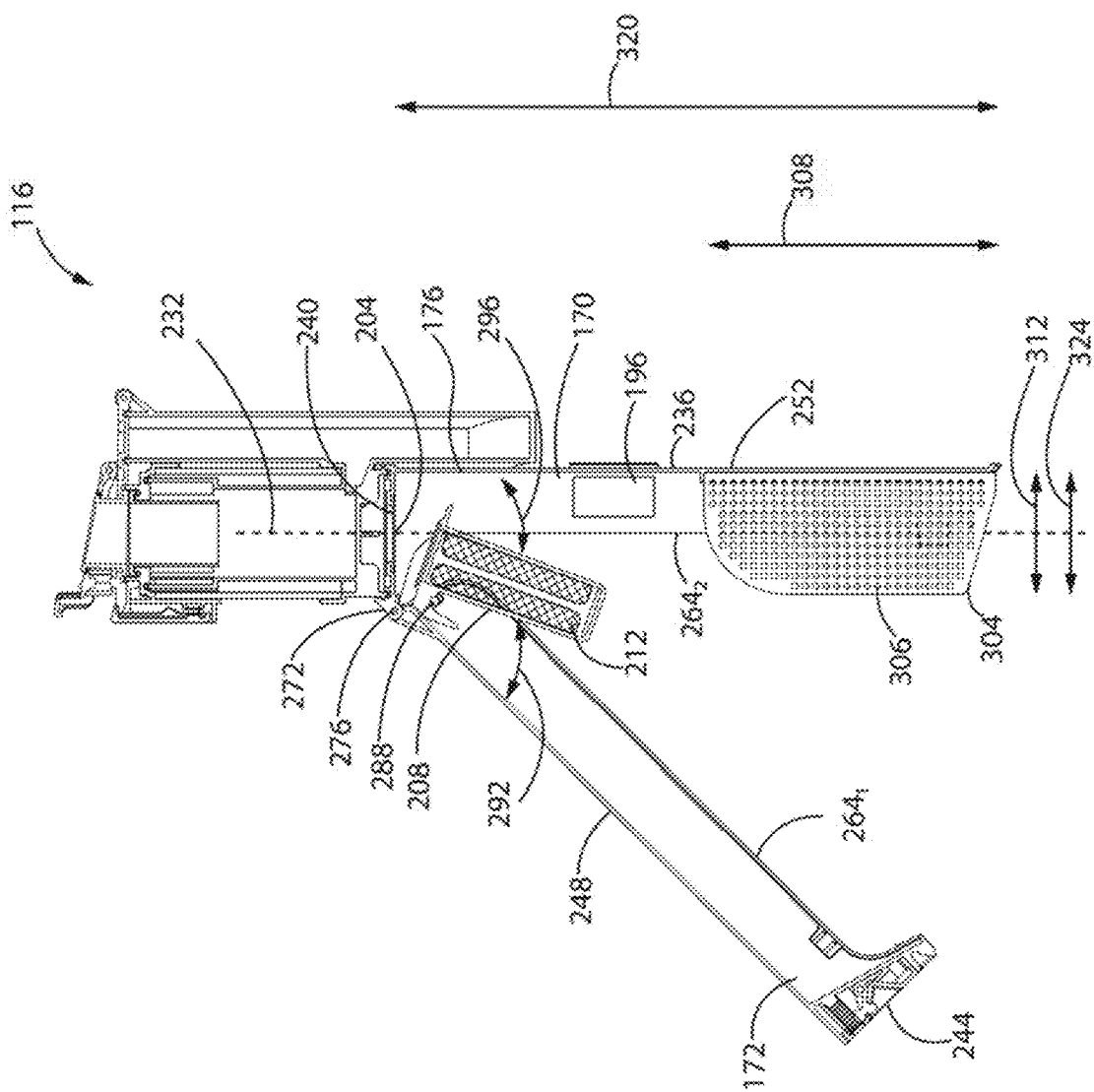
FIG. 6 is a cross-sectional view taken along line 6-6 in FIG. 5.

FIGS. 5-6 exemplify a cyclone, which may be referred to as a cyclonic air treatment member 116, in accordance with an embodiment. As shown, cyclone bin assembly includes a cyclone 170 with a cyclone chamber 176, a cyclone air inlet 196, a cyclone air outlet 204, and a cyclone axis of rotation 232 (also referred to as cyclone axis 232). The cyclone chamber 176 has a cyclone chamber sidewall 236 that extends axially between the chamber first end 240 and the chamber second end 244.

As exemplified, in accordance with this aspect, cyclone chamber sidewall 236 comprises a first portion 248 and a second portion 252 which are moveably mounted with respect to each other so as to provide an area to access the interior of the cyclone chamber that is larger than the cross sectional area of the end wall of the cyclone at second end 244. As exemplified, first portion 248 is moveable relative to sidewall second portion 252 between a closed position (FIG. 1) and an open position (FIGS. 5-6). In the closed position (FIG. 1), sidewall first portion 248 may meet (e.g. seal to) sidewall second portion 252 at first and second junctures 254₁ and 254₂. This closes cyclone chamber 176 so that cyclone 170 can function to separate dirt and debris from air flow moving through cyclone chamber 176. In the open position, sidewall first portion 248 is at least partially separated (e.g. spaced apart from) sidewall second portion 252 to define opening(s) 256 into cyclone chamber 176. Dirt and debris collected, accumulated, or tangled within cyclone chamber 176 can be easily removed through cyclone chamber opening(s) 256.

Referring to FIGS. 1, 5, and 6, each juncture 254 may be defined where an edge of sidewall first portion 248 meets an edge of sidewall second portion 252 in the closed position. As shown, first portion 248 may include first edge $260_1$, second portion 252 may include first edge $260_2$, and edges 260 may abut each other in the closed position to define first juncture $254_1$. Similarly, first portion 248 may include second edge $264_1$, second portion 252 may include second edge $264_2$, and edges 264 may abut each other in the closed position to define second juncture $254_2$. In the open position (FIGS. 5-6), both edges 260, 264 may be moved apart to create an opening 256 into cyclone chamber 176 for emptying dirt and debris contained inside or, as exemplified in FIG. 14, one of the edges 260, 264 may be moved apart to create an opening 256 into cyclone chamber 176.

Edges 260, 264 may be the plastic edges of the cyclone chamber side wall that abut each other or, alternatively, a gasket or the like may be provided to assist in providing a seal along the juncture. The edges may be planar or an alternate shape to assist in providing a seal, such as tongue and groove.

One or both of junctures 254 may extend at a (non-zero) angle 270 to a plane 268 that is transverse to cyclone axis 232. For example, as exemplified in FIG. 5, the juncture may extend axially (perpendicular to plane 268) or at an angle between 0° and 90° exclusive, as exemplified in FIG. 10.

A sidewall first portion 248 that opens along junctures 254 angled in this way can provide an opening 256 into cyclone chamber 176, which has an axial dimension and which has a greater cross-sectional area than opening the end wall of a cyclone, thereby providing better access to dirt and debris contained inside cyclone chamber 176. In contrast, an cyclonic air treatment member having only an end wall door, may require the user to reach their hand and arm through the open end wall door into the cyclone chamber to clear dirt and debris (e.g. accumulated or tangled on a vortex finder), which may be unpleasant for the user.

Sidewall first portion 248 may be moveably mounted with respect to sidewall second portion 252, sidewall second portion 252 may be moveably mounted with respect to sidewall first portion 248 or both sidewall portions 248, 252 may be moveable with respect to each other.

In the illustrated example, junctures $254_1$ and $254_2$ extend axially parallel to cyclone axis 232. When sidewall first portion 248 is moved relative to sidewall second portion 252 to separate sidewall first portion 248 from sidewall second portion 252 along junctures 254, the resulting cyclone chamber opening 256 extends axially (i.e. along an axial length of cyclone chamber 176). An advantage of this design is that the axial dimension of cyclone chamber opening 256 provides a large opening 256 and thereby improves user-access to dirt and debris that may be located throughout cyclone chamber 176. For example, when sidewall first portion 248 is moved to the open position, cyclone chamber opening 256 may allow user access to debris at both cyclone chamber ends 240, 244 without having to unpleasantly reach a length of their arm into the dirty and dusty cyclone chamber 176.

Sidewall first portion 248 may be movably mounted with respect to sidewall second portion 252 in any manner that allows sidewall first portion 248 to move between a closed position (FIG. 1) and an open position (FIGS. 5-6). For example, sidewall first portion 248 may be rotatable (e.g., as exemplified in FIGS. 27-30), pivotable (as exemplified in FIGS. 5 and 14), translatable (as exemplified in FIG. 31), or any combination thereof, relative to sidewall second portion 252.

Referring to FIGS. 5-6, sidewall first portion 248 is pivotable relative to sidewall second portion 252. As exemplified, sidewall first portion 248 is connected to cyclone 170 by a hinge 272 that defines a rotation axis 276 (sometimes referred to as a 'pivot axis').

Rotation axis 276 may have any position suitable to allow sidewall first portion 248 to pivot relative to sidewall second portion 252 between the closed and open positions. For example, rotation axis 276 may be positioned external to cyclone chamber 176 as shown, or rotation axis 276 may extend through cyclone chamber 176. As shown, positioning rotation axis 276 external cyclone chamber 176 can allow hinge 272 to be located outside of cyclone chamber 176, such that hinge 272 does not interfere with air flow through cyclone chamber 176 and does not occupy space within cyclone chamber 176. Rotation axis 276 may also be located at any location along the axial length of the cyclone. For example, axis 276 may be located at one end of the cyclone chamber as exemplified in FIG. 5, or at an intermediate location along the length of the cyclone sidewall.

Rotation axis 276 may have any orientation suitable to allow sidewall first portion 248 to pivot relative to sidewall second portion 252 between the closed and open positions. For example, rotation axis 276 may be oriented transverse to cyclone axis 232 (see, e.g., FIG. 5), or rotation axis 276 may extend axially (e.g. parallel to cyclone axis 232, see e.g., FIG. 14). An advantage of the design of FIG. 5 is that the end of sidewall first portion 248 distal to axis 276 may rotate farther away from sidewall second portion 252 in the open position per degree of rotation. Accordingly, rotation axis 276 positioned and oriented as shown may provide greater user access to a lower end of the interior of cyclone chamber 176 to remove the contained dirt and debris.

Hinge 272 may be any device suitable to (directly or indirectly) connect sidewall first portion 248 to sidewall second portion 252 and allow sidewall first portion 248 to rotate relative to sidewall second portion 252 between the closed and open positions. For example, hinge 272 may have a multi-part design as shown, or hinge 272 may be a single-part living hinge. As compared to a single-part living hinge 272, a multi-part hinge 272 typically provides greater strength and working life (e.g. number of rotations before failure). A single-part living hinge 272 allows chamber first end 240 to be integrally formed with cyclone 170, which reduces the number of components, which in turn can reduce manufacturing and assembly costs.

Referring to FIGS. 1, 5, and 6, a cyclone chamber opening 256 may have an area 280 that is larger than an opening provided by an openable door at cyclone end wall 244. For example, opening area 280 may be greater than a cross-sectional area 284 measured on a plane 268 that is perpendicular to cyclone axis 232. The comparatively larger opening area 280 provides greater user access to remove dirt and debris from an interior of cyclone chamber 176 as compared to an end wall door. In some embodiments, opening area 280 may be at least 120% (e.g. 120% to 500%) of chamber cross-sectional area 284. In the illustrated example, the opening area 280 of each cyclone chamber opening 256 is at least 200% of chamber cross-sectional area 284.

Referring to FIGS. 5-6, one or more parts of cyclone chamber 176 or dirt collection chamber 172 may be movable with sidewall first portion 248 to the open position. This can allow those part(s) to be reoriented in the open position in a way that provides greater user access to dirt and debris collected on those part(s), and/or that allows dirt and debris collected on those part(s) to fall out of chamber(s) 172, 176 by gravity (e.g. into a waste bin below). In general, the more dirt and debris that falls out of chamber(s) 172, 176 by gravity alone, results in less unpleasant user-contact with dirt and debris to clean out chamber(s) 172, 176.

In the illustrated example, cyclone chamber second end wall 244 is connected to sidewall first portion 248 so that cyclone chamber second end wall 244 rotates with sidewall first portion 248 to the open position. This tilts the surface of cyclone chamber second end wall 244 towards an axial (e.g. vertical) orientation, which can allow dirt and debris collected on cyclone chamber second end wall 244 to fall out of chambers 172, 176 by gravity. This also removes cyclone chamber second end wall 244 from sidewall second portion 252 so that dirt and debris associated with sidewall second portion 252 can fall out of chambers 172, 176 by gravity instead of forming a pile on cyclone chamber second end wall 244 at the bottom end.

In an alternative embodiment, cyclone chamber second end wall 244 may remain with sidewall second portion 252 when sidewall first portion 248 is moved to the open position.

In any embodiment, cyclone chamber second end wall 244 may be openable, e.g., it may be pivotably mounted to one of the sidewall portions 248, 252.

As mentioned previously, FIGS. 10-11 exemplify an embodiment wherein the juncture extends at an angle between 0° and 90° exclusive to transverse plane 268. The sidewall portions 248, 252 meet along a sidewall juncture 254 in the closed position (FIG. 10) and may be pivoted away from each other to the open position (FIG. 11). In the open position, edges 260 of sidewall portions 248, 252 are spaced apart, and each sidewall portion 248, 252 has a cyclone chamber opening 256.

In accordance with this embodiment, sidewall juncture 254 forms (non-zero) angles to both cyclone axis 232 and transverse plane 268. Accordingly, sidewall juncture 254 has an axial extent or dimension that creates comparatively large area chamber openings 256 in the open position, but that does not extend axially parallel to cyclone axis 232. As compared to a sidewall juncture that is parallel to cyclone axis 232, the illustrated sidewall juncture 254 has a shorter linear length, which may result in less cost, less complexity, and greater reliability in maintaining an air tight seal along sidewall juncture 254 in the closed position.

Sidewall juncture 254 may be located anywhere between cyclone chamber ends 240, 244. Preferably, sidewall juncture 254 is spaced apart from cyclone chamber end 240, 244. This positions sidewall juncture 254 more centrally between cyclone chamber ends 240, 244 whereby in the open position, the maximum distance from cyclone chamber openings 256 to an interior surface of cyclone chamber 176 is reduced. For example, sidewall juncture 254 may be spaced from cyclone chamber first end 240 by a distance 336, spaced from cyclone chamber second end 244 by a distance 340, and each of distances 336 and 340 may be at least 10%, 20%, 30%, 40% or 50% (e.g. 10% to 50%, 20% to 40%) of cyclone chamber height 320.

Figure 10:
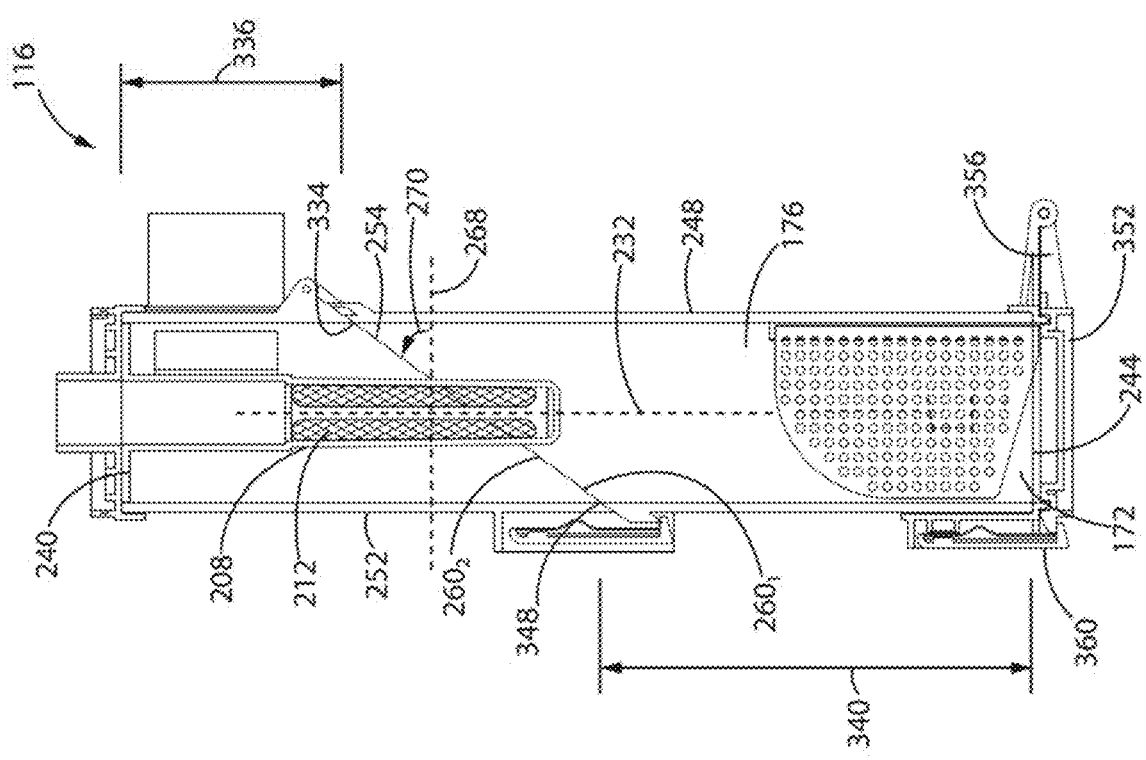
FIG. 10 is a cross-sectional view of an air treatment member, in a closed position, in accordance with another embodiment.
Figure 11:
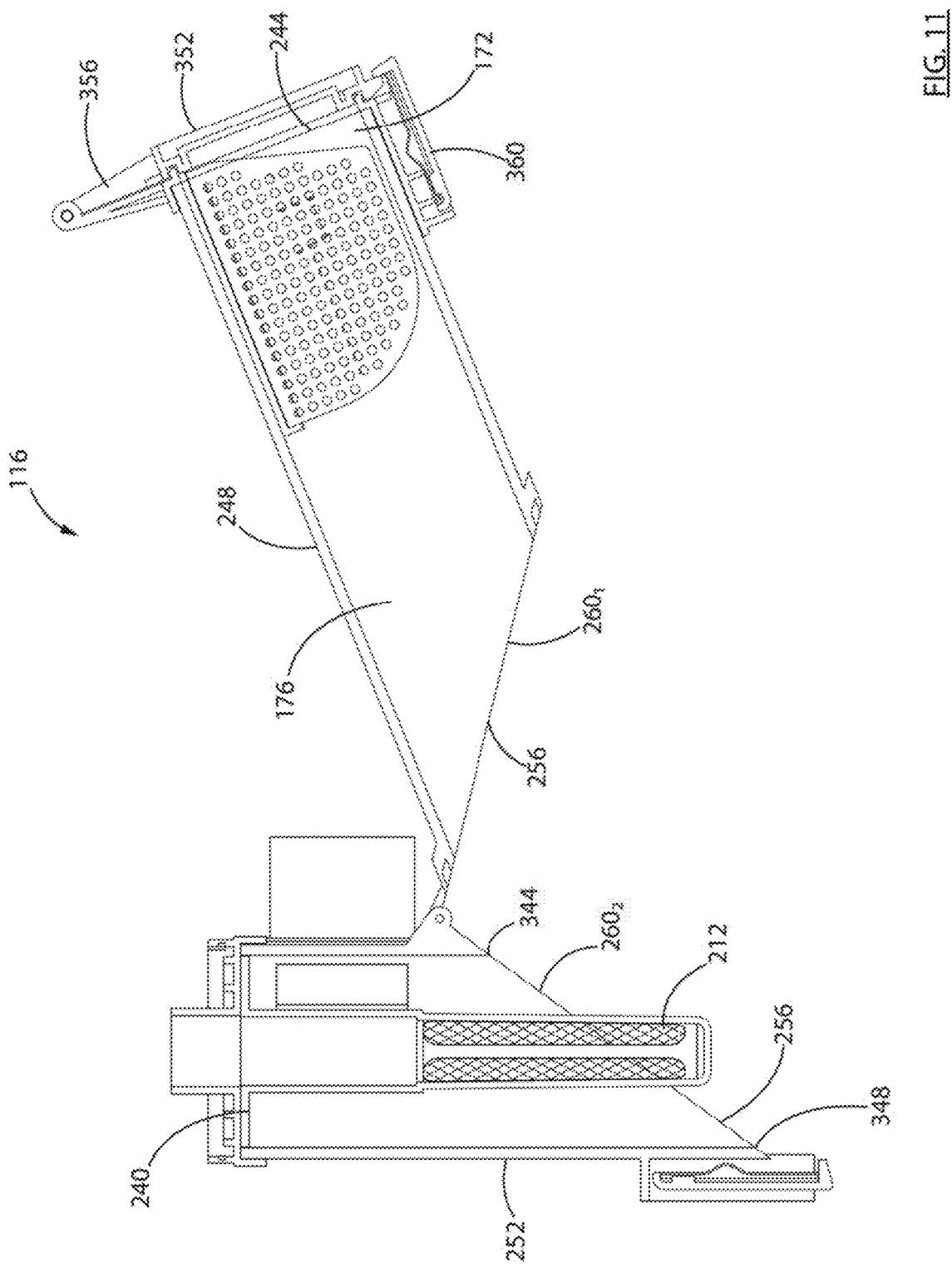
FIG. 11 is a cross-sectional view of the air treatment member of FIG. 10, in an open position.

Still referring to FIGS. 10-11, sidewall juncture 254 has a first end 344 having a first axial position, a second end 348 having a second axial position, and some or all of screen 212 has an axial position located between the axial positions of the sidewall juncture ends 344, 348. As shown in FIG. 11, this can allow some or all of screen 212 to extend out of a cyclone chamber opening 256 when the cyclone is in the open position, which can provide easy user-access to surfaces of screen 212 for cleaning.

As with the embodiment of FIGS. 5 and 6, cyclone second end 244 may be a movable (e.g. pivotable, translatable, and/or removable) end wall 352. As exemplified, cyclone second end 244 includes an openable door 352. Door 352 can be opened to empty the majority of loose dirt and debris contained in cyclone chamber 176. This can mitigate loose dirt and debris spilling uncontrollably when moving sidewall first portion 248 to the open position. An openable door 352 may be provided at one or both ends of the cyclone and, e.g., may be pivotably connected to one or both of sidewall portions 248, 252. In the illustrated example, openable door 352 is pivotably connected by a hinge 356 to sidewall first portion 248, and a latch 360 is provided to removably secure openable door 352 closed.

As mentioned previously, FIG. 14 exemplifies an axially extending pivot axis 276. An advantage of this design is that in the open position, each sidewall portion is opened and the cyclone chamber openings 256 may extend the full axial length of cyclone chamber 176. This provides easy user-access to dirt and debris located anywhere inside of cyclone chamber 176. It will be appreciated that the hinge may extend along only part of the axial length of the sidewall.

Sidewall portions 248, 252 can have any circumferential angular extent. For example, sidewall first portion 248 may have a circumferential angular extent of between 25° and 335°. More preferably, the circumferential angular extent may be more balanced as between sidewall portions 248, 252 so that each sidewall portion 248, 252 has a conveniently large cyclone chamber opening 256 in the open position. For example, the circumferential angular extent of sidewall first portion 248 may be between 135° and 225°. In the illustrated example, both sidewall portions 248 have an angular extent of about 180°. This provides each sidewall portion 248, 252 with a similarly large cyclone chamber opening 256.

Sidewall first portion 248 may be pivotably mounted about an axial rotation axis 276. This allows cyclone 170 to have a relatively smaller footprint when in the open position so that all of cyclone 170 can be underlied by a standard sized waste bin that is collecting dirt and debris falling from cyclone 170. In the illustrated example, rotation axis 276 is parallel to cyclone axis 232. In some embodiments, sidewall hinge 272 is a piano hinge that is provided on an exterior of the sidewall and extends axially along sidewall portions 248, 252.

Figure 14:
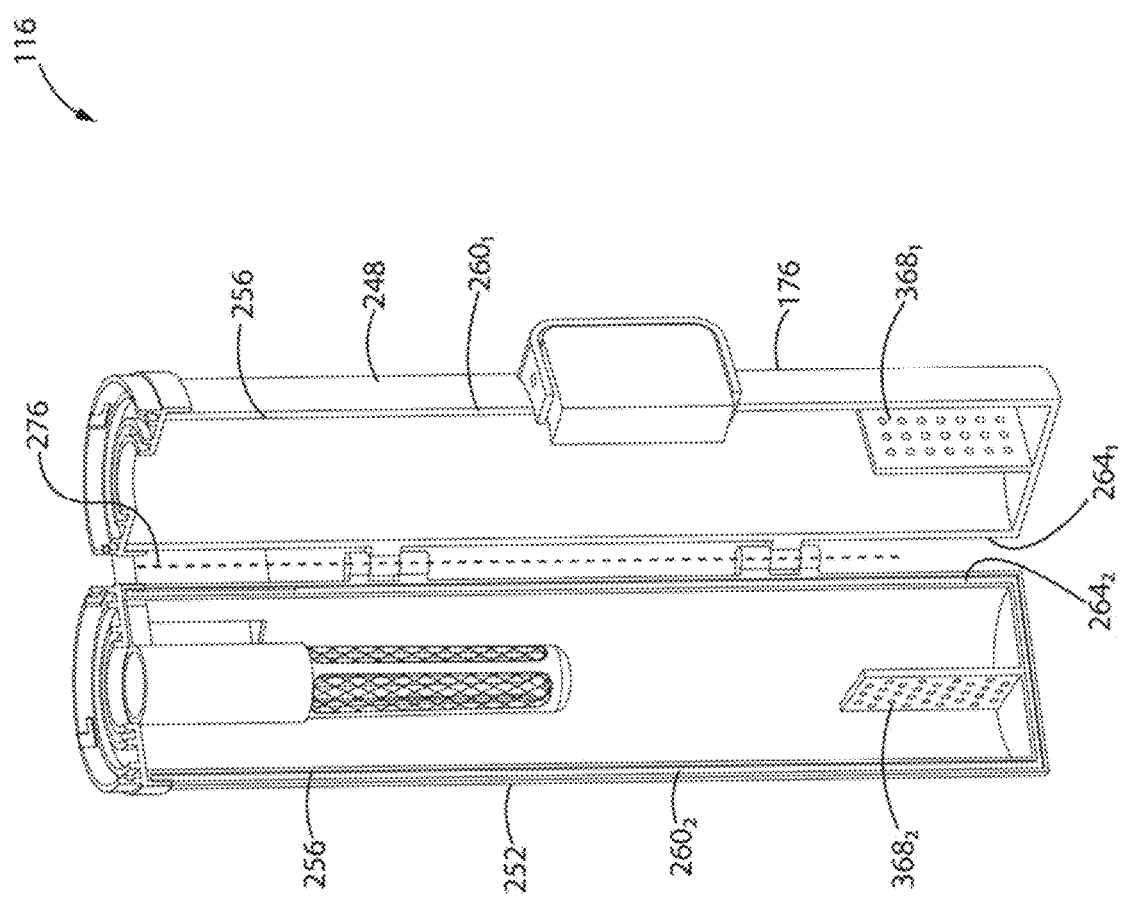
FIG. 14 is a perspective view of an air treatment member in an open position, in accordance with an embodiment.

Hinge 272 may extend from one end of the cyclone chamber to the other end of the cyclone chamber as exemplified in FIG. 14, or it may extend along only part of the axial length. For example, it may extend from one end of the cyclone chamber towards the other end or it may extend along only part of an intermediate section of the sidewall between the first and second axially opposed cyclone ends. In such a case, the sidewall portion that opens may define a door having upper and lower ends that mate with the other sidewall portion along upper and lower edges that extend around a portion of the perimeter of the sidewall.

FIGS. 19-21 exemplify an alternate embodiment wherein the axis 276 extends in the direction of the cyclone axis of rotation 232 but wherein the axis 276 extends through the cyclone chamber. Optionally, as exemplified, rotation axis 276 is coaxial or collinear with cyclone axis 232. Sidewall first portion 248 is rotatable about axis 276 relative to sidewall second portion 252 from a closed position to an open position (FIG. 20) in which sidewall portions 248, 252 are partially or completely nested with one another. For example, sidewall first portion 248 may nest within sidewall second portion 252 as shown, or vice versa. An advantage of this design is that it may provide even greater exposure to interior surfaces of cyclone chamber 176. Further, this design may reduce the time and effort required to clean out cyclone chamber 176 because the act of nesting one sidewall portion into the other may empty the outer sidewall portion into the inner sidewall portion or out of cyclone chamber 176. Thus, the user may have only to attend to emptying dirt and debris associated with the inner sidewall portion. Also, an open position in which sidewall portions 248, 252 are nested may reduce the footprint of cyclone chamber 176, which may make it possible or easier to empty cyclone chamber 176 into a waste bin below without spilling.

Each sidewall portion 248, 252 is exemplified as an axial cylindrical segment. In the example shown, each sidewall portion 248, 252 has a circumferential angular extent of approximately 180°. This allows the sidewall portions 248, 252 to completely nest with each other in the open position (FIG. 20). In other embodiments, the circumferential angular extent of each sidewall portion 248, 252 may differ from 180°. For example, the inner sidewall portion 248 may have an angular extent of greater than or less than 180°.

It will be appreciated that cyclone chamber sidewall 236 may include any number of sidewall portions, which are mounted so that they can move relative to each other between a closed position and an open position. Accordingly, while FIGS. 20-21 show an embodiment in which cyclone chamber sidewall 236 includes two sidewall portion 248, 252 that are each an axial cylindrical segment, and which are nested in the open position (FIG. 21), a larger number of segments may be provided. This may permit cyclone chamber 176 to have an open position that provides even greater user-access to the interior volume, surfaces, and contents of cyclone chamber 176. In turn, this may make it easier for the user to clean cyclone chamber 176 of dirt and debris.

Figure 30:
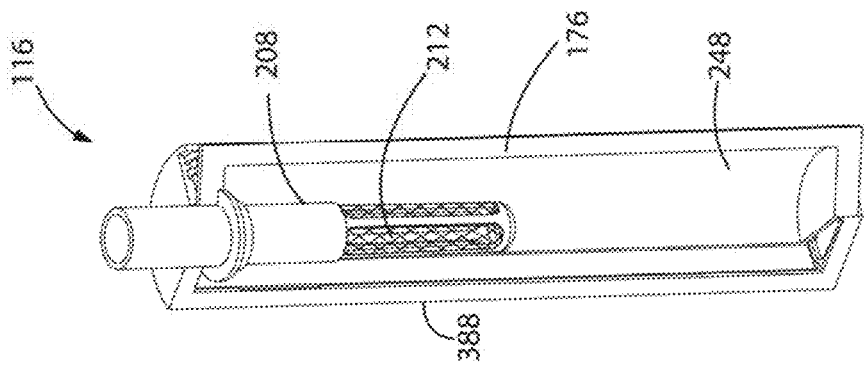
Figure 31:
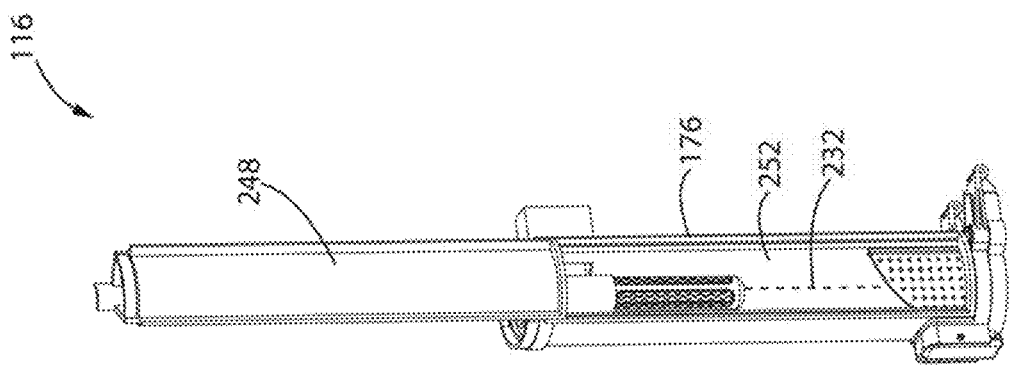
FIG. 31 is a perspective view of an air treatment member with an axially translatable sidewall portion, in an open position, in accordance with an embodiment.

For example, FIGS. 27-30 show an example including three sidewall portions 248, 252, 388, each of which is an axial cylindrical segment, and which are nested in the open position (FIG. 30). Sidewall portions 248, 252, 388 may have the same circumferential angular extent as shown (e.g. approximately 120°), or one or more (or all) of sidewall portions 248, 252, 388 may have a different circumferential angular extent as compared to each other sidewall portion 248, 252, 388. As shown, the larger number of sidewall portions 248, 252, 388 may result in a larger portion of cyclone outlet passage 208 being located outside of cyclone chamber 176 when in the open position, even where cyclone outlet passage 208 is not movably mounted (i.e. where cyclone outlet passage 208 is rigidly connected to cyclone 170). In the illustrated example, cyclone chamber 176 spans approximately 120° in the open position such that approximately 240° (i.e. about two thirds) of cyclone outlet passage 208 is positioned outside of cyclone chamber 176.

Figure 32:
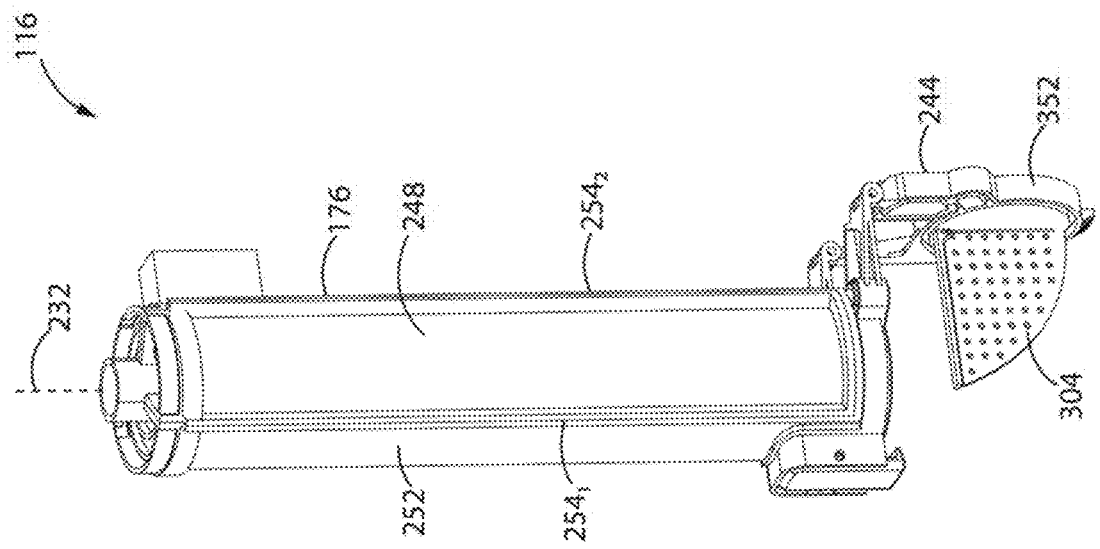
FIG. 32 is a perspective view of the air treatment member of FIG. 31 with the sidewall portion in a closed position and an open end wall.

As mentioned previously, FIGS. 31-32 exemplify an embodiment in which sidewall first portion 248 is axially translatable to the open position as shown. Depending on the manner in which cyclonic air treatment member 116 is connected to the surface cleaning apparatus, this design may prevent cyclone chamber 176 from being opened while connected to the surface cleaning apparatus. As shown, sidewall portions 248, 252 may meet (e.g. be sealed) at first and second junctures 254. First juncture $254_1$ may be parallel to second juncture $254_2$ and angularly spaced around cyclone chamber 176 from second juncture $254_2$. In the example shown, both junctures 254 extend axially (e.g. parallel to cyclone axis 232).

Figure 34:
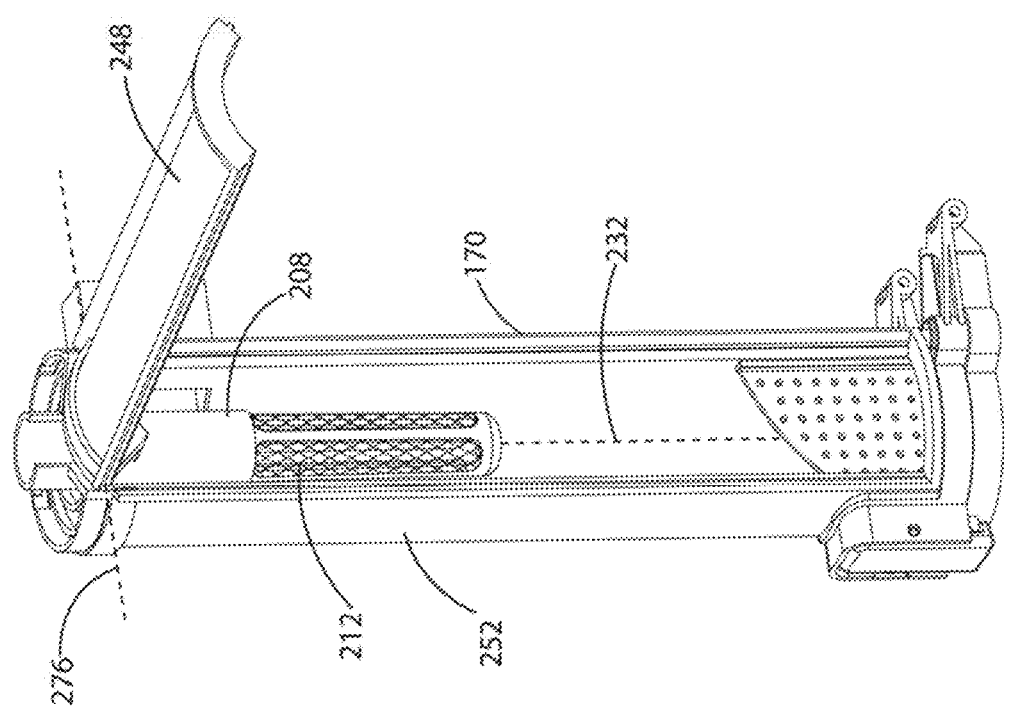
FIG. 34 is a perspective view of an air treatment member in an open position in accordance with an embodiment.
Figure 35:
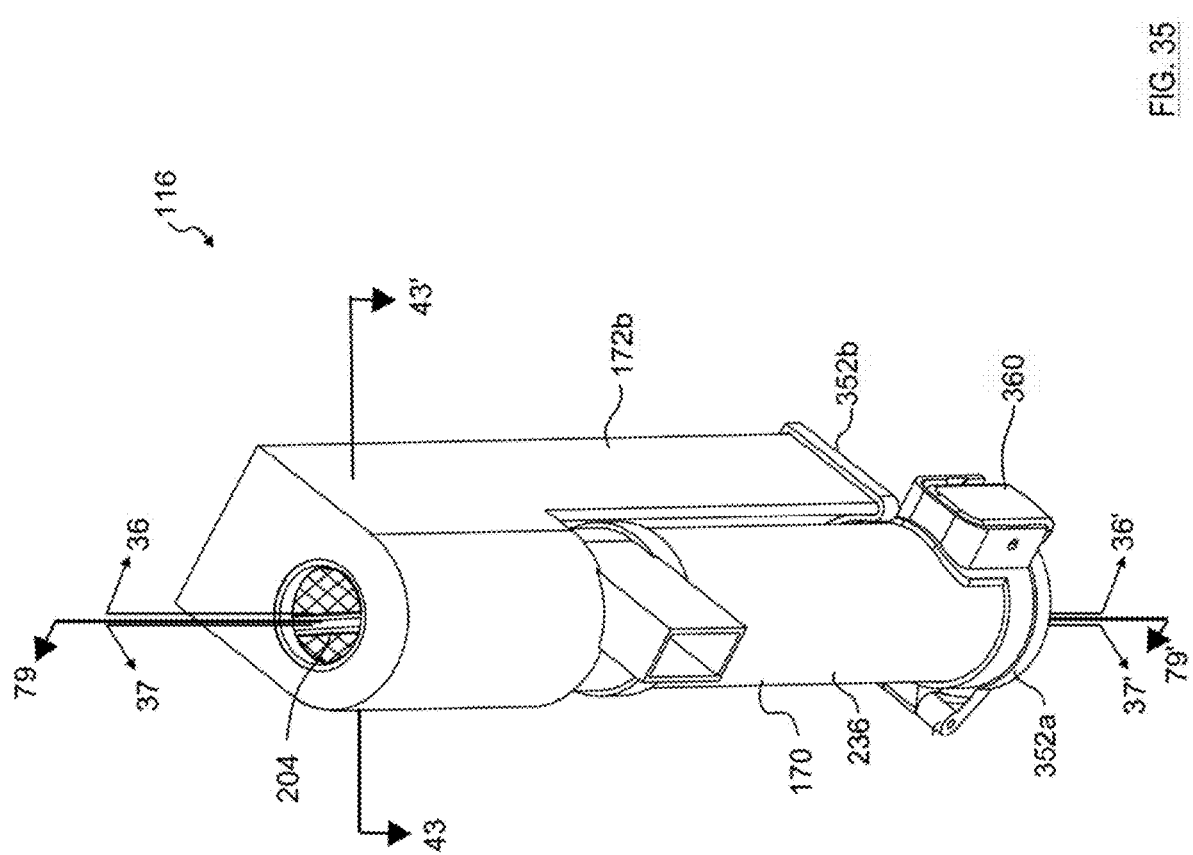
FIG. 35 is a perspective view of an air treatment member in accordance with an embodiment.
Figure 36:
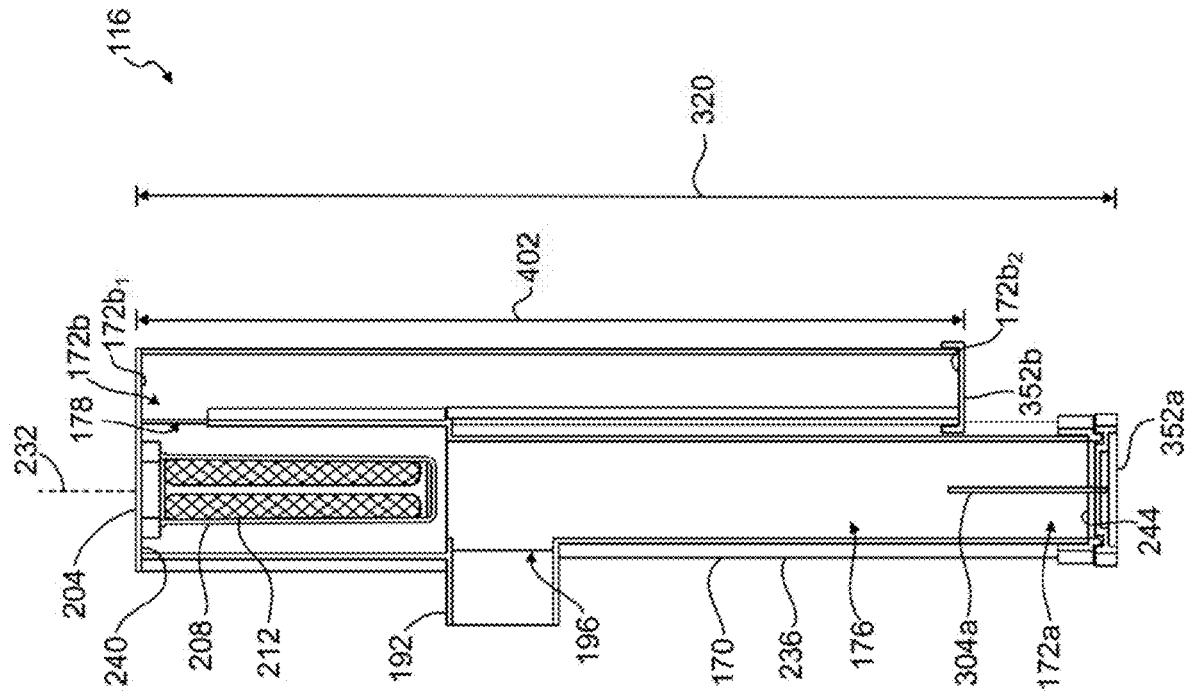
FIG. 36 is a cross-sectional view of the air treatment member of FIG. 35 taken along the section line 36-36' in FIG. 35.

FIG. 34 exemplifies an embodiment in which sidewall first portion 248 is an axial cylindrical segment, which is pivotably mounted to cyclone 170 so that it can rotate about a rotation axis 276, which is transverse (e.g. perpendicular) to cyclone axis 232.

Moveable Screen

The following is a discussion of a moveable screen, which may be may be used by itself or with one or more of the cyclone with an openable sidewall, the dual end walls, the medial cyclone air inlet, the exterior dirt collection chamber the axially extending member (vertically extending screen), and the dirt ejection mechanism.

As exemplified in FIGS. 5-6, cyclone 170 may include a cyclone outlet passage (e.g. vortex finder) 208 including a porous member, which may be referred to as a screen or shroud 212, that may collect larger dirt particles and debris (e.g. hair) which remains entrained in the air flow exiting the cyclone 170. When sidewall first portion 248 is in an open position, a portion of screen 212 may remain in close proximity to one of sidewall portions 248, 252, and that proximity may make user access to clean that portion of screen 212 difficult (e.g. the clearance may be too small for a user's fingers). In some embodiments, cyclone outlet passage 208 may be movably mounted with respect to one or both of the sidewall portions 248, 252. This can allow the user better access to clean surfaces of screen 212.

In accordance with this aspect, the cyclone outlet passage (e.g. vortex finder) 208 is moveable so as to permit easier access to more of the perimeter of the outlet passage and, optionally, all of the perimeter of the outlet passage.

Cyclone outlet passage 208 may be movably mounted with respect to one or both sidewall portions 248, 252 in any manner suitable to improve user-access to some or all of the outer surface of screen 212. For example, cyclone outlet passage 208 may be removable from cyclone 170, or cyclone outlet passage 208 may be rotatable, translatable, or both while remaining connected to cyclone 170.

As exemplified in FIGS. 5-6 and 7-9, cyclone outlet passage 208 is movably mounted with respect to both sidewall portions 248, 252. As shown, when sidewall first portion 248 is moved to the open position, cyclone outlet passage 208 is movable away from sidewall portion 252, concurrently, or subsequently, outlet passage 208 may be moved away from sidewall portion 248. This increases the clearances between screen 212 and both sidewall portions 248, 252, which can greatly improve user-access to clean surfaces of screen 212.

Figure 33:
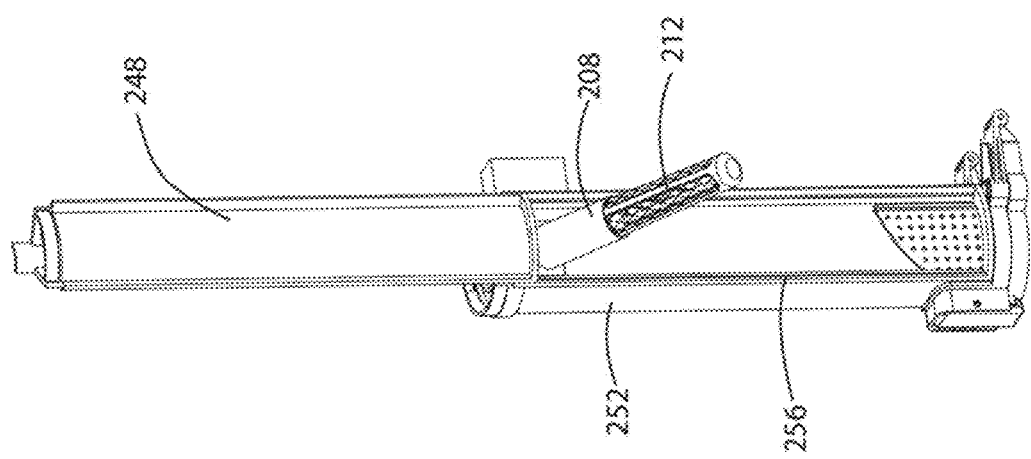
FIG. 33 is a perspective view of the air treatment member of FIG. 31 in an open position with the cyclone outlet passage rotated out of the cyclone chamber in accordance with an embodiment.

In the illustrated example, cyclone outlet passage 208 is pivotable about a rotation axis 288 relative to sidewall portion 248. As shown, this allows cyclone outlet passage 208 to rotate away from sidewall portion 248 when in the open position. Accordingly, when the sidewall portions are pivoted open and the screen is pivoted to the open position shown in FIG. 6, clearances 292, 296 between screen 212 and sidewall portions 248, 252 respectively increase to provide greater user-access to the outer surface of screen 212 for cleaning. See also FIG. 33.

In the example shown, cyclone outlet passage 208 is pivotably connected to sidewall first portion 248. Alternatively, cyclone outlet passage 208 may be pivotably connected to sidewall second portion 252 or to another portion of cyclone 170.

Figure 12:
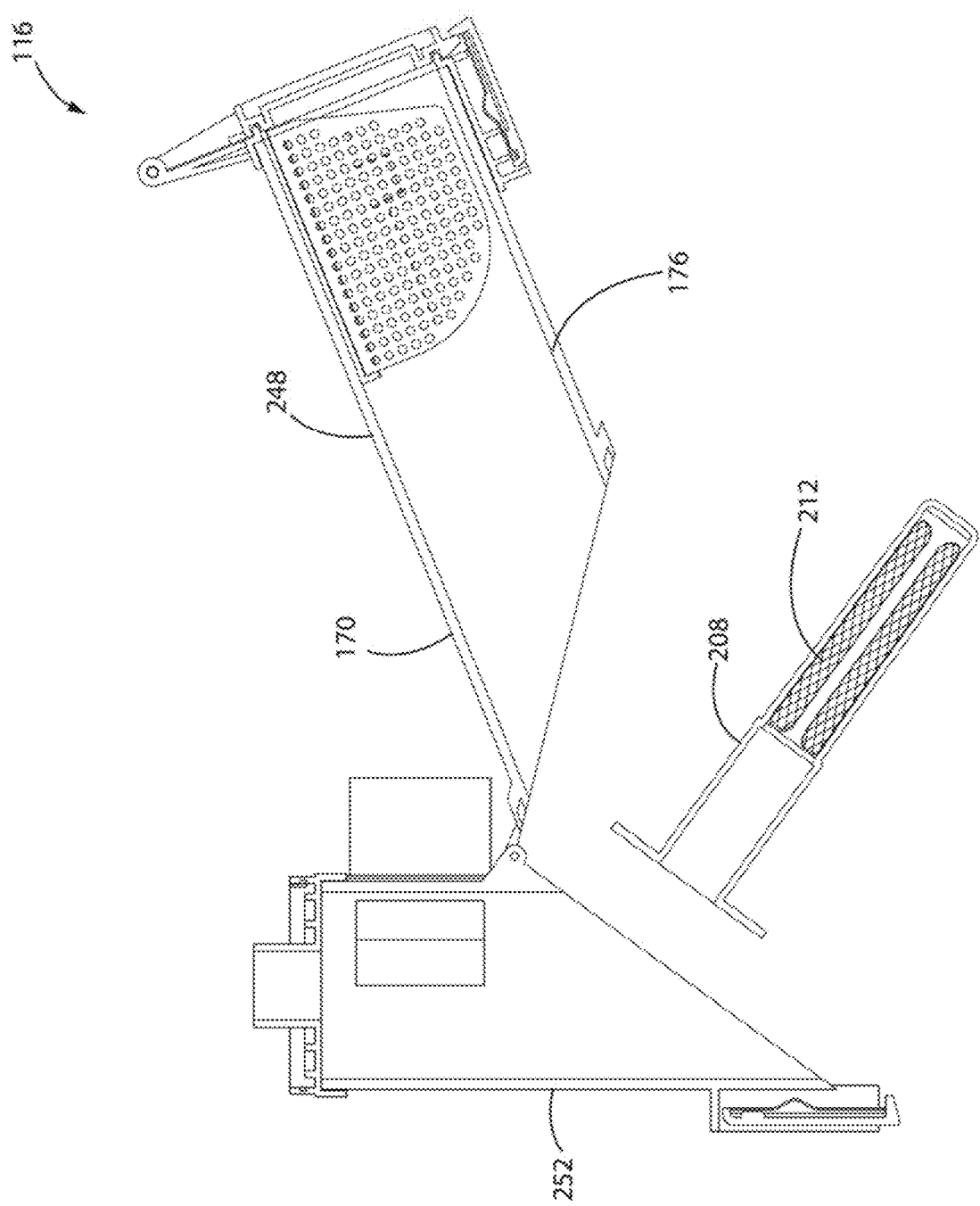
FIG. 12 is a cross-sectional view of the air treatment member of FIG. 10, in an open position, with a cyclone outlet passage removed in accordance with an embodiment.

FIG. 12 exemplifies an alternate embodiment wherein cyclone outlet passage 208, including screen 212, is removable from cyclone 170 after sidewall first portion 248 is moved to the open position. This can allow cyclone outlet passage 208 to be most easily cleaned, and optionally replaced if it is a consumable item or damaged.

Figure 13:
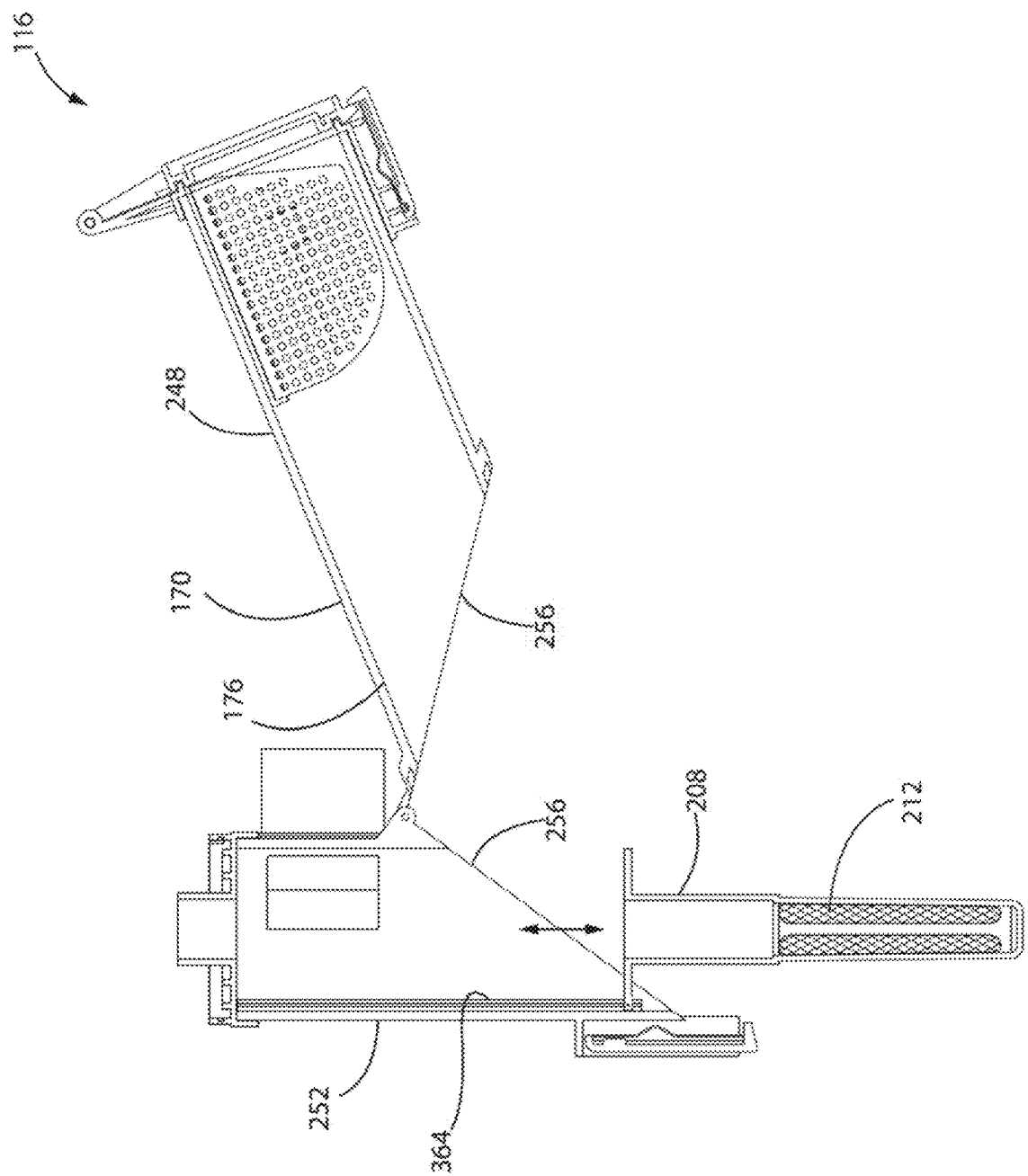
FIG. 13 is a cross-sectional view of the air treatment member of FIG. 10, in an open position, with the cyclone outlet passage translated in accordance with an embodiment.

FIG. 13 exemplifies an embodiment in which cyclone outlet passage 208, including screen 212, is translatable relative to sidewall portions 248, 252. As shown, cyclone outlet passage 208 may be translatably connected to one of the sidewall portions, e.g., sidewall portion 252, whereby cyclone outlet passage 208 can move along track 364 through cyclone chamber opening 256. This moves screen 212 out of cyclone chamber 176 so that it can be easily cleaned of dirt and debris by the user.

Figure 15:
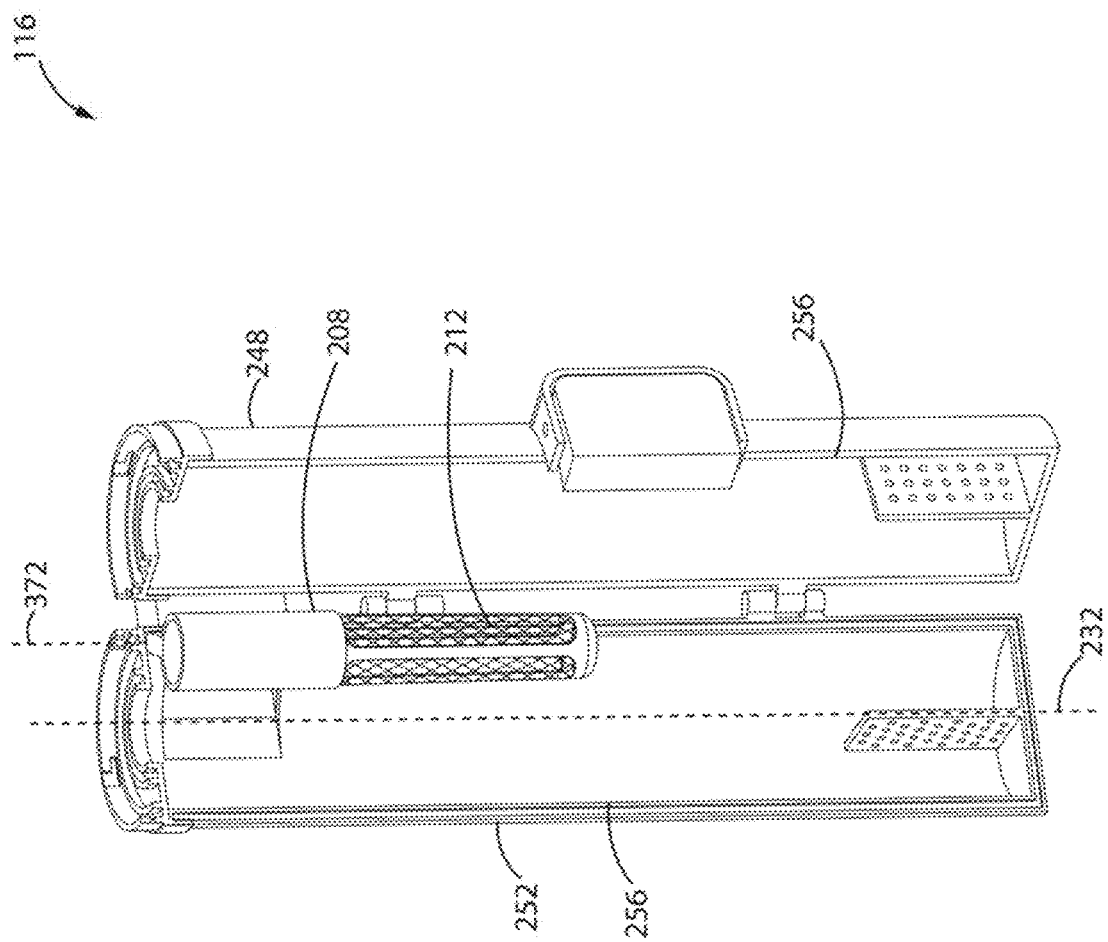
FIG. 15 is a perspective view of an air treatment member in an open position and with the cyclone outlet passage rotated out of a cyclone chamber, in accordance with an embodiment.

As exemplified in FIGS. 14-16, cyclone outlet passage 208 (including screen 212) may be pivotable about an axial screen rotation axis 372. As shown, this design allows cyclone outlet passage 208 to be rotated out of the cyclone chamber to provide easy user-access to surfaces of screen 212 for cleaning. In this example, screen rotation axis 372 is shown as parallel to cyclone axis 232. In other embodiments, screen rotation axis 372 may be oriented at a (non-zero) angle to cyclone axis 232. A similar design is useable in the embodiment of FIG. 26.

Dual End Walls

The following is a discussion of dual end walls, which may be may be used by itself or with one or more of the cyclone with an openable sidewall, the moveable screen, the medial cyclone air inlet, the exterior dirt collection chamber the axially extending member (vertically extending screen), and the dirt ejection mechanism.

An advantage of this design is that each openable sidewall portion may have part of the end wall 244. This can facilitate sealing the cyclone chamber when the sidewall portions are in the closed position.

As exemplified in FIG. 14, half of the end wall 244 may be fixedly mounted to each sidewall portion 248, 252.

Alternately, as exemplified in FIGS. 16-17, each end wall portion may be openable. As exemplified therein, cyclone chamber 176 may include an openable end wall 352 at chamber second end 244. As shown, openable end wall 352 may include a first wall portion 376 movably (e.g. pivotably) connected to sidewall first portion 248 and a second wall portion 380 movably (e.g. pivotably) connected to sidewall second portion 252 as shown. An advantage of this design is that upon opening end wall 352 to empty dirt and debris from cyclone chamber 176 into a waste bin below, the end wall portions 376, 380 may tend to funnel the falling dirt and debris into a waste bin below. This may mitigate the dirt and debris spilling laterally outside of the waste bin upon opening end wall 352.

FIGS. 19-21 exemplify the use of two end wall segments in a rotational opening design. As shown, in the open position (FIG. 20), end wall portion 376 may overlie end wall portion 380. As compared with an end wall 352 that remains whole (e.g. if the design of end wall 352 of FIG. 18 were used and end wall 352 was mounted in a fixed position to a sidewall portion), this design may reduce the effective surface area of end wall 352 in the open position so that dirt and debris can fall out of cyclone chamber 176 more easily. Furthermore, this design may make cleaning cyclone chamber 176 easier in that the act of moving wall second portion 380 under wall first portion 376 may automatically push dirt and debris collected on wall second portion 380 out of cyclone chamber 176.

Figure 24:
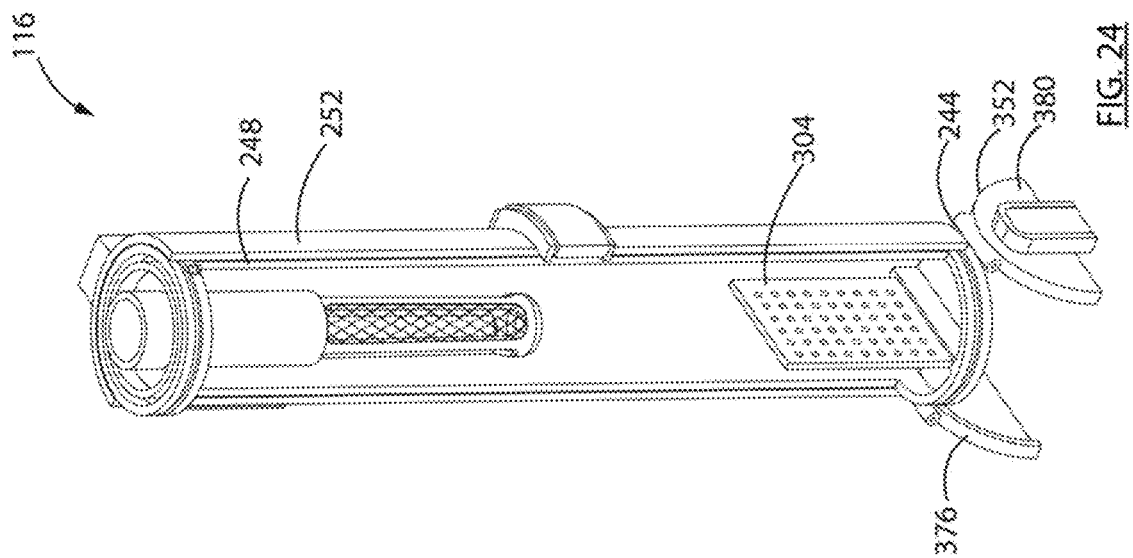
FIG. 24 is a perspective view of the air treatment member of FIG. 22 in the open position and with open end doors.
Figure 23:
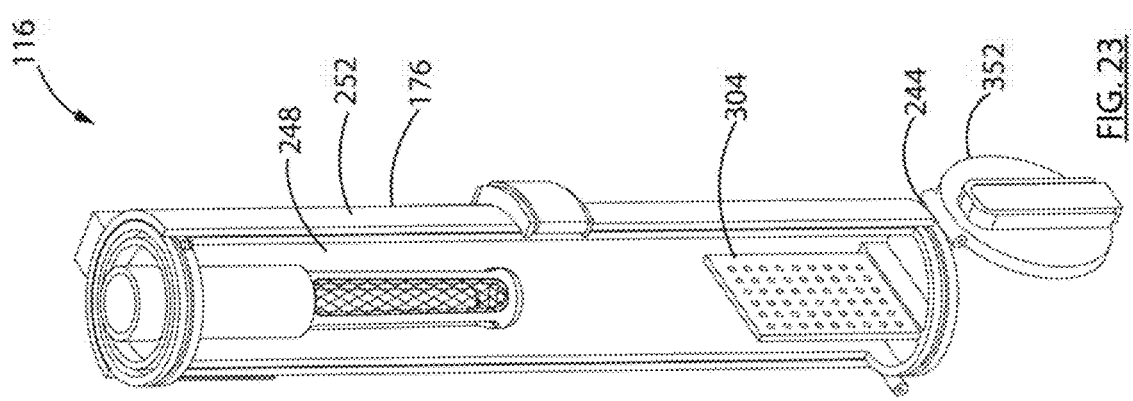
FIG. 23 is a perspective view of an air treatment member in an open position and with an open end door in accordance with an embodiment.
Figure 27:
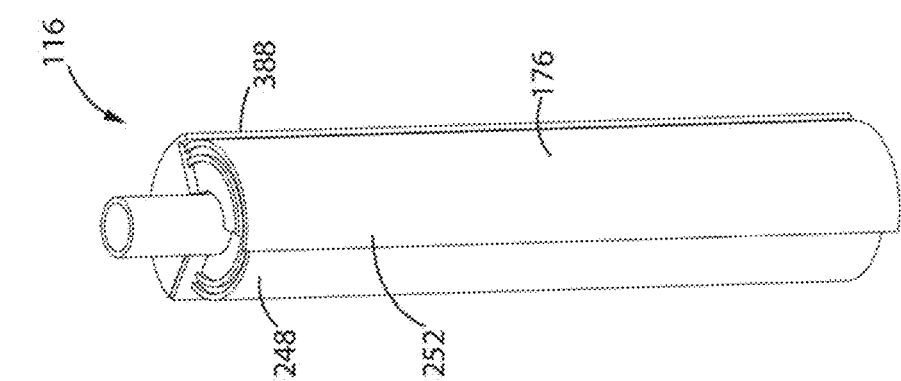
FIGS. 27-30 are perspective views of the air treatment member transitioning from a closed position in FIG. 27 to an open position in FIG. 30, in accordance with an embodiment.
Figure 28:
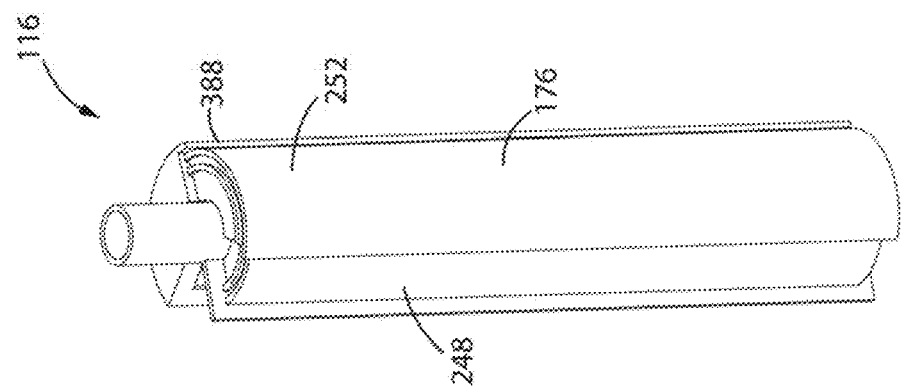
Figure 29:
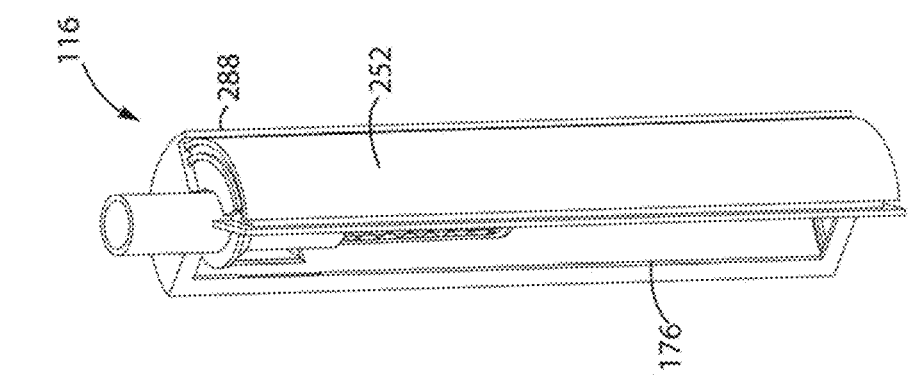

FIG. 24 exemplifies the use of two end wall segments in a rotational opening design wherein door portions 376, 380 are separately openable.

Medial Cyclone Air Inlet

The following is a discussion of a cyclone with a medial cyclone air inlet, which may be may be used by itself or with one or more of the cyclone with an openable sidewall, the moveable screen, the dual end walls, the exterior dirt collection chamber the axially extending member (vertically extending screen), and the dirt ejection mechanism.

Optionally, the cyclone air inlet may be located in a medial position between the first cyclone end and the second cyclone end, and may be provided on the cyclone sidewall (e.g., the cyclone inlet may be a tangential air inlet terminating at a port in the sidewall). Accordingly, dirty air may enter the medial inlet, and may flow inside of the cyclone chamber in two directions: (a) axially toward the first cyclone end, and (b) axially toward the second cyclone end. An advantage of this configuration is that cyclonic action is promoted in both the upper and lower portions of the cyclone unit, which may tend to improve the dirt separation efficiency of the cyclone unit.

Optionally, a flange may extend at least part way around the inner surface of the cyclone sidewall to overlie or underlie the medial cyclone air inlet. In various cases, the flange may control (e.g., limit) the volume of air flowing axially (e.g., upwardly or downwardly if the first cyclone end is positioned over the second cyclone end) inside of the cyclone chamber. The flange may be placed at an axial end of the cyclone inlet, or it may be spaced therefrom.

In the drawings, the cyclone is oriented with the first cyclone end positioned over the second cyclone end. Accordingly, the cyclone is oriented vertically and the portions of the cyclone may consequentially be referred to as upward or above or downward or below and the flow of the air may consequentially be referred to as upwardly or downwardly. It will be appreciated that the cyclone may be oriented, and used, in various orientations.

Figure 38:
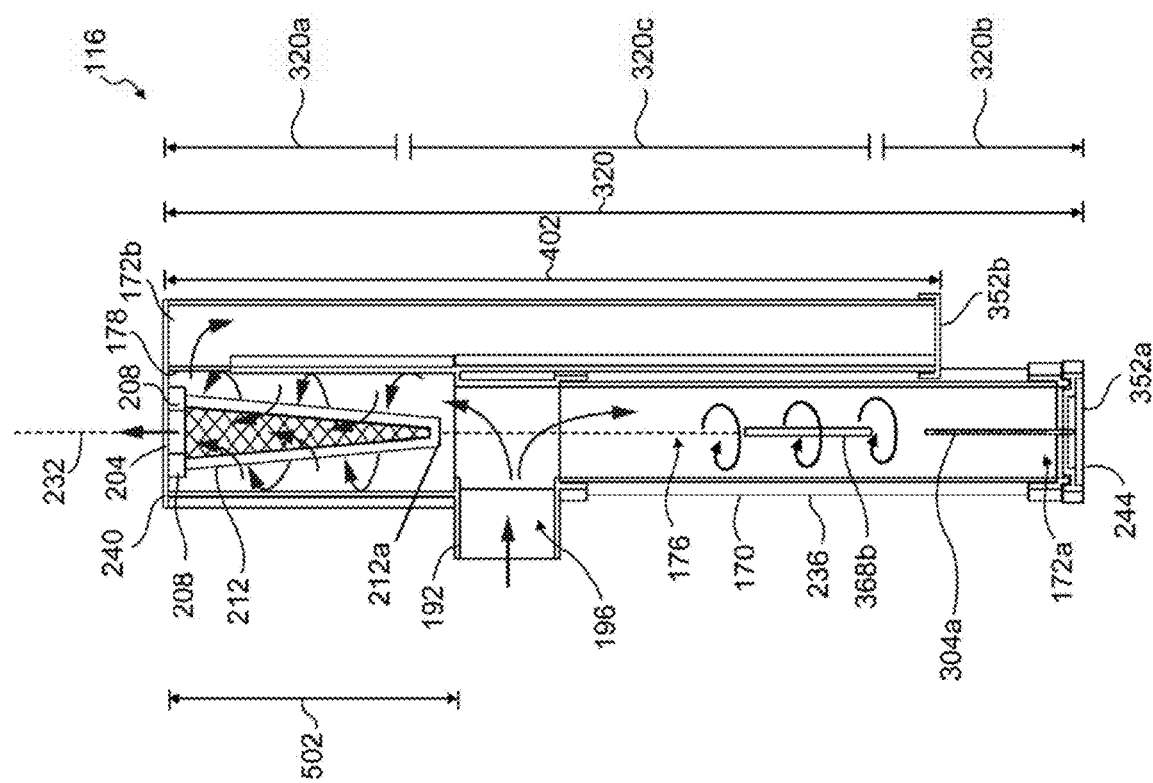
FIG. 38 is a cross-sectional view of the air treatment member of FIG. 35 along the section line 36-36', in accordance with another embodiment.

Referring now to FIG. 38, as exemplified, the first cyclone end 240 may be positioned over the second cyclone end 244. In this configuration, the axial height 320 of the cyclone unit 170 may be divided into three portions: an upper portion 320a, a lower portion 320b, and a medial portion 320c located between the upper and lower portions 320a, 320b.

The upper and lower portions 320a, 320b may comprise any relative proportions of the axial height 320 of the cyclone unit 170. For example, each of the upper and lower portions may comprise 10%, 15%, 20%, or 25% of the total axial height 320 of the cyclone unit 170. Accordingly, the medial portion may comprise 80%, 70%, 60% or 50% of the remaining axial height 320 of the cyclone unit 170, respectively.

As exemplified in FIGS. 36 to 41, the cyclone air inlet 196 may be located laterally (e.g., it may be a tangential air inlet) on the side wall 236 of the medial portion 320c. Accordingly as best exemplified by FIG. 38, air entering the cyclone chamber 176 via the medial inlet 196 flows (e.g., travels) in two directions: (a) axially upwardly toward the first cyclone end 240, and (b) axially downwardly toward the second cyclone end 244. In this manner, rotational upflow cyclone action (or inverted cyclone action) is induced in the upper cyclone portion 320a, and rotational down flow cyclone action is induced in the lower cyclone portion 320b. In various cases, this may help to increase the dirt separation efficiency of the cyclone unit. For example, finer or less dense particles of dust and dirt may travel upwardly into the upper cyclone portion 320a to be ejected into the external dirt chamber 172b, while coarser or denser particles of dust and dirt may travel downwardly into the lower cyclone portion 320b to aggregate inside of the lower end of the cyclone chamber, e.g., an internal dirt collection chamber 172a.

The cyclone air inlet, which in this aspect may be referred to as a medial air inlet or medial inlet 196, may be provided at any location within the medial portion 320c. For instance, the medial inlet 196 may be provided in an axially upper portion of the medial portion 320c (see e.g., FIG. 38), a middle portion of the medial portion 320c (e.g., FIG. 80), or a lower portion of the medial portion 320c (see e.g., FIG. 45).

Optionally, the medial inlet 196 is located below a location at which air may exit the cyclone chamber. Accordingly, the upper end of the medial inlet 196 may be positioned below the cyclone outlet passage 208 and/or the shroud 212, or at least adjacent an axially inward end 212a of the shroud 212. If the axial inward end 212a is solid (e.g., i.e., no air flow passes therethrough), then the medial inlet 196 may be positioned adjacent or below the porous portion of the screen 212.

It will be appreciated that while only a single medial inlet 196 has been illustrated in the exemplified embodiments, in other embodiments, more than one medial inlet 196 may be provided inside of the cyclone chamber 170. For example, two or more medial inlets 196 may be vertically spaced along the cyclone sidewall 236. Alternatively, or in addition, two or more medial inlets 196 may be spaced along the perimeter of the cyclone sidewall 236.

Figure 39:
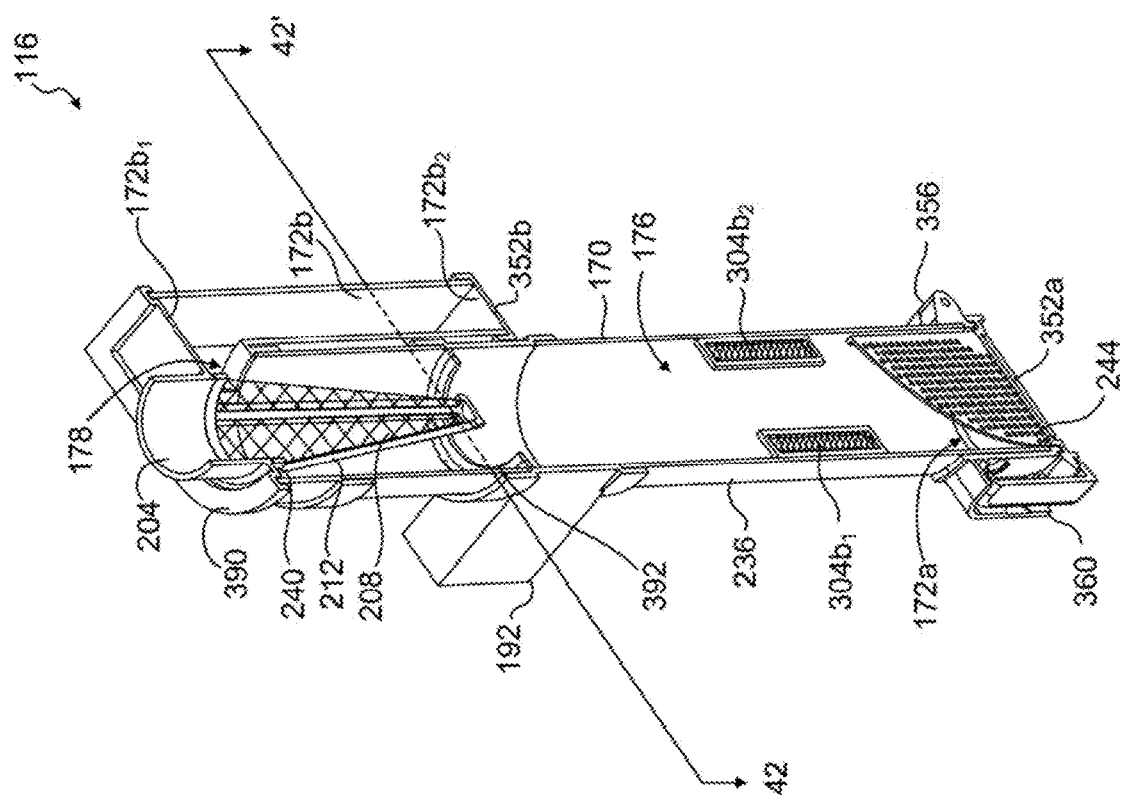
FIG. 39 is a perspective cross-sectional view of the air treatment member of FIG. 35 taken along section line 37-37' in FIG. 35, in accordance with the embodiment of FIG. 38.
Figure 40:
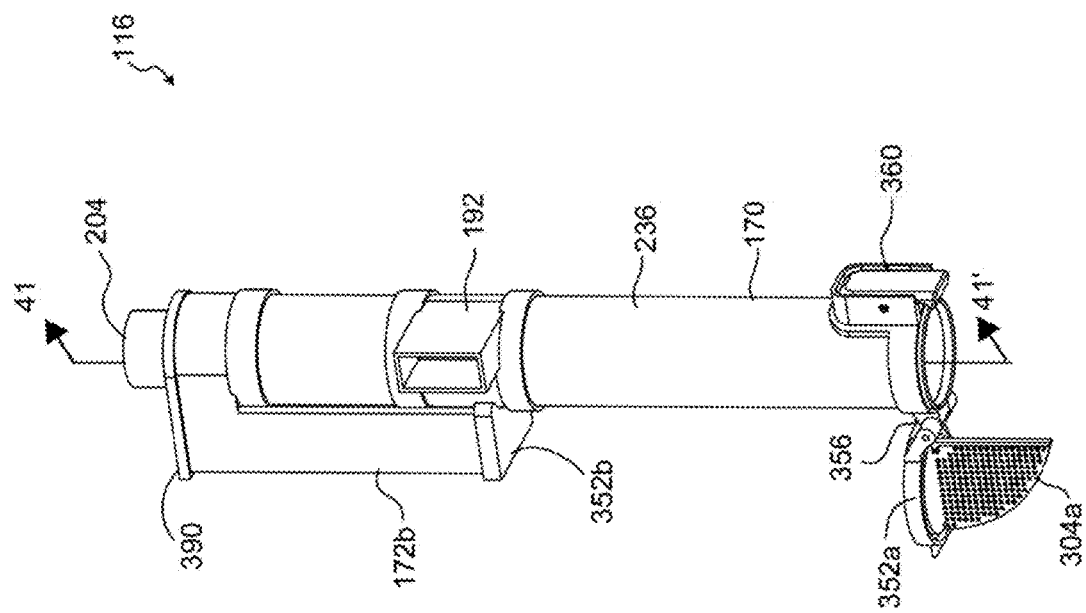
FIG. 40 is a perspective view of the air treatment member of FIG. 38 with an open end wall, in accordance with some embodiments.
Figure 41:
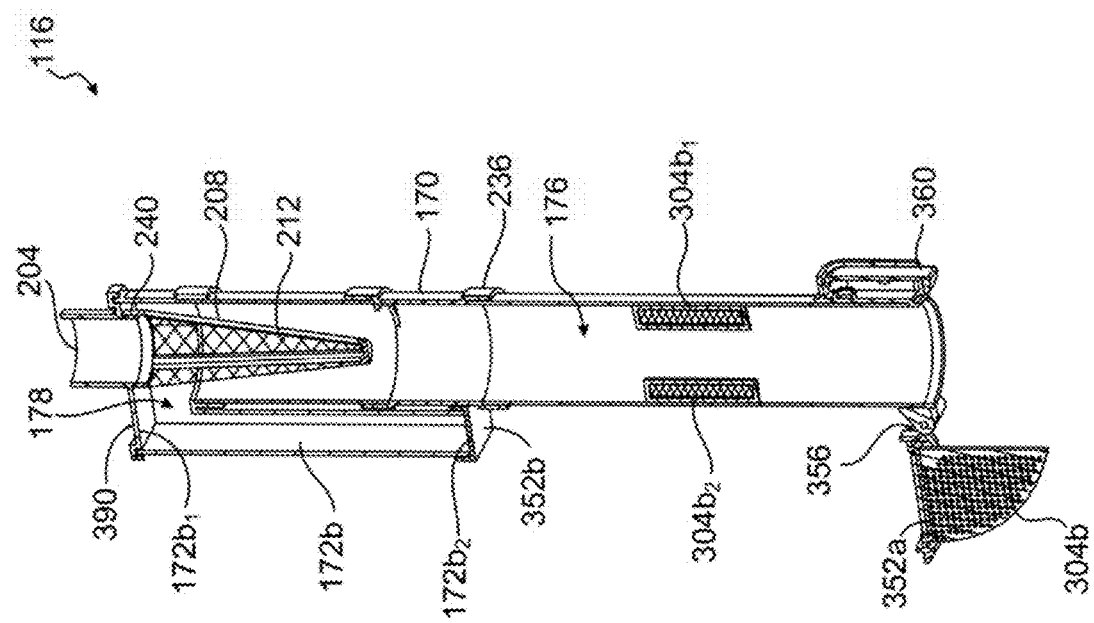
FIG. 41 is a perspective cross-sectional view of the air treatment member of FIG. 40 taken along the section line 41-41' in FIG. 40.
Figure 49:
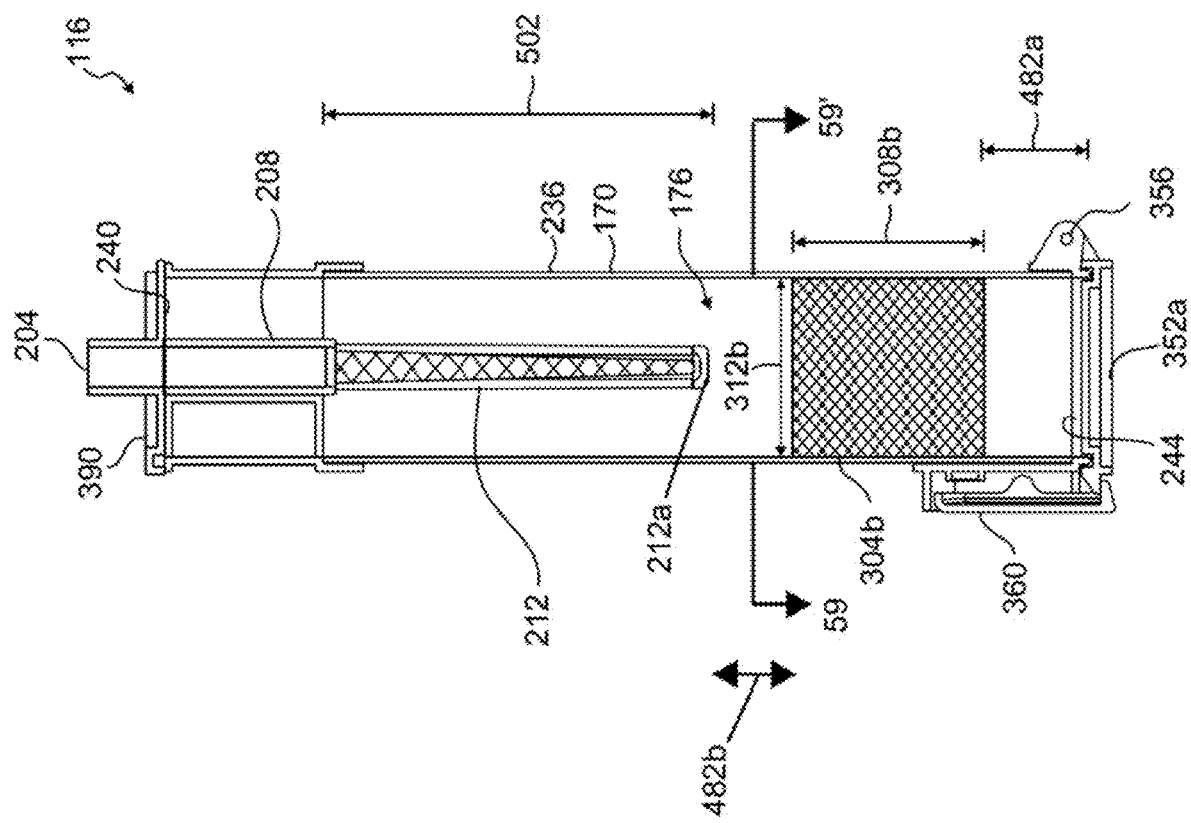
FIG. 49 is a cross-sectional view of the air treatment member of FIG. 35 taken along the section line 37-37' in FIG. 35, in accordance with an embodiment.
Figure 50:
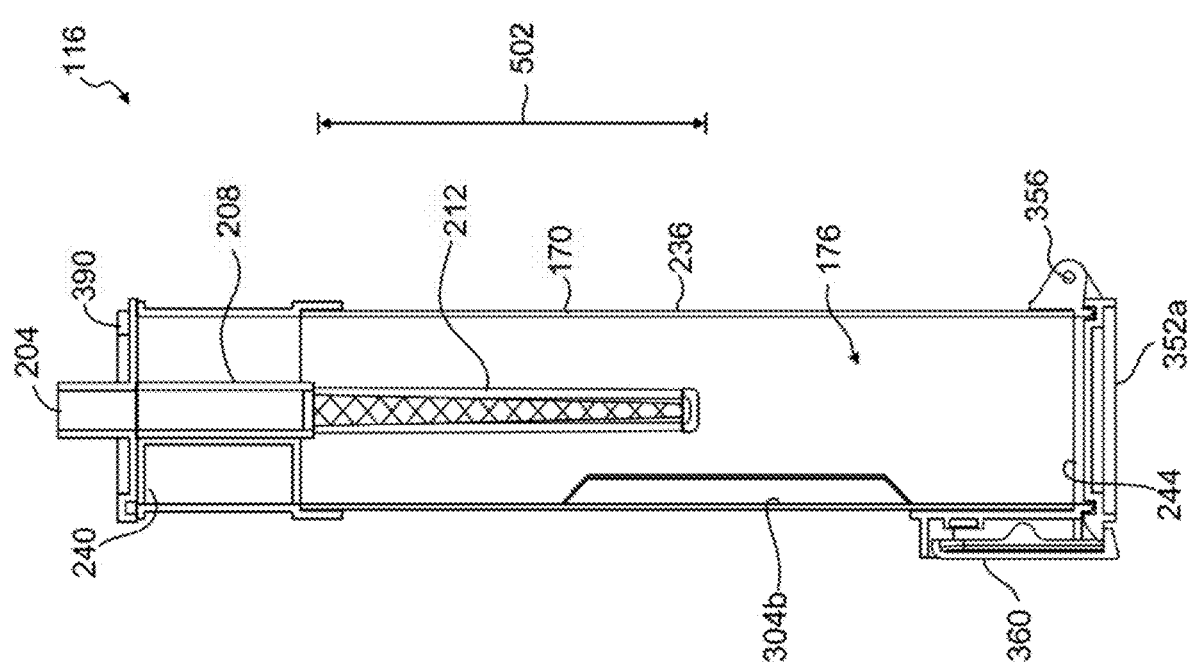
FIG. 50 is a cross-sectional view of the air treatment member of FIG. 35 taken along the section line 37-37' in FIG. 35, in accordance with another embodiment.
Figure 51:
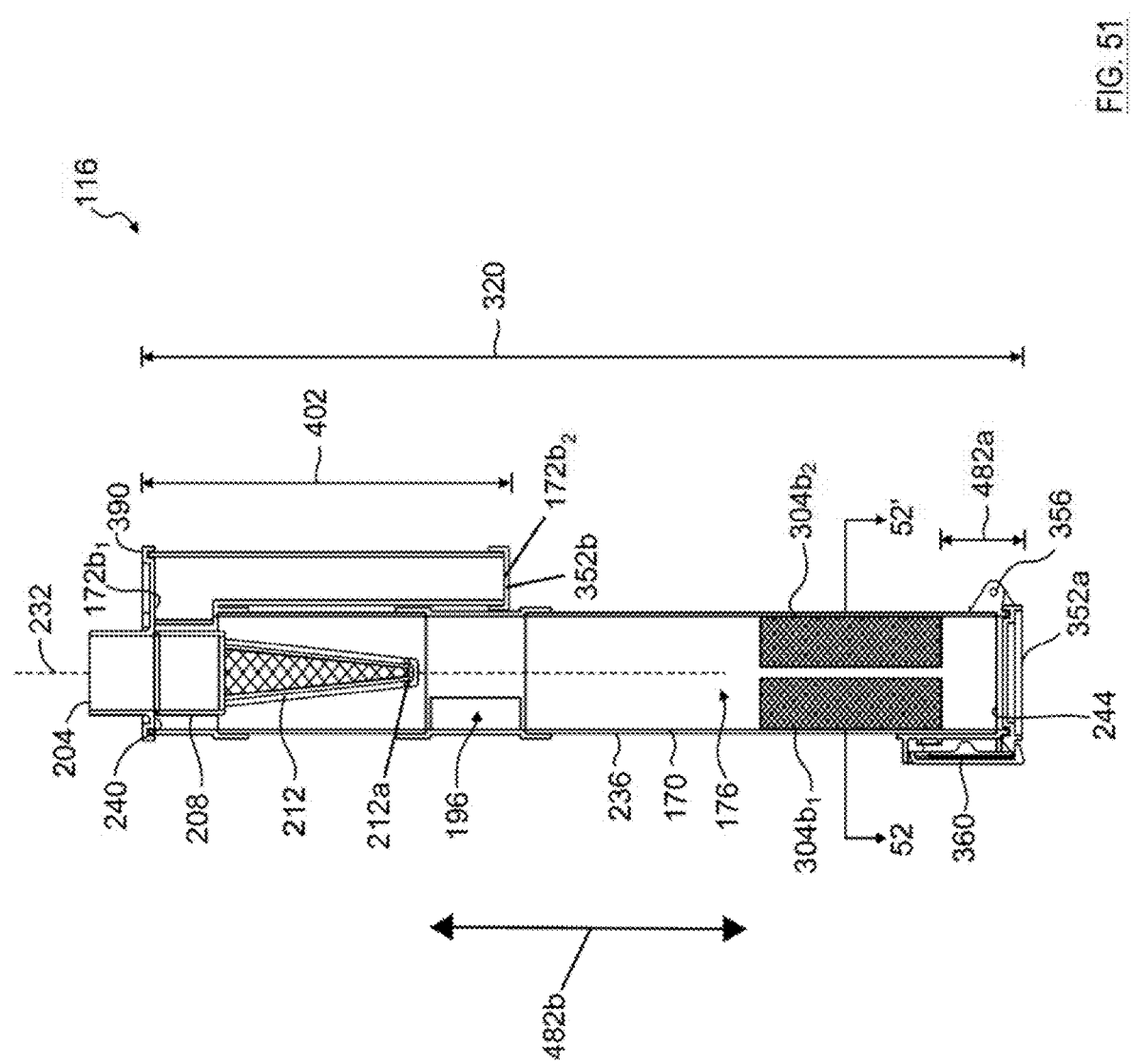
FIG. 51 is a cross-sectional view of the air treatment member of FIG. 35 taken along the section line 36-36' in FIG. 35, in accordance with an embodiment.

Optionally, as best exemplified in FIGS. 39, 42 and 44, a flange 392 may extend around at least a portion of the inner surface of the cyclone sidewall 236, and may extend inwardly, and optionally radially inwardly into the cyclone chamber 176. The flange 392 may be formed of any suitable material, including resilient material. For example, the flange may be made of the same material as the cyclone sidewall and may be molded as part thereof.

In the exemplified embodiments, the flange 392 is positioned axially above the medial inlet 196, and preferably, axially below the cyclone outlet 208 and/or the shroud 212. Without being limited by theory, in this configuration, the flange 392 blocks or inhibits some of the upward air flow into the cyclone chamber 196 from the medial inlet 196. In other words, the flange 392 may control the volume of air entering the upper cyclone portion 320a. An advantage of this configuration is that, by limiting the upward air flow, the flange 392 may assist in a larger portion of the air travelling into the lower cyclone portion 320b and/or block larger dirt particles from being drawn upwardly into the upper portion 320a. Accordingly, the flange 392 may increase the dirt separation efficiency of the cyclone unit 170.

Alternatively, or in addition, a flange may be located axially below the medial inlet 196 (not shown). In this configuration, the flange may inhibit (e.g., block) the downward flow of air into the lower cyclone portion 320b.

As exemplified, the flange 392 may extend by any suitable distance around the inner perimeter of the cyclone side wall 236. For example, the flange 392 may extend entirely around the inner surface of the cyclone sidewall 236 to define a central opening (e.g., FIGS. 44C, 44D, 44G, 44H). In other cases, the flange 392 may extend around only a portion of the inner surface of the cyclone side wall 236 (e.g., FIGS. 44A, 44B, 44E, 44F). For instance, the flange 392 may extend around only a third or a half of the way around the inner perimeter of the cyclone sidewall.

The flange 392 may also extend radially inwardly into the cyclone chamber 176 by any variable distance. For example, the flange 392 may have a maximum radial width 394 of 3 mm (see e.g., FIGS. 44C and 44D) or 6 mm (see e.g., FIGS. 44G and 44H). An advantage of a flange 392 having a greater radial width 394 is that the flange 394 may block a greater volume of air from entering the upper cyclone portion 320a. In contrast, an advantage of a flange 392 having a smaller radial width 394 is that a smaller volume of air is blocked from flowing into the upper cyclone portion 320a. In particular, as more air is permitted to flow upwardly into the upper cyclone portion 320a, a lower volume of air reciprocally flows downwardly, into the lower cyclone portion 320b.

As exemplified, the flange 392 may have a constant (e.g., uniform) radial width 394 (e.g., FIGS. 44C, 44D, 44G, 44H), or may have a variable radial width 394 along different portions of the flange 392 (see e.g., FIGS. 44A, 44B, 44E, 44F).

The radial width 394 of the flange 392 may also be fixed or adjustable. For instance, the radial width of the flange may be adjustable to be greater or smaller. For instance, the flange 392 may function similar to a rotatable iris diaphragm, such that the flange 392 may be rotated inwardly to increase the radial width 394, and rotated outwardly to decrease the radial width 394. Alternatively, or in addition, the flange 392 may be translated inwardly and outwardly of the cyclone chamber 176 to increase and decrease the radial width 394, respectively. An advantage of an adjustable flange configuration is that the radial width may be changed to vary the air flow rate into the upper and lower cyclone portions, respectively. In some cases, an adjusting mechanism can be provided outside of the cyclone chamber 176 to facilitate adjusting of the radial width of the flange 392.

In various embodiments, the flange 392 may also be configured to be planar or flat.

Alternately, or in addition, the flange may extend into the cyclone chamber in a plane that is transverse to the cyclone axis. In other embodiments, the flange may extend into the cyclone chamber at an angle to a plane that is transverse to the cyclone axis.

In other embodiments, the flange 392 may be in the form of a spiral of the like extending around part or all of the circumference of the cyclone sidewall. In embodiments where the flange 392 twists or rotates, the flange may spiral in the direction of cyclonic air flow, or counter the direction of cyclonic air flow.

Exterior Dirt Collection Chamber

The following is a discussion of an exterior dirt collection chamber, which may be may be used by itself or with one or more of the cyclone with an openable sidewall, the moveable screen, the dual end walls, the medial cyclone air inlet, the axially extending member (vertically extending screen), and the dirt ejection mechanism.

Optionally, a dirt collection chamber may be provided external to the cyclone unit chamber. Dust and dirt particles ejected into the external dirt chamber may be separated from the cyclonic air flow in the cyclone chamber and, accordingly, may be prevented from being re-entrained into the flow of air. This, in turn, may increase the dirt separation efficiency of the cyclone unit. In various cases, the external dirt chamber may collect finer particles of dust and dirt, while an internal cyclone dirt chamber may collect coarser particles of dust and dirt.

Referring now to FIGS. 35-41, 48, 51, and 79-83, as exemplified, the air treatment member 116 may include a dirt collection chamber 172b located external to the cyclone chamber 176. The external dirt chamber 172b may collect finer particles of dust and dirt which would not otherwise aggregate inside of the cyclone's internal dirt chamber 172a.

As exemplified, the external dirt chamber 172b may be in fluid communication with the cyclone chamber 176 via one or more dirt outlets 178. For instance, the dirt chamber 172b may communicate with the cyclone chamber 176 via one dirt outlet 178 (e.g., FIGS. 36-41), or two dirt outlets 178a, 178b spaced apart (e.g., FIGS. 79-83).

The dirt outlets 178 may be located in any position along the cyclone unit 170. For instance, the dirt outlets 178 may be laterally positioned along the cyclone side wall 236—e.g., between the first and second cyclone ends 240, 244—to communicate with a laterally positioned dirt collection chamber 172b. In this configuration, the dirt outlets 178 comprise slots which have any suitable axial height and which extend around at least a portion of the perimeter of the cyclone side wall 236. In the exemplified embodiments, the dirt outlets 178 are positioned toward the first cyclone end 240, and axially above the medial inlet 196. An advantage of this configuration is that the dirt outlets 178 are positioned to receive finer particles of dust and dirt carried upwardly by the upflow of air from the medial inlet 196. In other cases, the dirt outlet 178 can also be positioned at any other location along the axial height 320 of the cyclone unit 170, including at the mid-point of the cyclone unit.

As exemplified, the external dirt chamber 172b may be laterally positioned relative to the cyclone sidewall 236. In this configuration, when the first cyclone end 240 is positioned over the second cyclone end 244, the dirt chamber 172b can be sized so as to not increase the axial height of the cyclone unit 170. Alternately, some of the dirt chamber 172b may be provided above or below the cyclone unit 170.

The dirt chamber 172b may partially or fully surround the lateral side of the cyclone chamber 176. For example, the dirt chamber may be located on the side of the cyclone chamber which is provided with the dirt outlet. If more than one cyclone dirt outlet is provided, then the dirt outlets may be in communication with a common external dirt chamber or they may each be in communication with a single external dirt chamber.

As exemplified, the external dirt chamber 172b may extend between a first end $172b_1$ and an axially spaced apart second end $172b_2$. The axial distance between the first and second ends may define the axial height (e.g., depth) 402 of the dirt chamber 172b. Preferably, the dirt chamber 172b extends axially along an axis which is substantially parallel to the cyclone axis 232. In other cases, however, the dirt chamber 172b may extend along any other suitable axis.

The height or depth 402 of the dirt chamber 172 may be variably configured. For example, the dirt chamber 172b may have an axial height 402 which is approximately $\frac{1}{3}^{rd}$ of the cyclone height 320 (e.g., FIG. 37), ½ of the cyclone height (e.g., FIG. 83), $\frac{2}{3}^{rd}$ the cyclone height (e.g., FIG. 35), or substantially equal to the cyclone axial height (e.g., FIGS. 79-81). As stated previously, an advantage of a dirt chamber 172b having an axial height which is less than or equal to the cyclone height 320 is to limit the extent to which the depth (e.g., height) of the cyclone unit is increased. In other cases, however, the dirt chamber 172b may have an axial height which is greater than the cyclone unit height. In still yet other cases, different portions of the external dirt chamber 172b may have different axial heights.

As exemplified, the dirt chamber ends $172b_1$ and $172b_2$ may be positioned in any location relative to the cyclone chambers ends 240, 244. For instance, in some cases, the first dirt chamber end $172b_1$ may be substantially flush with the first cyclone end 240 (e.g., FIG. 36). An advantage of this configuration is that the first cyclone end 240 may be concurrently openable with the first dirt chamber end $172b_1$, as explained in further detail herein. For example, the first cyclone end 240 and the first dirt chamber end $172b_1$ may be a common member (e.g., a single openable end wall). In other embodiments, the first dirt chamber end $172b_1$ may be axially offset from the first cyclone end 240. In either case, preferably, the first dirt chamber end $172b_1$ is positioned at, or proximal to, the dirt outlet 178. In this manner, dirt is ejected into the top of the dirt chamber 172b, and can fall downwardly to the second dirt chamber end $172b_2$ (assuming the first chamber end $172b_1$ is positioned above the second chamber end $172b_2$).

Figure 37:
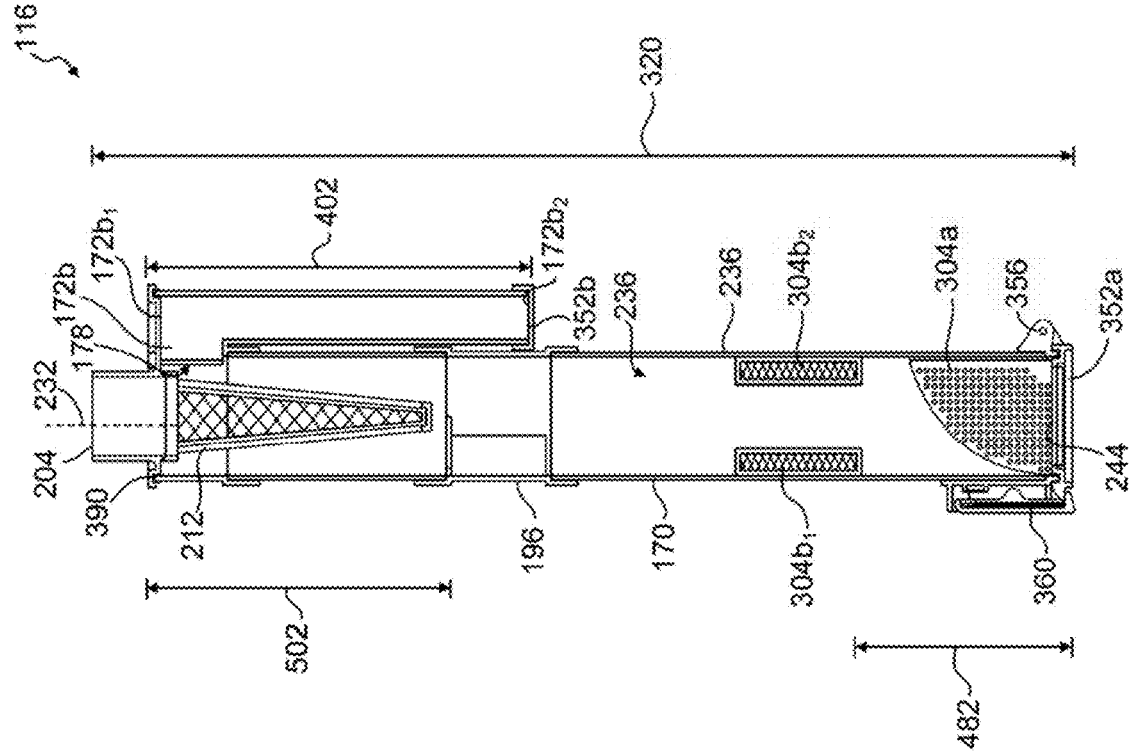
FIG. 37 is a cross-sectional view of the air treatment member of FIG. 35 taken along the section line 37-37' in FIG. 35, in accordance with some embodiments.

Similarly, the second chamber end $172b_2$ can be substantially flush with the second cyclone end 244 (e.g., FIG. 79), slightly axially offset from the second cyclone end (e.g., FIG. 81), or substantially axially offset from the second cyclone end (e.g., FIG. 37). An advantage of this configuration is that the second cyclone end 244 may be concurrently openable with the first dirt chamber end $172b_2$. For example, the second cyclone end 244 and the first dirt chamber end $172b_2$ may be a common member (e.g., a single openable end wall).

As discussed previously, optionally, one or both of the dirt chamber ends $172b_1$, $172b_2$ is openable to allow cleaning and emptying of the dirt collection chamber 172b. Optionally, the dirt chamber ends $172b_1$, $172b_2$ are concurrently openable with a respective first or second cyclone end 240, 244 to allow concurrent cleaning and emptying of the cyclone chamber and the dirt collection chamber.

For instance, as exemplified in FIG. 48, the first chamber end $172b_1$ may be flush with the first cyclone end 240, and the two chambers may be concurrently openable via a single openable top lid 390. Similarly, the second dirt chamber end $172b_2$ may be concurrently openable with the second cyclone end 244. For instance, as exemplified in FIGS. 79-82, the second chamber end $172b_1$ may be located in the same plane as the second cyclone end 244 (e.g., FIGS. 79 and 80), or slightly axially offset (e.g., FIGS. 81 and 82), and may share a common door 352. Opening a single door (e.g., door 352) may allow concurrent cleaning and emptying of both the external dirt chamber 172b and the internal cyclone dirt chamber 172a. In other cases, as exemplified in FIGS. 37-40, the dirt collection chamber 172 may have a separate door 352b for independently emptying and cleaning the dirt chamber 172b. For example, this configuration may be more suitable where the second dirt chamber end $172b_2$ is substantially axially offset from the second cyclone end 244 (e.g., FIGS. 37-40).

While only a single dirt chamber 172b has been exemplified in the illustrated embodiments, it will be appreciated that the air treatment member 116 may also include more than one external dirt chamber 172b. For example, two or more dirt chambers 172b may be in communication with the cyclone chamber 176. The two or more dirt chambers may be positioned, for example, on different lateral sides of the cyclone unit 170, or on the same lateral side of the cyclone unit 170 (e.g., vertically stacked). The two or more dirt chambers may communicate with the cyclone chamber 176 via separate dirt outlets 178, or via a single common dirt outlet. Where the cyclone unit 170 includes more than one cyclone stage (e.g., $168_1$ and $168_2$ in FIG. 89), each cyclone stage may also communicate with a separate external dirt chamber, or the cyclone stages may communicate with a single external dirt chamber (e.g., via separate dirt outlets).

Axially Extending Member (or Vertical Screen)

The following is a discussion of an axially extending member (vertically extending screen), which may be may be used by itself or with one or more of the cyclone with an openable sidewall, the moveable screen, the dual end walls, the medial cyclone air inlet, the exterior dirt collection chamber, and the dirt ejection mechanism.

In accordance with this aspect, the cyclone chamber and/or the external dirt chamber may be provided with an axially extending member 304 which may be planar and which may be porous. The axially extending member 304 may be provided inside the cyclone chamber 176 (e.g. the dirt collection region 172a of the cyclone chamber 176) (see e.g., FIGS. 1-95B), and/or can be provided inside of the external dirt collection chamber 172b (see e.g., FIGS. 96-100). The axially extending member may also be referred to herein as a "vertically extending member" (or a "vertical screen" if the vertically extending member is porous) when the first cyclone end 240 is positioned over the second cyclone end 244, or when the first external dirt chamber end 172b$_1$ is positioned over the second external dirt chamber end 172b$_2$.

Axially extending member 304 may help to dis-entrain dirt and debris from the air flow. Alternatively or in addition, axially extending member 304 may help to prevent dirt and debris being re-entrained into the air flow inside the cyclone chamber 176 (e.g. inside the dirt collection region 172a of the cyclone chamber 176), and/or the external dirt chamber 172b.

Axially extending member 304 can have any configuration suitable for providing one or both of these functions. For example, axially extending member 304 may include a thin panel (e.g., a plate) which may be solid, or at least partially provided with a plurality of small apertures. The axially extending member 304 may also comprise a coarse or fine screen, or any other suitable high air permeability physical filter media that can allow the air flow to continue circulating while providing some obstruction to dirt and debris and/or providing collecting surfaces for dirt and debris.

In the exemplified embodiments, the axially extending member 304 comprises a thin panel (e.g., plate) with a plurality of small apertures 306. The axially extending member 304 may have any suitable number of apertures. For example, the axially extending member 304 may include at least 50 apertures, such as for example 50 to 5,000 apertures. The apertures 306 may have any suitable shape or configuration. For instance, the apertures may be circular or round (e.g., FIG. 64), oval (e.g., FIG. 65), rectangular (e.g., FIG. 66), triangular, square, and/or any combination of the aforementioned shapes (e.g., FIG. 67). In embodiments where the apertures are circular, the circular apertures may have a diameter of between 0.01"-0.5", 0.04"-0.25", or 0.06-0.125".

The axially extending member 304 may have any variably configured axial height 308, transverse width 312, and thickness 316. For example, in the exemplified embodiments, each of the axial height 308 and transverse width 312, is far greater than its thickness 316. An advantage of this design is that it provides axially extending member 304 with a large surface area (defined by height 308 and width 312) for obstructing and/or collecting dirt and debris, and a small volume so as to occupy only a small portion of cyclone chamber 176. For example, each of height 308 and width 312 may be at least 500% (e.g. 500% to 100,000%) of the thickness 316. As shown, height 308 may be 25% or more of cyclone chamber height 320 or the dirt chamber height 402 (e.g. 25% to 75% of cyclone chamber height 320), and width 312 may be 25% or more of cyclone chamber width 324 or the dirt chamber width (FIG. 1, e.g. 25% to 100% of cyclone chamber width 312).

The axially extending member 304 may be connected to one or more sidewall or end wall portions of the cyclone chamber 176 and/or the external dirt chamber 172b. For example, FIGS. 20-24, 32-34, 36-41 exemplify an embodiment where a vertical screen 304a is connected to the second cyclone end wall 352a (also referred to herein as an "vertical 'end' screen" 304a, if the axially extending member that is attached to an end wall is porous). Similarly, FIGS. 96-100 exemplify an embodiment where the vertical end screen 304a is connected to the second dirt chamber end wall 352b. FIGS. 37-39 and 48-51 exemplify an embodiment wherein the axially extending member 304 is connected to a sidewall. Accordingly, axially extending member 304 may be also referred to herein as a "vertical 'side' screen" 304b, if the axially extending member that is attached to a sidewall is porous.

If the axially extending member is connected to the second cyclone end wall 352a and/or the second dirt chamber end wall 352b, then the vertical end screen 304a may be removable from the cyclone chamber/dirt chamber when the second cyclone end wall 352a and/or the second dirt chamber end wall 352b is opened (see e.g., FIGS. 32, 40 and 41, 97-98, and 100-101). Alternately, if the vertical screen is attached to the inner surface of the cyclone sidewall 236 or dirt chamber sidewall rather than end wall 352a and/or 352b, the vertical side screen 304b remains in position even when the second cyclone end 352 is openable.

Figure 52:
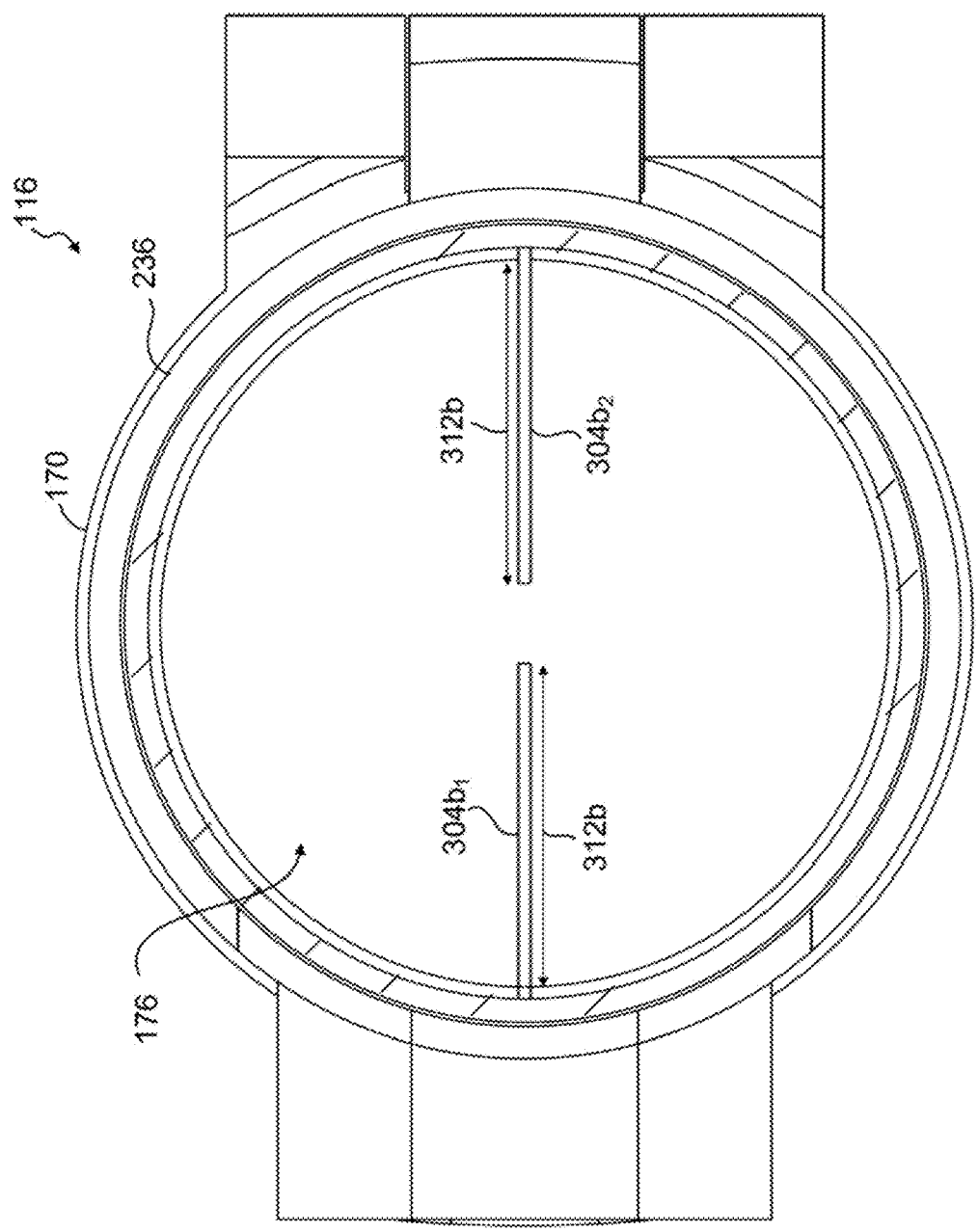
FIGS. 52-57 are cross-sectional views of the air treatment member of FIG. 51 taken along the section line 52-52' in FIG. 51, in accordance with various different embodiments.
Figure 53:
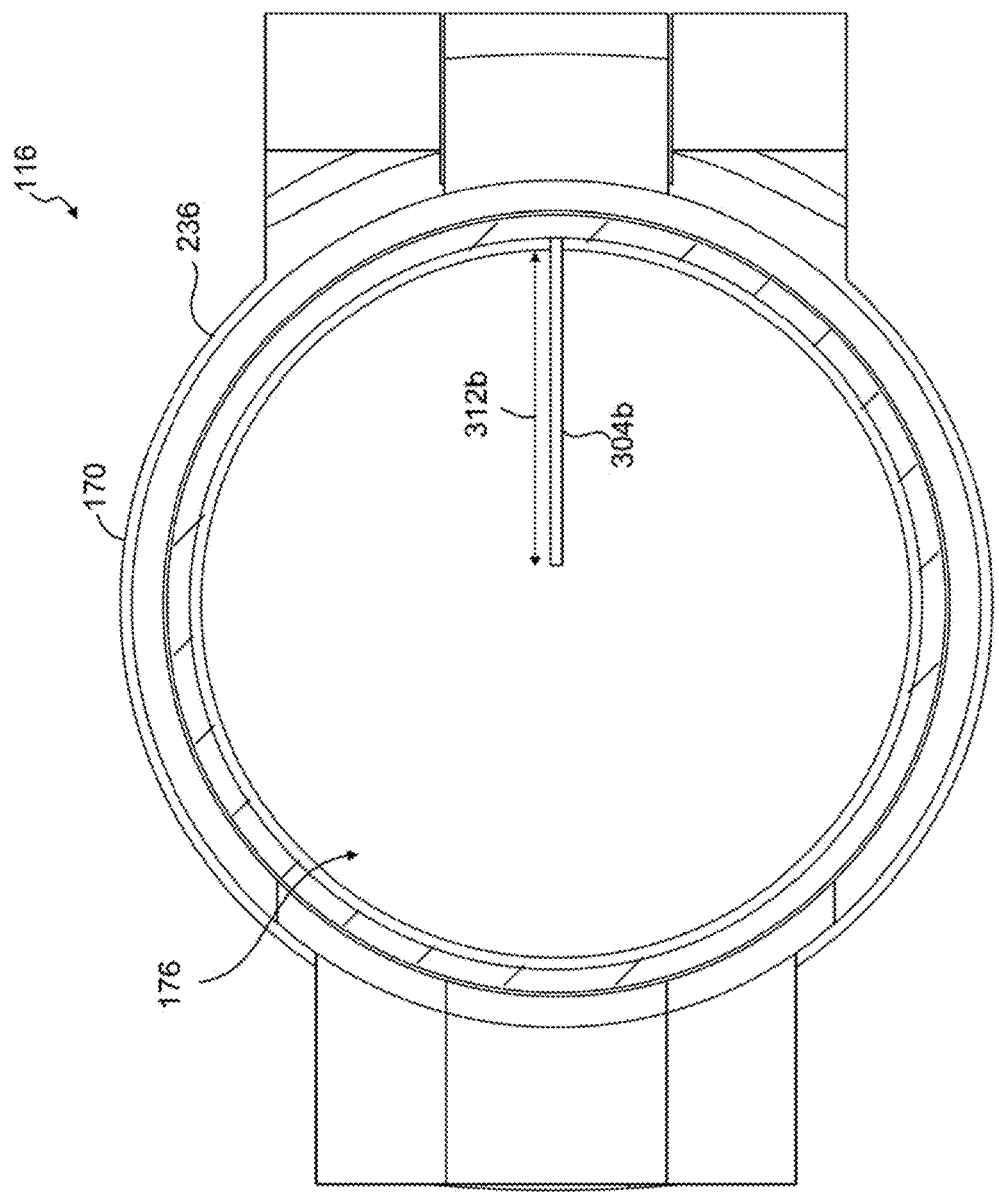
Figure 54:
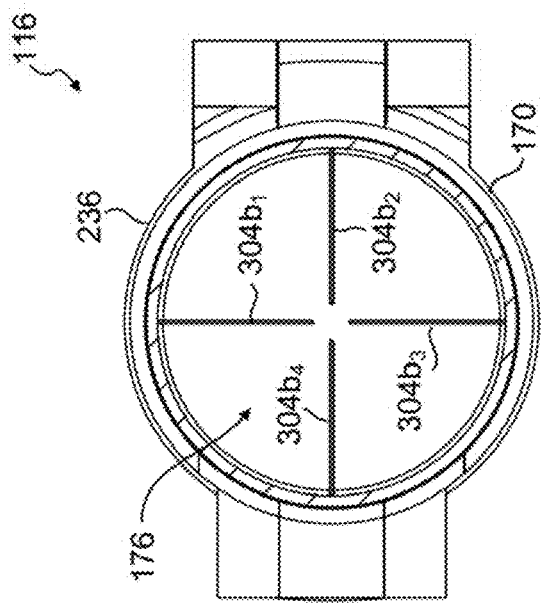
Figure 56:
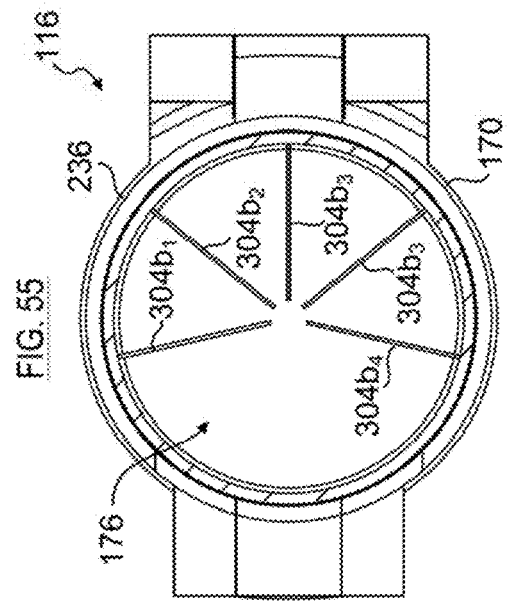
Figure 55:
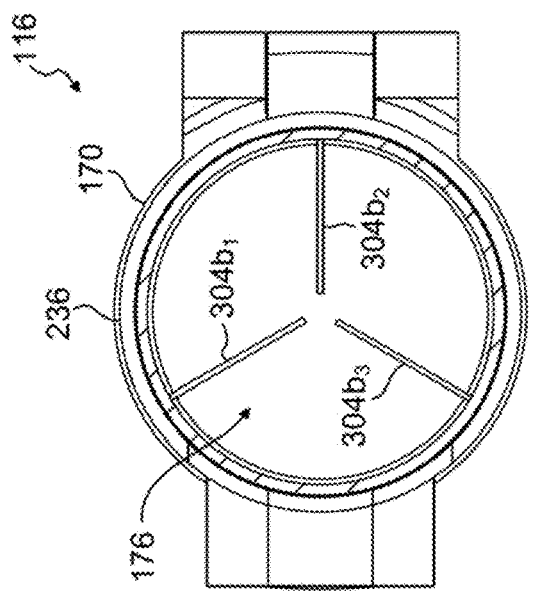

As exemplified, any number of vertical side screens 304b may be provided inside of the cyclone chamber 176 and/or the dirt chamber. For example, there may be one vertical side screen (e.g., FIG. 52), two vertical side screens (e.g., FIGS. 37, 39, 41, 48, 53), three vertical side screens (e.g., FIGS. 54 and 55), four vertical side screens (e.g., FIG. 55), or five vertical side screens (e.g., FIG. 56).

Figure 57:
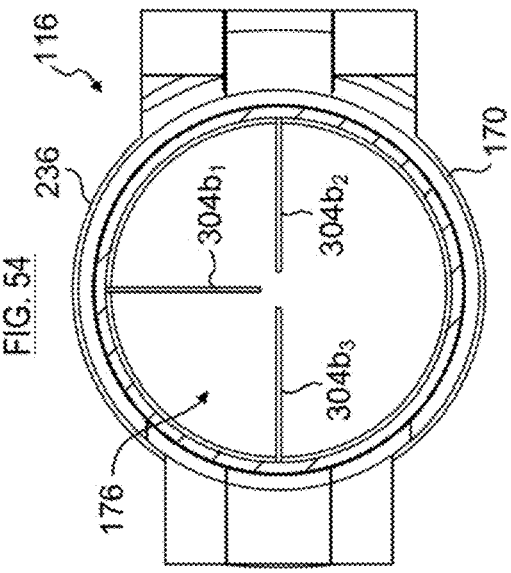
Figure 58:
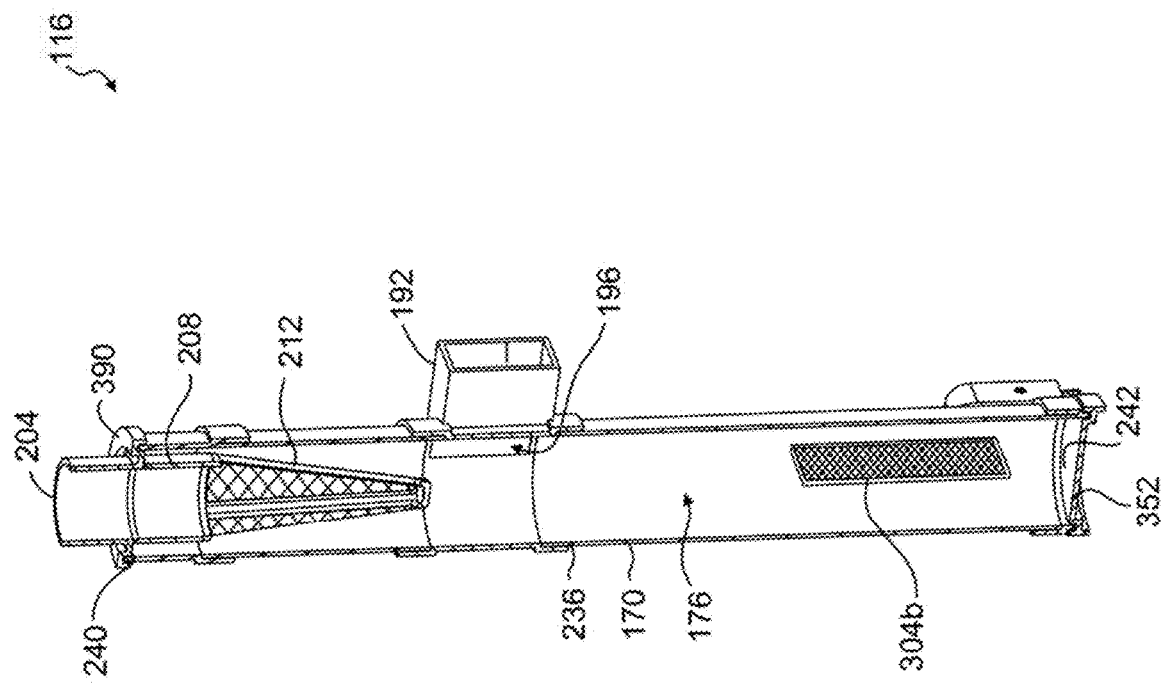
FIG. 58 is a perspective cross-sectional view of the air treatment member of FIG. 35 taken along the section line 36-36' in FIG. 35, in accordance with some embodiments.
Figure 59:
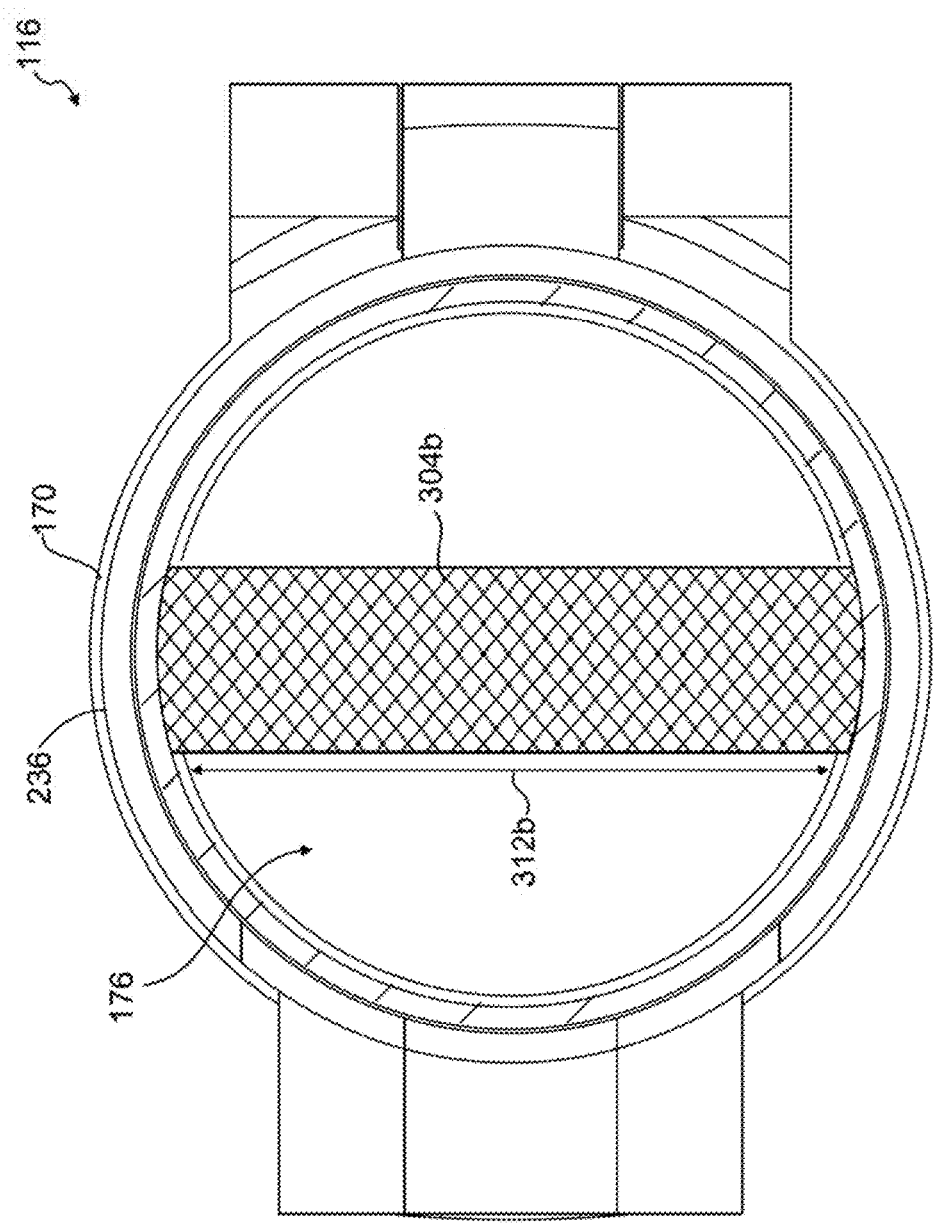
FIG. 59 is a cross-sectional view of the air treatment member of FIG. 49 taken along the section line 59-59'.
Figure 69B:
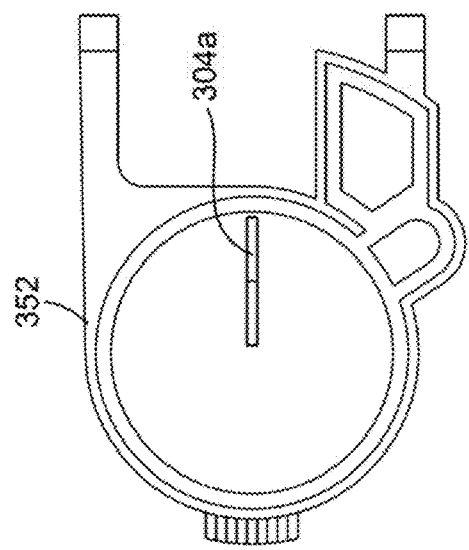
FIG. 69B is a top-down view of the vertical screen of FIG. 69A.
Figure 69C:
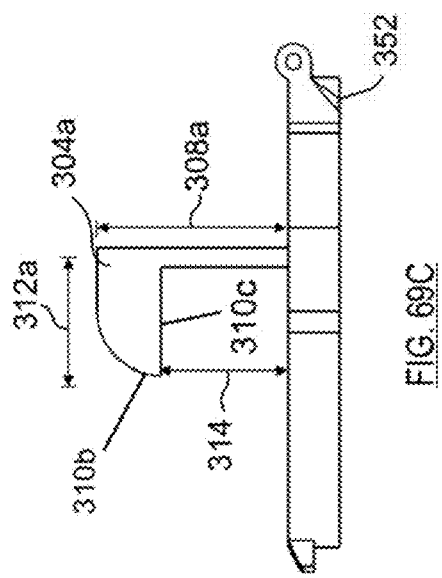
FIG. 69C is a side-view of the vertical screen of FIG. 69A.
Figure 69A:
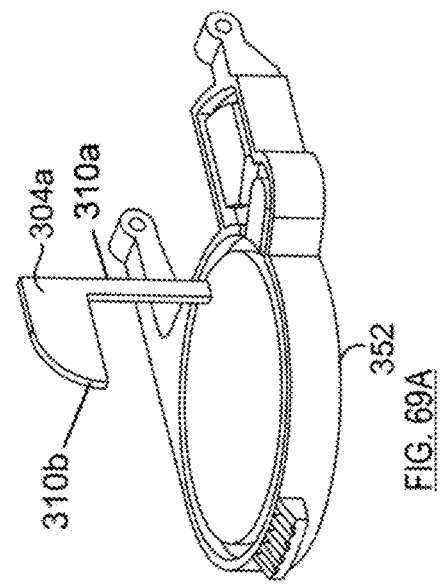
FIG. 69A is a perspective view of a vertical screen, according to another embodiment.
Figure 72B:
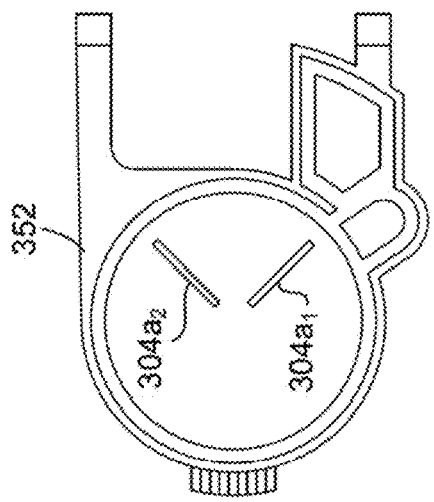
FIG. 72B is a top-down view of the vertical screens of FIG. 72A.
Figure 72C:
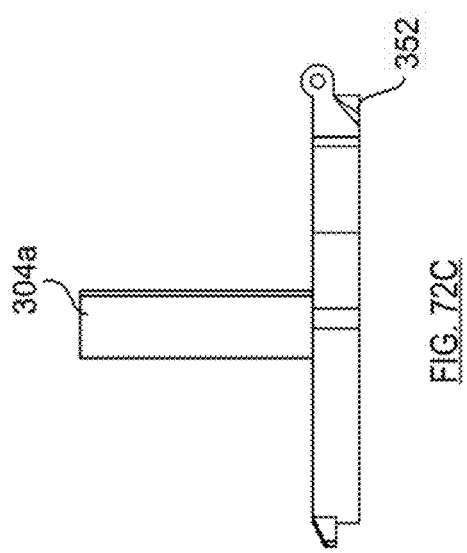
FIG. 72C is a side-view of the vertical screens of FIG. 72A.
Figure 72A:
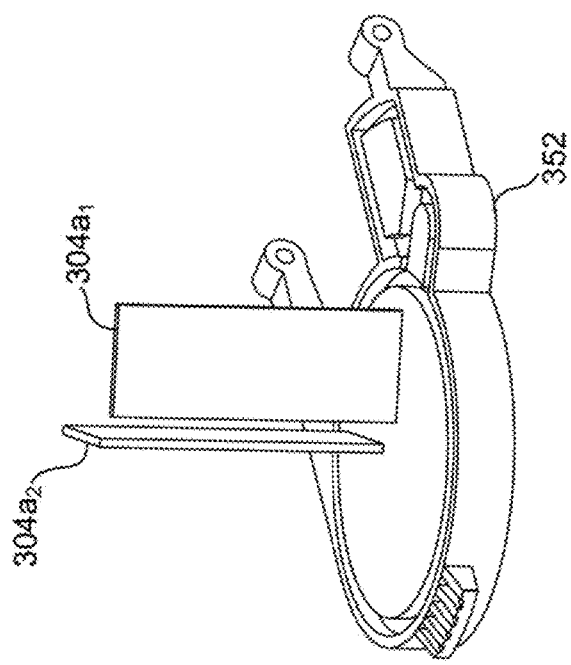
FIG. 72A is a perspective view of vertical screens, according to another embodiment.
Figure 73B:
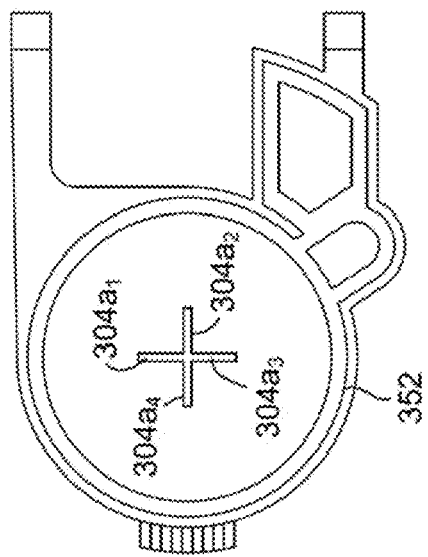
FIG. 73B is a top-down view of the vertical screens of FIG. 73B.
Figure 73C:
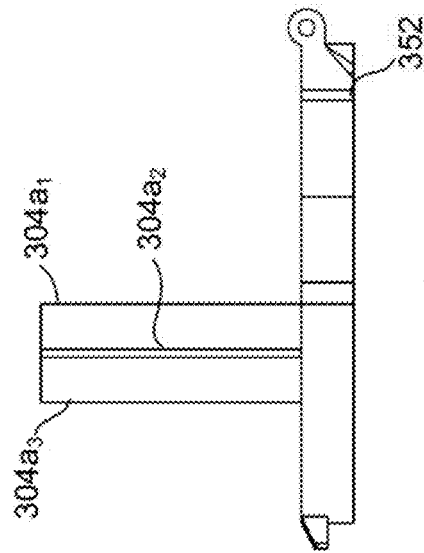
FIG. 73C is a side-view of the vertical screens of FIG. 73C.
Figure 73A:
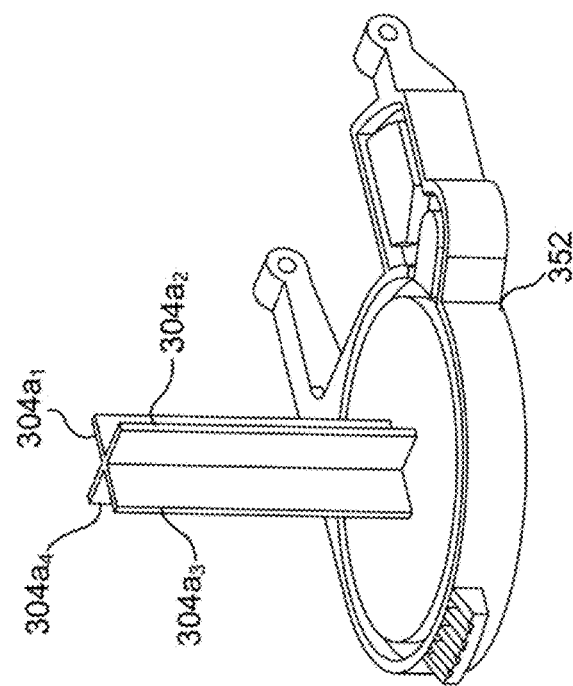
FIG. 73A is a perspective view of vertical screens, according to another embodiment.

Similarly, any number of vertical end screens 304a may be provided inside of the cyclone chamber 176 and/or the dirt chamber 172b. For example, there may be one vertical end screen (e.g., FIGS. 64-71), two vertical end screens (e.g., FIG. 72), three vertical end screens (e.g., FIG. 75), or four vertical end screens (e.g., FIG. 73). In cases where more than one vertical end screen 340a is located inside of the cyclone unit 170 or external dirt chamber 172b, the vertical end screens 340a may be spaced from each other (e.g., FIG. 72), or otherwise, connected or integrally molded to each other (e.g., FIGS. 73 and 75). Further, they may be the same or different.

Where more than one vertical side screen 304b is provided, the vertical side screens may be spaced in any manner inside of the cyclone chamber 176. For instance, the vertical side screens 304b may be evenly spaced around the entire inner circumference of the cyclone side wall 236 (e.g., FIGS. 52, 54 and 55). In other cases, the vertical side screens 304b may be evenly spaced around only a portion of the inner circumference of the side wall 236 (e.g., FIGS. 56 and 57). In still other cases, the vertical side screens 304b may unevenly spaced around the inner circumference of the sidewall. In still yet other cases, rather than being spaced around the inner circumference of the sidewall, the vertical screens may be vertically (e.g., axially) stacked, and may be along a common plane.

Similarly, as exemplified, the vertical end screens 304a may be positioned at any location along the cyclone end wall 352a and/or the dirt chamber end wall 352b. For example, the vertical end screens 304a may be positioned radially inwardly from the cyclone side wall 236 (e.g., FIG. 73-75) or dirt chamber side wall, or otherwise, proximal the cyclone side wall 236 (see e.g., FIGS. 69-71) or dirt chamber side wall. Similarly, they may be evenly spaced apart along the end wall of they may be provided on only a sector of the end wall.

The vertical side screens 304b may have any suitable shape or design. For example, the vertical side screen 304b may comprise an axially extending rectangular member (e.g., FIGS. 49 and 51), a trapezoidal member (e.g., FIG. 50), or a "shark fin" shaped member (e.g., FIG. 8). In some cases, the vertical screen 304b may have at least a portion which is slanted (e.g., angularly offset) (see e.g., FIG. 60). The slanted portion may be slanted, for example, in the direction of cyclonic air flow, or in a direction counter the direction of cyclone air flow. In still other embodiments, at least a portion of the vertical screen 304b may be arcuate or twisted or spiraled (e.g., FIG. 61). The twisted portion may have an angular twist in a range of 1°-720°, 10°-360°, or 30°-270°. The twisted portion may also twist in the direction of cyclonic air flow, or counter the direction of cyclonic air flow.

The vertical side screens 304b may be positioned at various axial elevations within the cyclone chamber 176. For example, as exemplified in FIGS. 49 and 51, the vertical side screen 304b may be offset from the second cyclone end 244 by an axial offset distance 482a. The offset distance 482 may be, for example, 0-35 times, 0.25-25 times, 1-15 times, or 2-5 times the axial height 196a of the cyclone inlet 196. The axial elevation of the vertical screen 304b may also be expressed relative to the position of the shroud 212 (see e.g., FIGS. 49 and 51). For instance, the vertical side screen 304b may be axially offset from the axially inner end 212a of the shroud 212 by a distance 482b of 0-40 times, 0.5-25 times, 1-5 times, or 1-3 times the cyclone inlet height 196a. In embodiments where more than one vertical screen 304b is located inside of the chamber 176, the vertical side screens 304b may be positioned at the same axial elevation (see e.g., FIG. 51), or at different axial elevations. Preferably, in either case, the vertical side screens 304b are positioned at an axial elevation located below the cyclone air inlet 196.

The side vertical screens 304b may radially extend into the cyclone chamber 176 by any variable distance. For instance, as exemplified in FIGS. 44 and 49, the vertical side screen 304b may have a radial extension 312b which spans substantially across the entire cyclone chamber 176. In other cases, as exemplified in FIGS. 52-57, each vertical screen 304b may only partially extend into the cyclone chamber 176. In cases where more than one vertical side screen 304b is provided, each vertical side screens 304b may have the same radial extension 312b, or different radial extensions.

The vertical end screen 304a may have any suitable shape or design. Optionally, if the axially extending member is connected to the second cyclone end wall 352a and/or the second dirt chamber end wall 352b, then the vertical end screen 304a may be configured such that when the second cyclone end wall 352a, 376, 380 is opened, or when the second external dirt chamber end wall 352b is opened, the vertical end screen 304a may be concurrently movable with the openable end wall 352a, 352b, 376, 380 to an open position (see e.g., FIGS. 32, 40 and 41, 97-98, and 100-101). In this manner, the vertical end screen 304a may be accessible for cleaning, and dirt and debris may be removed from the vertical end screen. In other cases, the vertical end screen 304a may not be concurrently moveable with an openable second cyclone or dirt chamber end wall, and may remain in-position when part or all of end wall 352, 376, 380 is opened (see e.g., FIGS. 23-24).

For example, as exemplified, if the end wall is pivotably mounted to the cyclone unit, then a portion of the vertical end screen may contact a part of the cyclone chamber sidewall and/or dirt chamber sidewall when the end wall is pivoted open. Accordingly, the side of the vertical end screen that is spaced furthest from the pivot axis of an openable end wall may be recessed sufficiently radially inwardly towards the side with the pivot axis such that the vertical end screen may be removed from the chamber without contacting the sidewall of the chamber. For example, the vertical end screen may be thin (see, e.g., FIGS. 71a-71c) and/or positioned offset radially inwardly towards the side of the end wall with the pivot axis (see, e.g., FIGS. 69a-69c, 70a-70c, 71a-71c, 72a-72c) and/or the side of the vertical end screen furthest from the side of the chamber with the pivot axis may be shaped to avoid contact with the chamber sidewall as the end wall is opened and the vertical end screen is withdrawn from the chamber (see, e.g., FIGS. 63-67, 68a-68c, 69a-69c, 70a-70c).

FIGS. 32-34 and 63-67 exemplify an embodiment wherein the side of the vertical end screen furthest from the side of the chamber with the pivot axis is shaped to avoid contact with the chamber sidewall as the end wall is opened and the vertical end screen is withdrawn from the chamber. In these embodiments, the vertical end screen 304a comprises a "shark fin" design. As best exemplified in FIG. 63, the screen 304a curves downwardly between a first side 310a (e.g., proximal the hinge 356), and a distally opposed second side 310b. The downward curvature of the screen 304a prevents the screen 304a from colliding (e.g., interfering) with the cyclone sidewall 236 (or dirt chamber side wall) when the door 352a is being opened (see e.g., FIGS. 32 and 63).

Figure 70B:
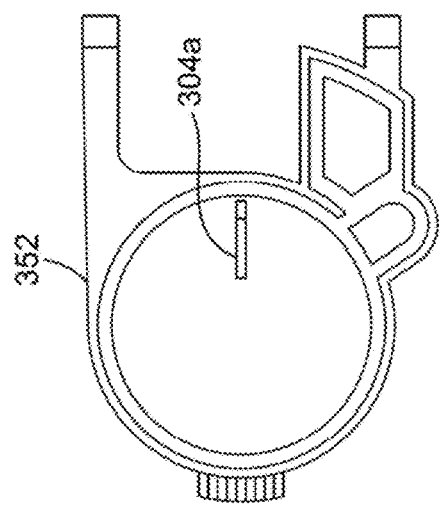
FIG. 70B is a top-down view of the vertical screen of FIG. 70A.
Figure 70C:
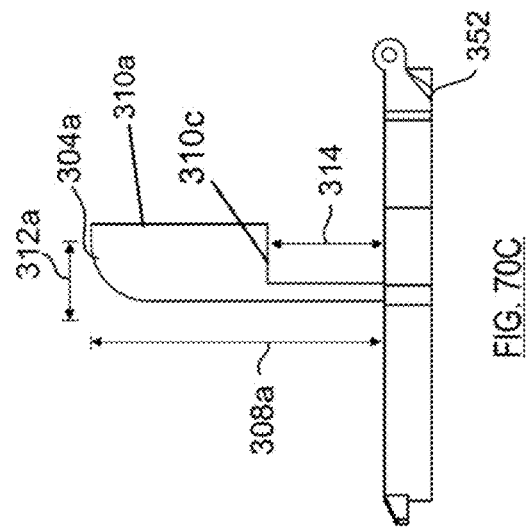
FIG. 70C is a side-view of the vertical screen of FIG. 70A.
Figure 70A:
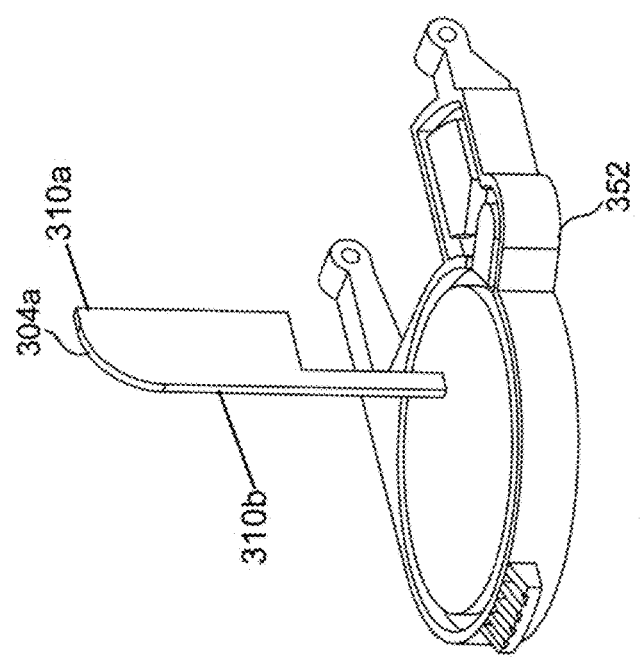
FIG. 70A is a perspective view of a vertical screen, according to another embodiment.
Figure 71B:
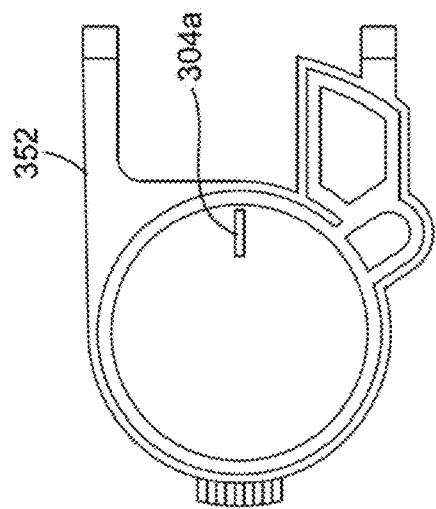
FIG. 71B is a top-down view of the vertical screen of FIG. 71A.
Figure 71C:
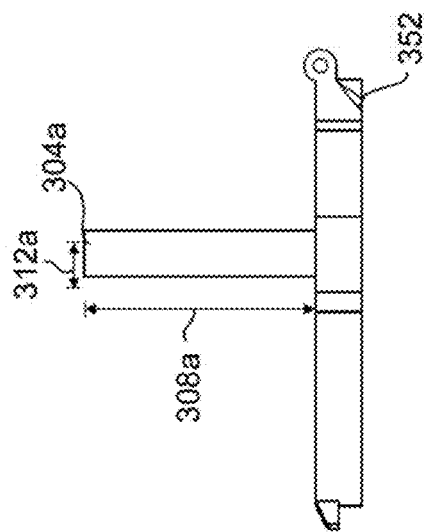
FIG. 71C is a side-view of the vertical screen of FIG. 71A.
Figure 71A:
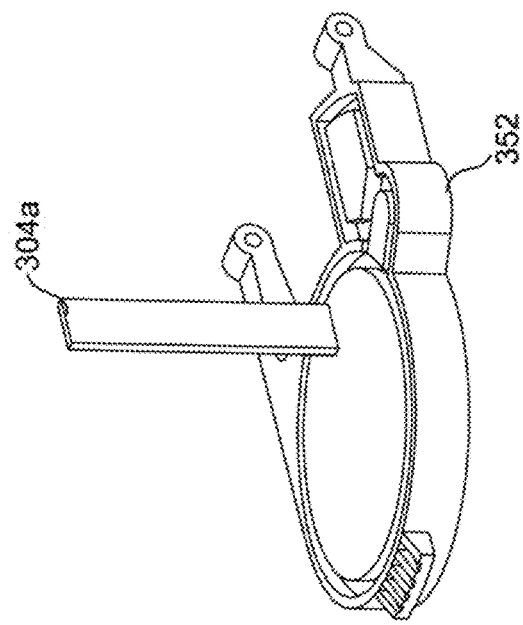
FIG. 71A is a perspective view of a vertical screen, according to another embodiment.

FIGS. 64-67 exemplify an embodiment of a shark fin design wherein the bottom edge 310c of the screen 304a is flush with the second cyclone end wall 352 (e.g., it may be secured to the end wall). FIGS. 68a-68c and 69a-69c exemplify another embodiment of a shark fin design wherein a portion of the bottom edge 310c—proximal the second vertical screen side 310b—is axially offset from the end wall 352 by an offset distance 314 (e.g., the shark fin design comprises a generally right-angular design). FIGS. 70a-70c exemplify another embodiment of a shark fin design wherein the bottom edge 310c—proximal the first vertical screen side 310a—is axially offset from the second cyclone end wall 352 by offset distance 314. By spacing the vertical end screen a distance 314 from the end wall by a vertical support member and to the side of the end wall closest to the hinge 356, the degree of curvature of the vertical end screen may be reduced.

It will be appreciated that in other embodiments, the vertical end screen 304a may not necessarily curve downwardly between the first side 310a and second side 310b, but may otherwise have a first side 310a which is axially elevated relative to the second side 310a. For example, the vertical screen 304a may slant downwardly at an angle to the vertical from an axially elevated first side 310a to an axially depressed second side 310b (e.g., it may be generally triangular in shape). This configuration may also ensure that that the vertical end screen 304a does not collide (e.g., interfere) with the cyclone sidewall 236 or dirt chamber side wall when the cyclone or dirt chamber end wall 352a, 352b is openable.

Figure 77B:
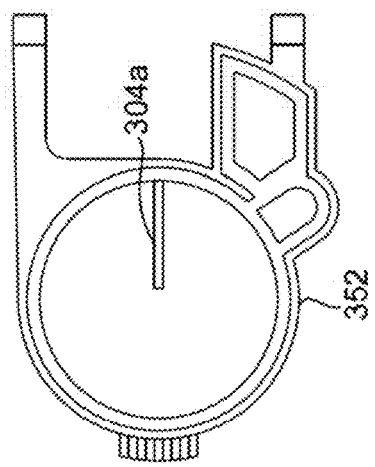
FIG. 77B is a top-down view of the vertical screen of FIG. 77A.
Figure 77C:
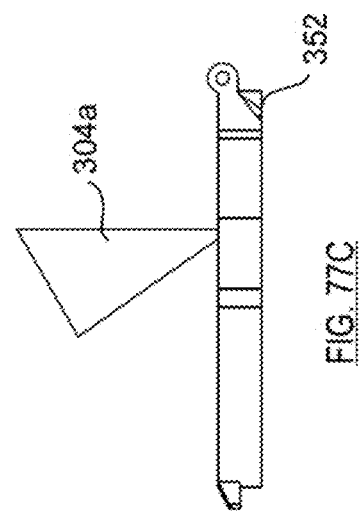
FIG. 77C is a side-view of the vertical screen of FIG. 77A.
Figure 77A:
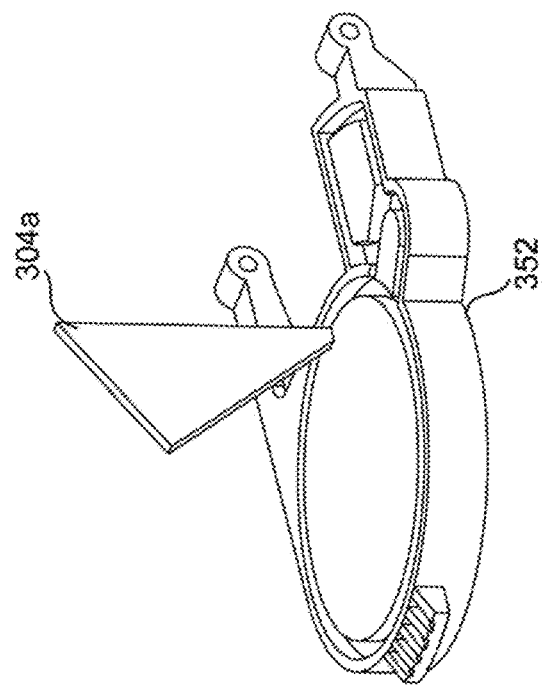
FIG. 77A is a perspective view of a vertical screen, according to another embodiment.
Figure 78B:
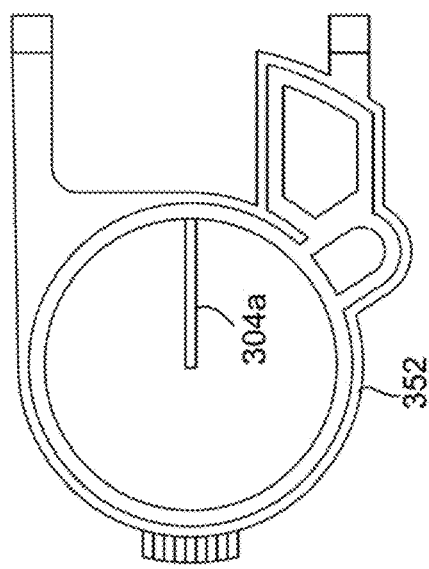
FIG. 78B is a top-down view of the vertical screen of FIG. 78A.
Figure 78C:
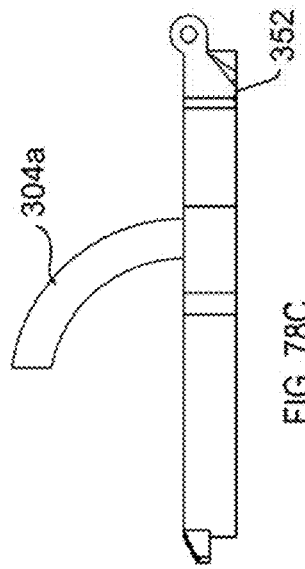
FIG. 78C is a side-view of the vertical screen of FIG. 78A.
Figure 78A:
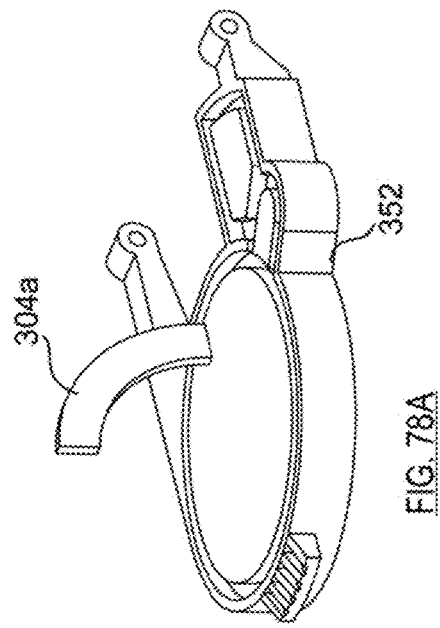
FIG. 78A is a perspective view of a vertical screen, according to another embodiment.
Figure 81:
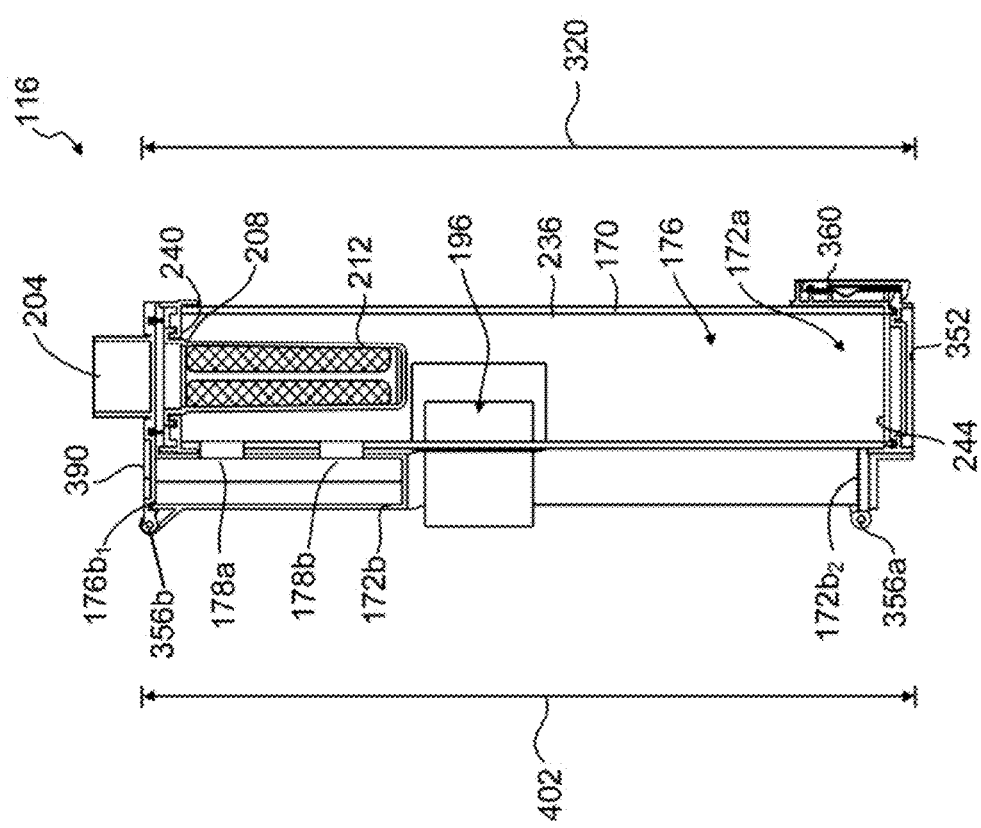
FIG. 81 is the cross-sectional view of the air treatment member of FIG. 79, in accordance with some other embodiments.
Figure 82:
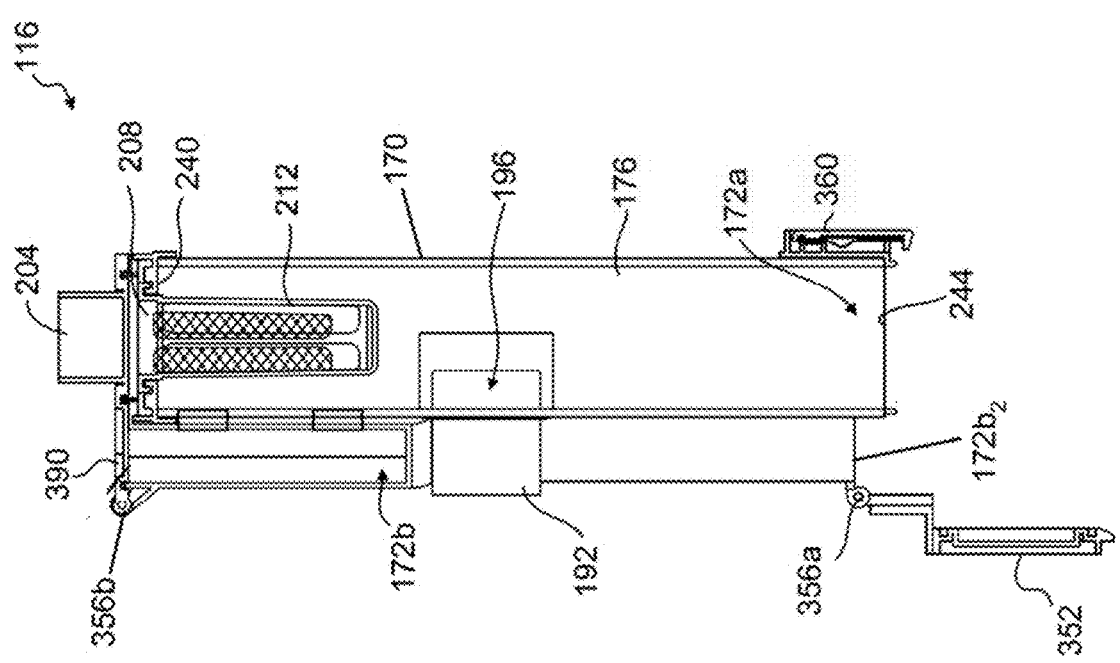
FIG. 82 is the cross-sectional view of the air treatment member of FIG. 81 with an opened end wall.
Figure 83:
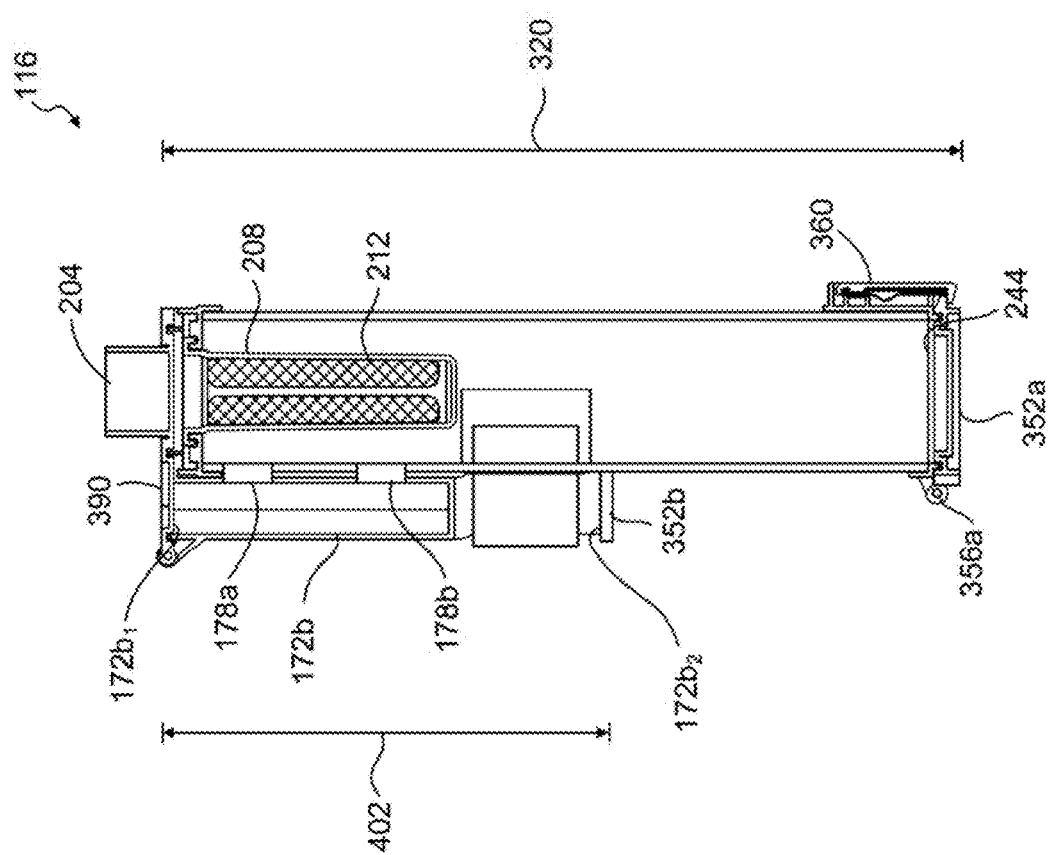
FIG. 83 is the cross-sectional view of the air treatment member of FIG. 79, in accordance with another embodiment.

In still other embodiments, the vertical end screen 304a may have other suitable shapes, including a rectangular shape (e.g., FIGS. 71 to 75), a slanted trapezoidal shape (e.g., FIG. 76), a generally triangular shape (e.g., FIG. 77), or an arcuate or a curved shape (e.g., FIG. 78).

It will be appreciated that while the vertical end screen may be rigid (e.g., made of a rigid plastic and may be made of the same material as the sidewall or the end wall), the vertical end member, and optionally the vertical side screen, may be made of a resilient material. This may assist opening the end wall if the vertical end screen is secured to the end wall as the vertical screen member may deflect or bend if it contacts the chamber sidewall as the end wall is opened and the vertical screen member is withdrawn from the chamber.

In some embodiments, a single vertical end screen 340a may comprise two or more separable parts. For instance, as exemplified in FIG. 16, the vertical end screen 304a may comprise two separable parts $368_1$ and $368_2$, connected to the first end wall portion 380 and second end wall portion 376, respectively, of the second cyclone end 352. Accordingly, the separable vertical screen parts $368_1$, $368_2$ may be moveable with their respective openable end wall portions (see e.g., FIG. 16).

The vertical end screen 304a may be either fixably mounted to the cyclone or dirt chamber end walls 352 (see e.g., FIGS. 18, 32, 40 and 41), or otherwise, moveably mounted to the cyclone or dirt chamber end walls 352. For example, FIGS. 20 and 21 exemplify an embodiment where the vertical end screen 304 is moveably mounted to the second end wall portion 376. In this embodiment, the vertical end screen 304 may be rotated out of the cyclone chamber when the first sidewall portion 248 is removed (e.g., opened). This may facilitate cleaning of the vertical end screen 304a.

The vertical end screen 304a may also be permanently or removably mounted to the second cyclone chamber end wall 352a or dirt chamber end wall 352b. An advantage of a removably mounted screen is that the vertical end screen 304a may be removed for cleaning or replacement when the second end wall 352 of the cyclone chamber or dirt chamber (or first cyclone sidewall portion 238) is opened.

Figure 8:
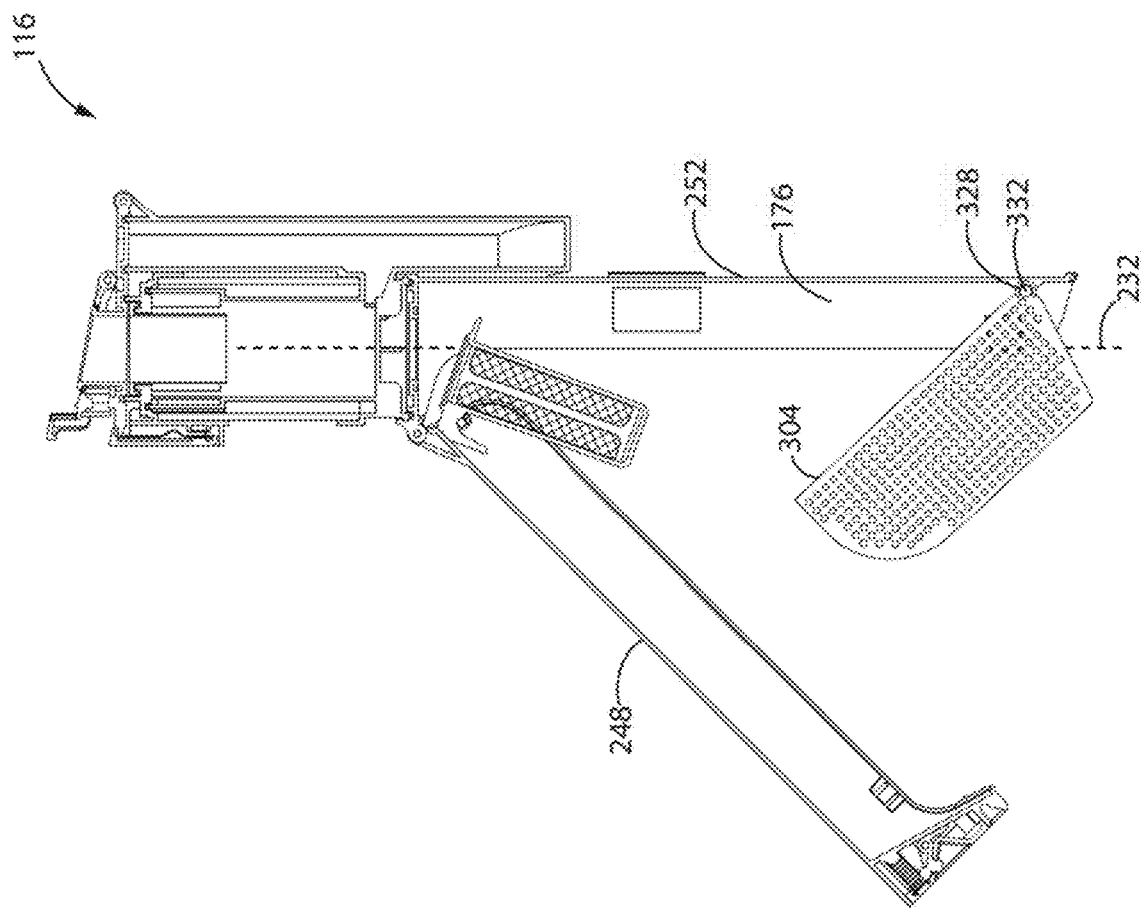
FIG. 8 is a cross-sectional view taken along line 6-6 in FIG. 5, in accordance with another embodiment.
Figure 9:
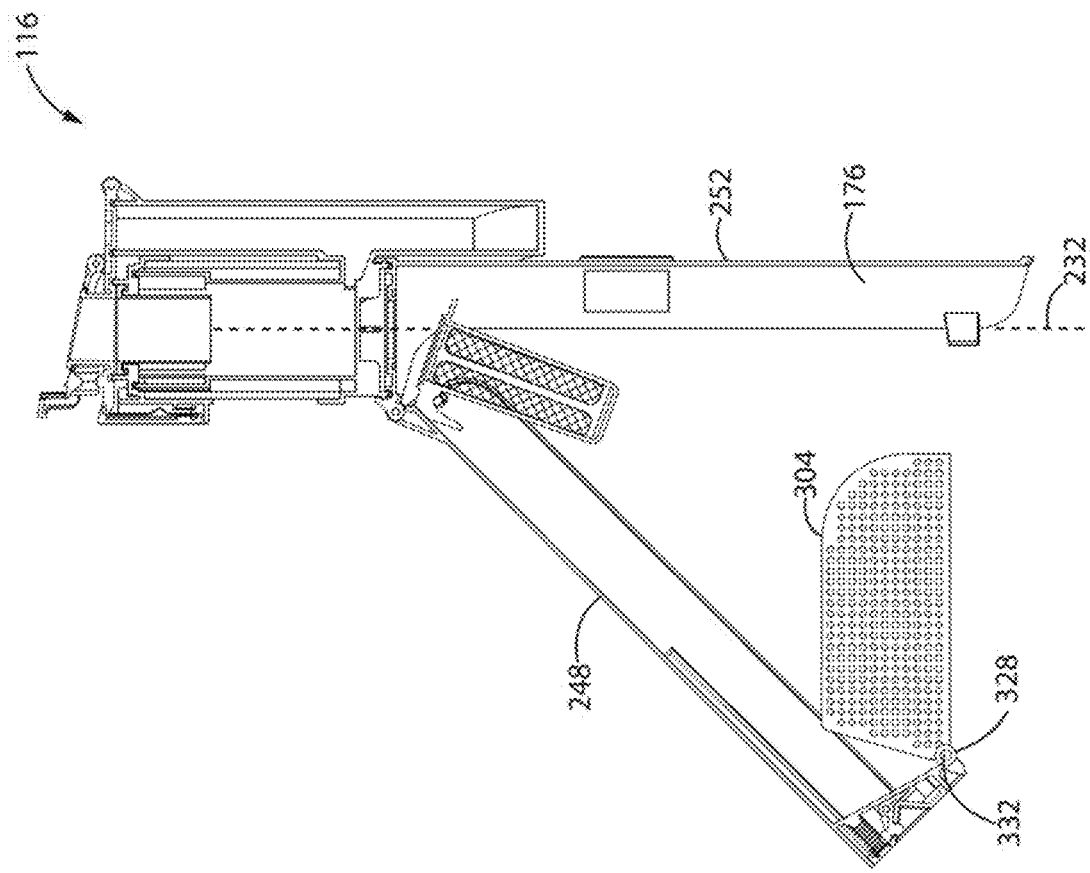
FIG. 9 is a cross-sectional view taken along line 6-6 in FIG. 5, in accordance with another embodiment.

The vertical side screen 304b may be fixedly or moveably mounted to the inner cyclone side wall 236. For example, in various cases, the vertical side screen 304b may be movable (e.g. pivotably, translatably, and/or removably) connected to one or more sidewall portions. This can allow surfaces of axially extending member 304 to move away from sidewall portion(s) 248, 252 where there is greater clearance and therefore better access for the user to clean those surfaces. For instance, as exemplified in FIG. 8 axially extending member 304 is pivotably connected to a sidewall portion 248, 252. In FIG. 8, axially extending member 304 is pivotably connected to the sidewall portion that remains in position. The pivoting connection may be formed by a hinge 328 that defines a rotation axis 332. As shown, rotation axis 332 may extend through cyclone chamber 176. In the example shown, rotation axis 332 is transverse to (e.g. perpendicular to) cyclone axis 232.

As exemplified in FIGS. 5-6, in embodiments where the cyclone unit 170 has an openable sidewall portion 248, the vertical side screen 304b may remain connected to the sidewall portion that does not have the end wall 244 attached thereto. Therefore, as exemplified, axially extending member 304 remains connected to sidewall second portion 252 when sidewall first portion 248 is moved to the open position. This allows dirt and debris that falls by gravity from axially extending member 304 (naturally or by the user brushing axially extending member 304) to fall out of cyclone chamber 176 without interference by cyclone second end wall 244, which in this example remains connected to sidewall first portion 248.

Figure 7:
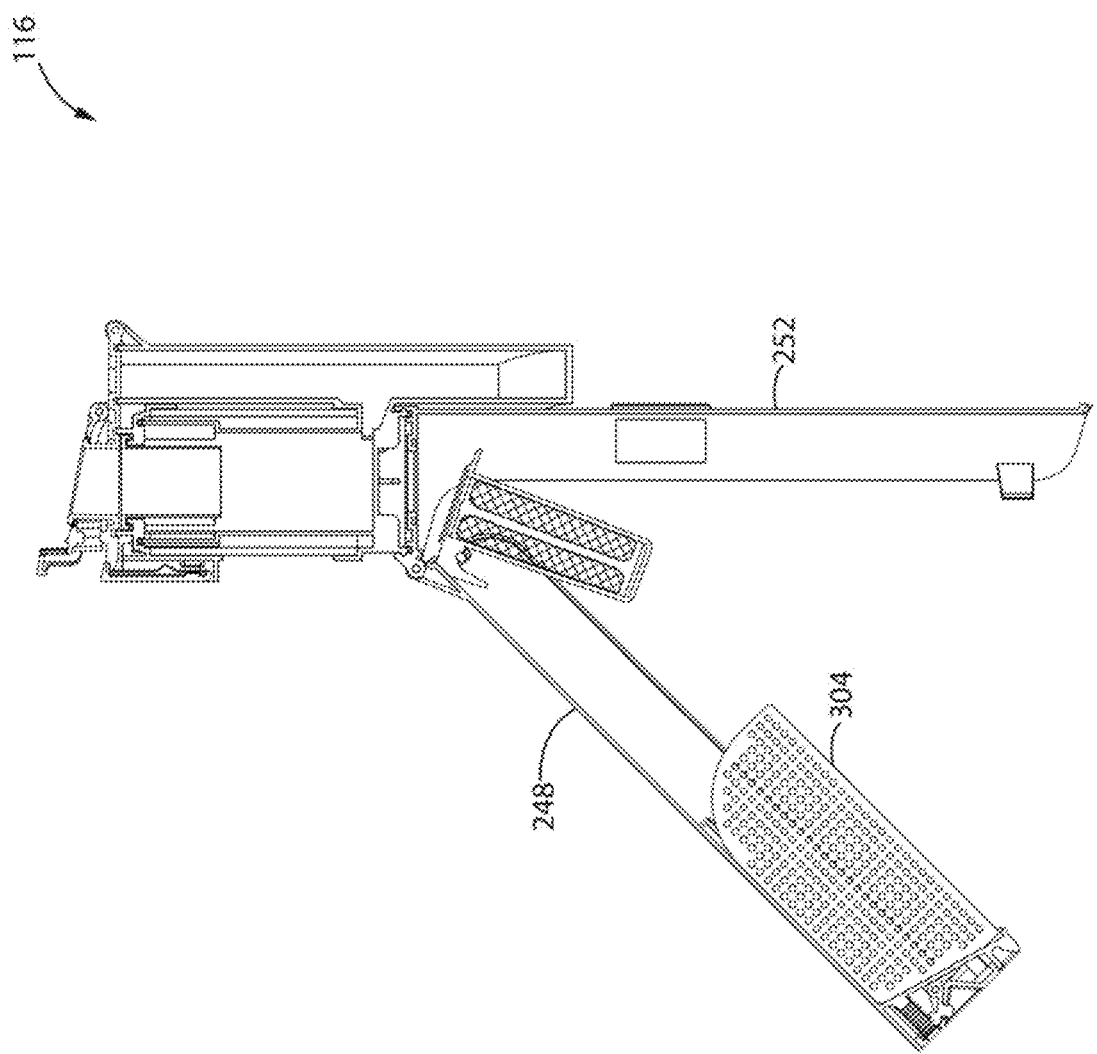
FIG. 7 is a cross-sectional view taken along line 6-6 in FIG. 5, in accordance with another embodiment.

In still other embodiments, as exemplified in FIG. 7, rather than being exclusively connected to either the cyclone end wall or sidewall, the vertical screen 304 may be connected to both the inner surface of the cyclone sidewall 236 and the second cyclone end 244 (see e.g., FIG. 7). In these embodiments, as exemplified in FIG. 7, the axially extending member 304 may remain connected to a sidewall first portion 248 (the sidewall portion with end wall 244 attached thereto) when the sidewall first portion 248 is openable.

Dirt Ejection Mechanism

The following is a discussion of a dirt ejection mechanism, which may be may be used by itself or with one or more of the cyclone with an openable sidewall, the moveable screen, the dual end walls, the medial cyclone air inlet, the exterior dirt collection chamber, and the axially extending member (vertically extending screen).

Optionally, a dirt ejection mechanism may be provided inside of the cyclone chamber. The dirt ejection mechanism may comprise a cleaning member which is configurable to translate axially inside of the cyclone chamber. Preferably, the cleaning member may axially translate inside of the cyclone chamber using a handle assembly which is driving connected to the cleaning member, and which is located external to the cyclone chamber. The cleaning member may be used to remove dirt which aggregates on the shroud 212 (e.g., hair which may be wrapped around shroud 212).

Referring now to FIGS. 84-95, as exemplified, the cyclone unit 170 may include a cleaning member 420 located inside of the cyclone chamber 176. The cleaning member may be of various shapes. For example, cleaning member 420 may be an annular member that extends around the circumference of the shroud 212. In the exemplified embodiments, the cleaning member 420 comprises an annular member having a radial outer surface 420a and a radial inner surface 420b defining a central opening (e.g., FIGS. 86, 85b and 90c). Alternately, cleaning member 420 may extend only part way around the shroud 212. For example, the cleaning member 420 may comprise a semi-annular member which only partially surrounds and engages the shroud 212 when at an axial elevation of the shroud 212.

Figure 88:
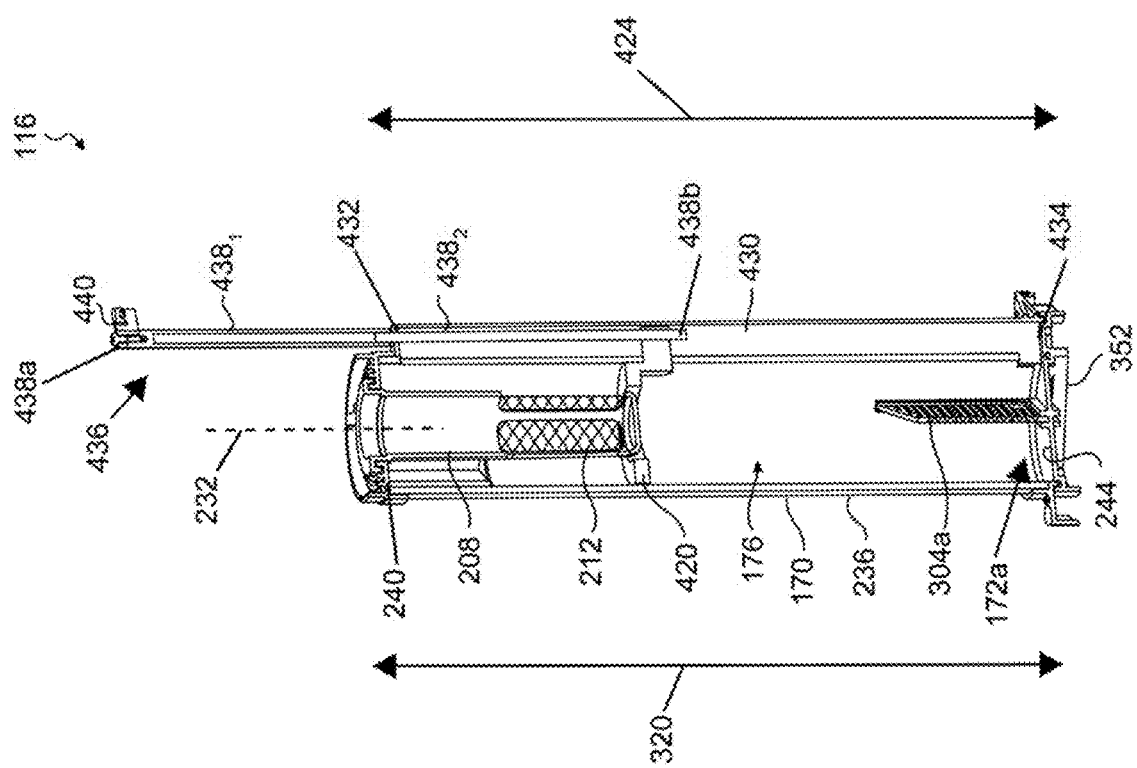
FIG. 88 is a perspective cross-sectional view of the air treatment member of FIG. 84 taken along the section line 85-85' showing the cleaning member and handle assembly in an in-use configuration, in accordance with some embodiments.

The radial inner surface, e.g., surface 420a, may at least partially engage (i.e., contact) the outer surface of the shroud 212 when the annular member is at an axial elevation of the shroud 212 (see e.g., FIGS. 88 and 89A). Optionally, all of the radial inner surface may engage the shroud 212.

While the cleaning member 420 is exemplified as an annular (or semi-annular) member, it will be appreciated that the annular shape of the cleaning member is only a function of the cylindrical shape and design of the cyclone chamber 176. Accordingly, in other cases, the cleaning member 420 may have any other suitable shape or design which is suited for the shape or design of the cyclone chamber and the shroud. For instance, the cleaning member 420 may have a square-shape, and may have a square-shaped central opening to surround a rectangular shaped shroud.

It will be appreciated that, if the shroud 212 is cylindrical, then the radial inner surface 420a may contact the shroud 212 along the entire length of the shroud 212 as the cleaning member 420 is translated axially along the length of the shroud 212. Accordingly, the cleaning member may have a radial inner surface 420a that has a constant diameter. For example, the cleaning member 420 may be made of a rigid material, such as plastic. Optionally, a resilient member, e.g., a resilient gasket may be provided to abut the shroud 212 as the cleaning member is translated axially along the shroud 212.

Alternately, if the shroud is conical, then the radial inner surface 420a may contact the shroud 212 along only a portion of the length of the shroud 212 (e.g., the upper portion if the cyclone is oriented vertically as exemplified) as the cleaning member 420 is translated axially along the length of the shroud 212.

In some embodiments, the cleaning member 420 may also have an adjustable central opening (not shown). The adjustable opening may accommodate shrouds which have changing diameters along their axial length (e.g., a tapered or frusto-conical shrouds, as exemplified in FIG. 61). For example, the cleaning member 420 may be reconfigurable to maintain contact with the shroud 212 as the cleaning member 420 is translated long at least a portion of, and optionally all of, the axial length of the shroud 212.

For example, the cleaning member may be made of an elastomeric member or the cleaning member 420 may include an elastomeric member (or membrane) attached to the radial inner surface 420b that extends radially inward as the diameter of the shroud 212 against which it abuts is reduced. As the cleaning member 420 is returned to its storage position at the top of the cyclone chamber, the radial inner surface 420a may be deformed radially outwardly by the outer wall of the shroud 212. Accordingly, the elastomeric member may increase and decrease in size so as to accommodate the changing diameter of the shroud, and to otherwise clean the shroud at all points along the shroud's axial length. In other cases, the cleaning member 420 may include an adjustable mechanical aperture which dilates and contracts to accommodate the changing diameter of a tapered shroud.

As exemplified, the cleaning member 420 may be either detached (e.g., separated) or attached (e.g., connected) to the shroud 212.

FIGS. 85-88 exemplify an embodiment where the cleaning member 420 is detached from the shroud 212. In this embodiment, the shroud 212 is fixed inside of the cyclone chamber 176, and the cleaning member 420 is axially translatable, along cyclone axis 232, inside of the cyclone chamber 176. For example, the cleaning member 420 may translate between an initial storage position, wherein the cleaning member 420 is located proximal the first cyclone end 240 (e.g., FIG. 86a), to a "cleaned position" wherein the cleaning member 420 has been translated by any suitable distance towards or to the second cyclone end 244. In some cases, the cleaning member 420 may travel toward the second cyclone end by only the extent of the axial length of the shroud 212 (e.g., FIGS. 87 and 88). In other cases, the cleaning member 420 may translate beyond the axial length of the shroud 212 (see e.g., FIG. 91). In still other cases, the second cyclone end 244 may be openable, and the cleaning member 420 may axially translate to outside of the cyclone chamber 176.

An advantage of the detached annular member configuration is that the cleaning member 420 may be used for scraping dust and dirt from the exterior of the shroud 212. For example, the radial inner surface 420b of the annular member may engage and wipe dirt or draw hair wrapped around the shroud 212 from the exterior of the shroud 212 as the annular member is axially translated from the first cyclone end towards the second cyclone end. The wiped dust and dirt may then collapse and aggregate inside of the cyclone's internal dirt chamber 172a. In some cases, the second cyclone end wall 352 may be opened, and the cleaning member 420 may also axially translate beyond the outside of the cyclone chamber 176. This may allow the member to be used to push debris (e.g., hair balls) entirely outside of the cyclone chamber 176. Accordingly, it will be appreciated that the cleaning member 420 can facilitate cleaning of the shroud 212 from dirt and debris without otherwise requiring the shroud 212 to be removed from inside of the cyclone chamber 176.

To enhance wiping and cleaning of dirt from the shroud 212, the radial inner surface 420b of the cleaning member 420 may be variable configured. For example, the radial inner surface 420b may be textured (e.g., roughly textured) to facilitate wiping of dirt from the shroud. The radial inner surface 420b may also include one or more scrapers (e.g., prongs) to scrape dirt from the exterior of the shroud 212 (e.g., similar to prongs 462 exemplified in FIG. 90B).

Figure 89C:
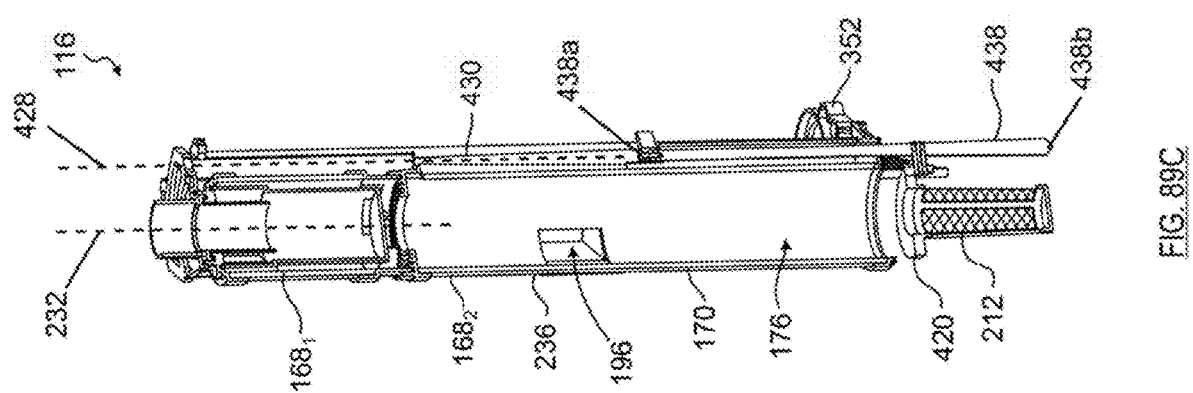
Figure 90C:
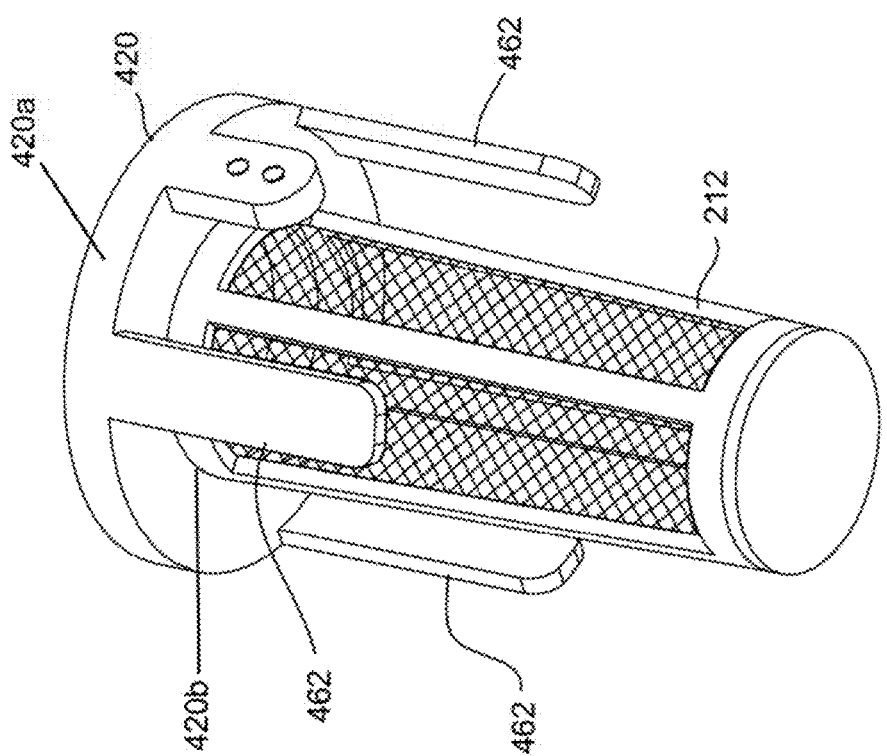
FIG. 90C is a bottom-side perspective view of the cleaning member of FIG. 90B.
Figure 91:
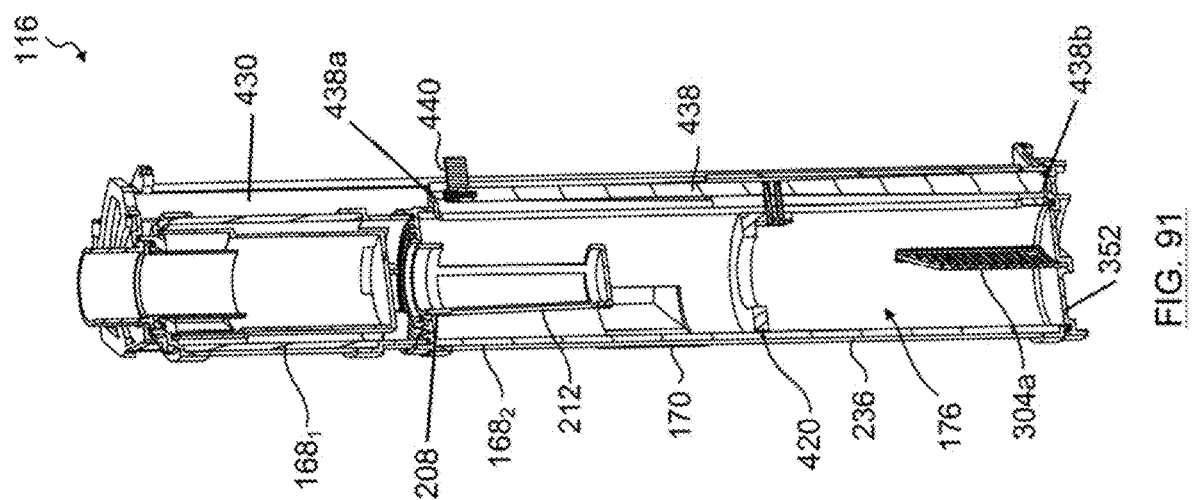
FIG. 91 is a perspective cross-sectional view of the air treatment member of FIG. 90A showing the cleaning member in a cleaning configuration.
Figure 99:
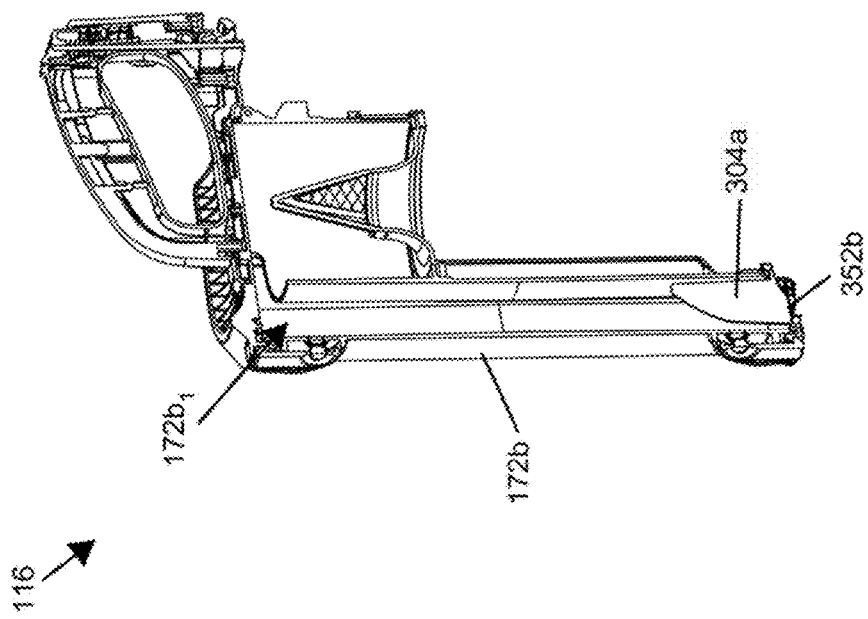
Figure 100:
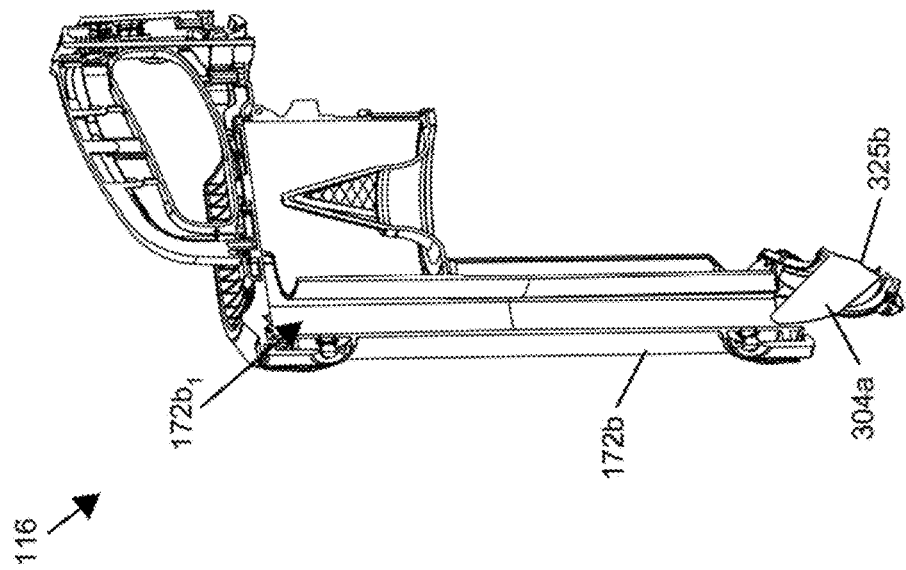

FIGS. 89A-89C exemplify another embodiment of the cleaning member 420. In this embodiment, the radial inner surface 420b of the cleaning member 420 is attached to the shroud 212. For example, the radial inner surface 420b may be permanently connected (e.g., integrally molded), or otherwise detachably connected to a non-permeable portion of the shroud 212.

In this configuration, the cleaning member 420 and the shroud 212 are concurrently moveably along all or a portion of the axial length of the cyclone chamber 176. Accordingly, as exemplified in FIGS. 89B and 89C, the cleaning member 420 and the shroud 212 may be translated from the first cyclone end 240 towards, to or past an opened second cyclone end 244, and optionally partially or fully extended outside of the cyclone chamber 176. An advantage of this configuration is that a user may access the shroud 212 from the opened second cyclone end 244 to clean the shroud 212 from dirt and debris. Where the shroud 212 is detachably connected to cleaning member 420, the user may further detach the shroud from the cleaning member 420 to more easily clean the shroud, or otherwise, to entirely replace the shroud 212. In other cases, rather than translating the annular member and shroud outside of the cyclone chamber, the user may axially vibrate the annular member and shroud inside of the cyclone chamber to debride the shroud from dirt and debris.

Optionally, irrespective of whether the cleaning member 420 is detached or attached to the shroud 212, the radial outer surface 420a of the cleaning member 420 may also at least partially engage the inner cyclone sidewall 236. Accordingly, axial movement of the cleaning member 420 may also wipe (e.g., scrape) dirt from the inner surface of cyclone sidewall 236. The radial outer surface 420a may have any configuration to facilitate wiping of dirt from the inner cyclone sidewall 236. For example, the radial outer surface 420a may be flat or textured. Alternatively, or in addition, as exemplified in FIG. 90, the radial outer surface 420a may include one or more axially extending prongs (e.g., ribs) 462 which facilitate scraping of dirt from the cyclone side wall.

It will be appreciated that the radial inner or outer surface which contacts the shroud or sidewall may be made of a material that causes less friction as the cleaning member is moved (e.g., nylon). Alternately or in addition, the radial inner and/or outer surface may be dimensioned so as to be positioned proximate but not to contact the shroud or sidewall.

Optionally the cleaning member may be actuatable from a positioned exterior to the cyclone chamber. For example, if the cleaning unit includes a drive motor, then an actuation member may be provided exterior to the cyclone unit, e.g., on an outer wall of the cyclone chamber. Alternatively, a drive handle may be provided outside the cyclone chamber. The handle may be operable between a storage position (in which the handle is retracted when the surface cleaning apparatus is in use, an extended position in which the handle is driving connected to the cleaning member and the cleaning member is in its storage position (for when the surface cleaning apparatus is used for cleaning) and a cleaned position in which the cleaning member has been translated inside the cyclone chamber to clean the shroud 212.

FIGS. 85 to 95 exemplify a handle assembly 436 that may be provided for axially moving the cleaning member 420 inside of the cyclone chamber 176. As exemplified, the handle assembly 436 may be located outside of the cyclone chamber 176, and may comprise an elongate member 438 (e.g., a rod) extending along axis 428 between a first end 438a, and an axially spaced apart second end 438b (e.g., FIG. 85). The elongate member 438 may be drivingly connected to the cleaning member 420 such that axial movement of the elongate member 438, along axis 428, results in axial movement of the annular member 428 inside of the cyclone chamber 176 (see e.g., FIG. 85). The axis 428 may be generally parallel to the cyclone axis 232.

Figure 87:
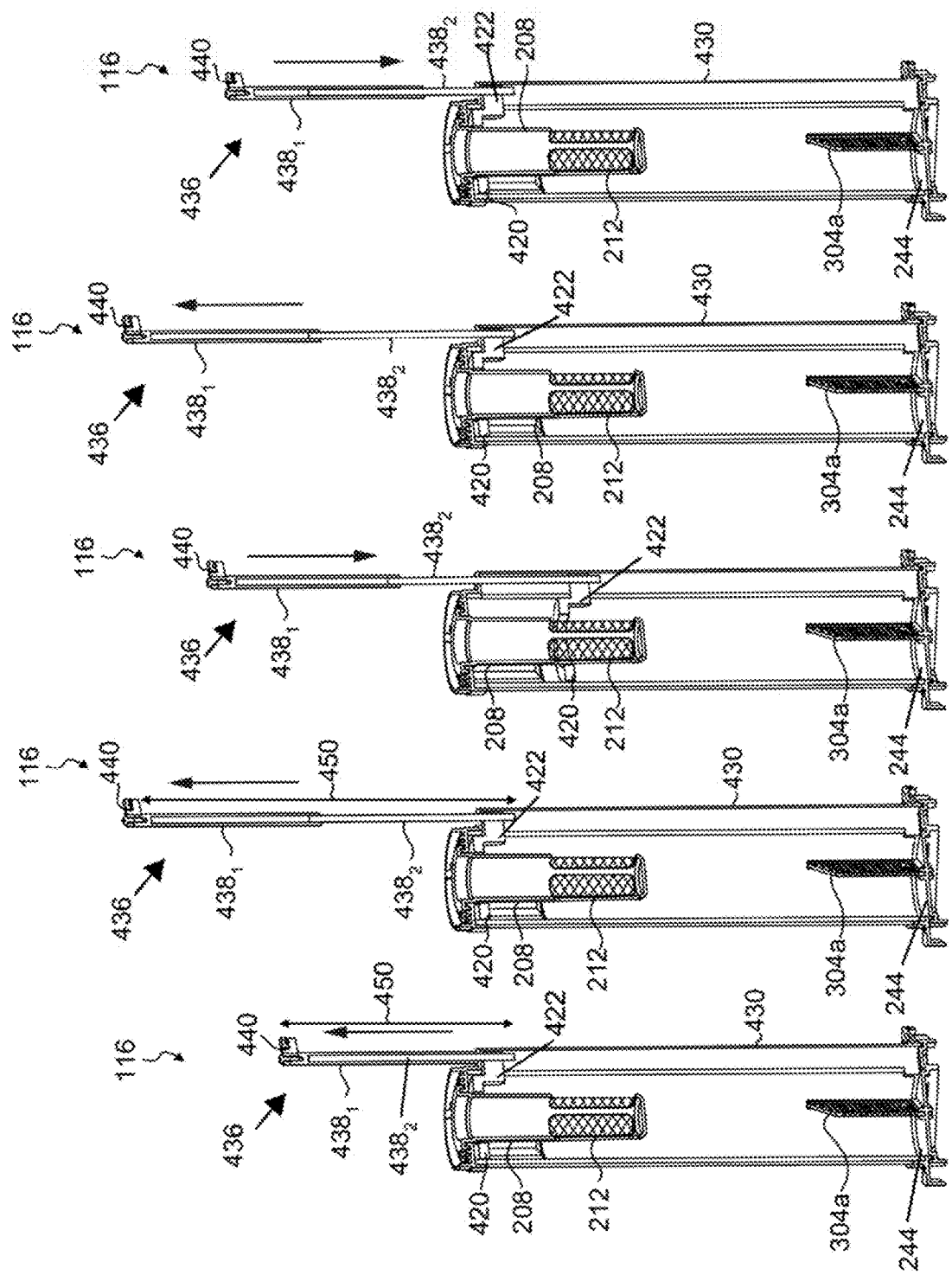
FIGS. 87A-87E are perspective cross-sectional views of the air treatment member of FIG. 84 taken along the section line 85-85' in FIG. 84, and showing a cleaning member and handle assembly transitioning from a storage configuration to an in-use or emptying configuration, and then back to a storage configuration, in accordance with an embodiment.

The elongate member 438 may connect to the cleaning member 402 in any suitable manner. For instance, as exemplified in FIG. 86, one or more connecting members 460 (e.g., bolts or rivets) may connect the elongate rod 438 to the cleaning member 420. The connecting members 436 may extend into the cyclone chamber 176 through a gap 444 provided along the cyclone sidewall 236. The gap 444 may extend either completely or partially along the axial length of the cyclone sidewall such that the connecting member 460 may travel completely or partially along the axial length of the cyclone unit. FIG. 87 exemplifies another embodiment where the cleaning member 420 includes a lateral portion 422 which extends through the sidewall gap 444 to connect to the elongate member 438.

Figure 85B:
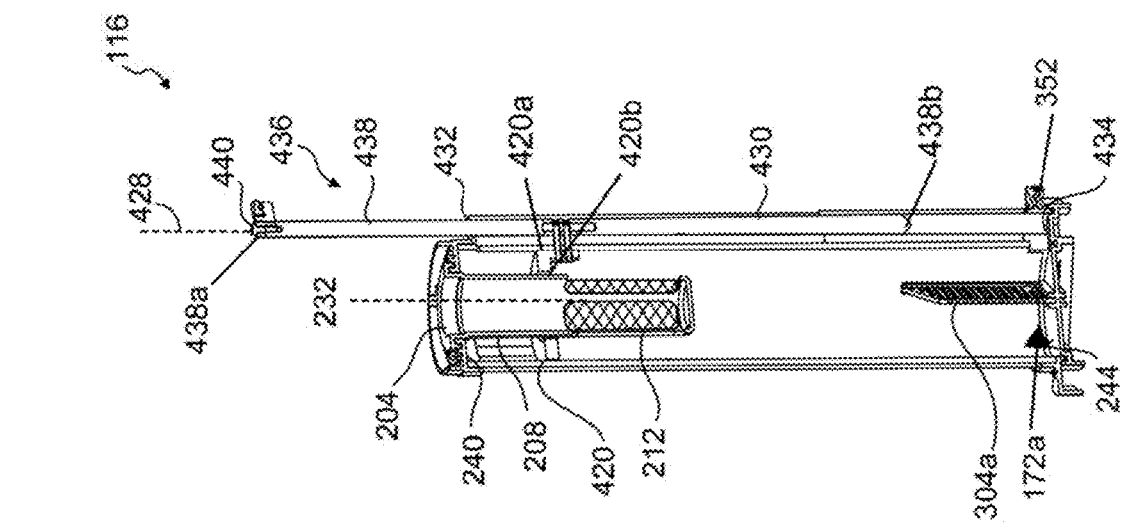
FIG. 85B is a perspective cross-sectional view of the air treatment member of FIG. 85A and showing the cleaning member in an in-use configuration.
Figure 85A:
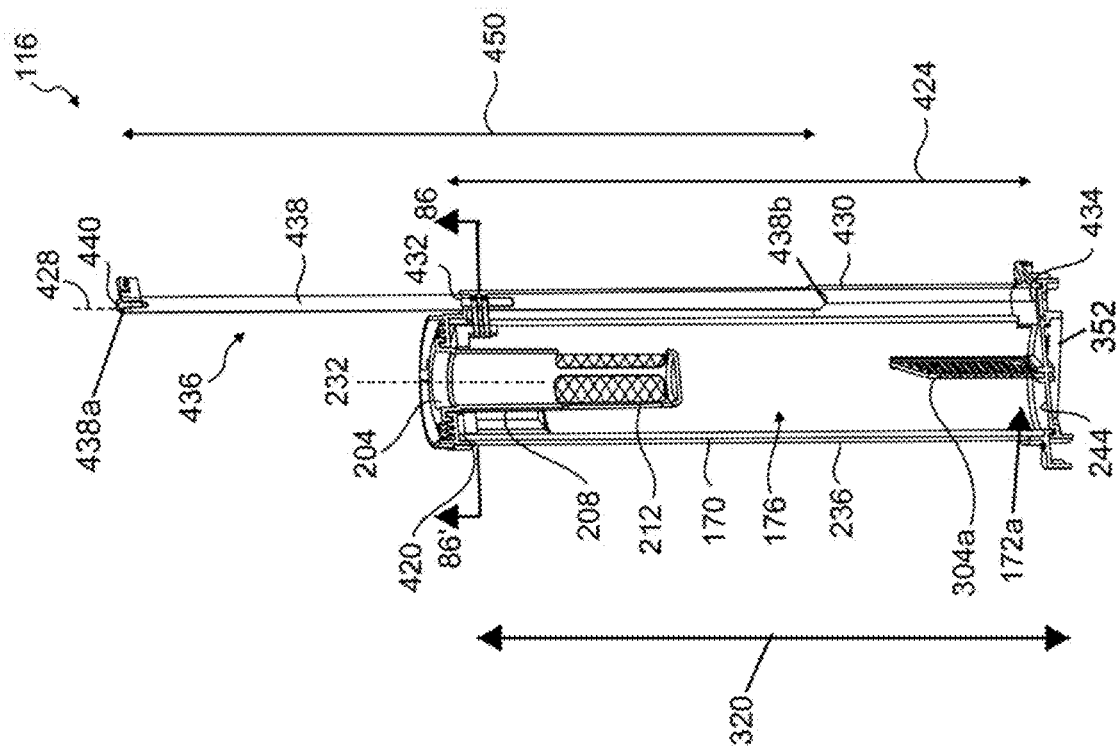
FIG. 85A is a perspective cross-sectional view of an air treatment member of the surface cleaning apparatus of FIG. 84 taken along sectional line 85-85' of FIG. 84 and showing a cleaning member in a storage configuration.
Figure 86:
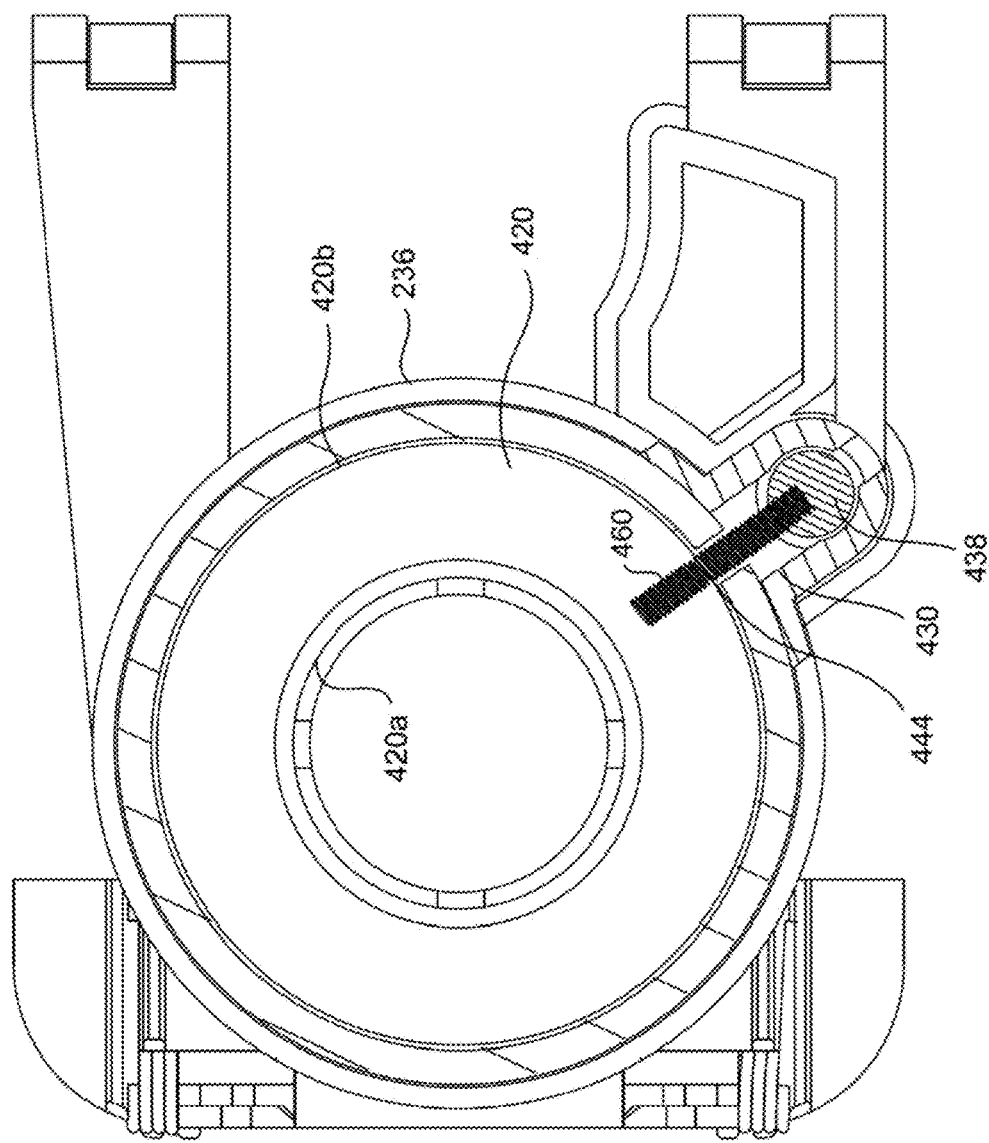
FIG. 86 is a cross-sectional view of the air treatment member of FIG. 85A taken along the section line 86-86' in FIG. 85, according to some embodiments.

The elongate member 438 may have either a fixed or adjustable length 450. FIG. 85 exemplifies an embodiment wherein the elongate member 438 has a fixed axial length 450. FIG. 87 exemplifies an embodiment wherein the elongate member has an adjustable length 450, and is reconfigurable between a storage configuration and an in-use (e.g., emptying) configuration. In this configuration, the elongate member 438 may comprise a first portion 438$_1$ which telescopes over a second portion 438$_2$. The first portion 438$_1$ may collapse over the second portion 438$_2$ to reduce the axial height 450 of the elongate member (e.g., FIGS. 87A and 87E). This may allow the air treatment member 116 to be stowed away for storage in small or tight compartments. The first portion 438$_1$ may also expand (e.g., retract) from the second portion 438$_2$ to increase the axial height 450 of the elongate member (e.g., FIG. 87B to 87C). This may allow the elongate member 438 to move the cleaning member 420 inside of the cyclone chamber over greater axial distances. In some cases, an activation mechanism (e.g., a button) can be provided to expand or retract the handle assembly 436, or to permit the handle assembly to expand or retract. For example, the activation mechanism can be provided on the first end 438a of the elongate member 438.

Optionally, a hollow track 430 can be located adjacent (e.g., lateral) to the cyclone sidewall 236. The track 430 may extend longitudinally along axis 428 between a first open end 432 and an axially spaced apart second end 434 (see e.g., FIG. 85). The track 430 may at least partially receive the elongate member 438 such that the elongate member 438 may travel axially inside of the track 430. An advantage of this configuration is that the track 430 may guide axial motion of the elongate member 438.

The track 430 may have any suitable axial length (e.g., height) 424. For instance, as exemplified in FIG. 85, the track 430 may have an axial height 424 that is substantially equal to the axial height 320 of the cyclone chamber. Accordingly, the first open end 432 of the track 430 may be flush with the first cyclone end 240, and the second track end 434 may be flush with the second cyclone end 244. An advantage of this configuration is that the track 430 may guide the axial motion of the handle assembly 436 along the entire axial length of the cyclone unit. Where the air treatment member 116 comprises two cyclonic cleaning stages 168$_1$ and 168$_2$ arranged in series (e.g., FIG. 89), the track 430 may similarly have an axial length 424 that is the substantially equal to the combined axial height of both cyclonic stages. In still other embodiments, the track 430 may extend along only a portion of the axial height of the cyclone unit, or may have a height 424 that is greater than the axial height 320 of the cyclone chamber.

As exemplified FIGS. 85-90 and 91-93, optionally, the openable end door 352 of the cyclone unit may extend to at least partially underlie the elongate member 438.

For instance, as exemplified, the openable door 352 may underlie the second end 434 of the track 430. In this manner, the openable door 352 may be located below the second end 438b of the elongate member. An advantage of this configuration is that the second end of the elongate member 438b may be used to push open (e.g., unlock) the openable door 352 when axially translated toward the second end of the track 430 (see e.g., FIGS. 89B, 89C, 91, 92 and 93). In some cases, an unlocking mechanism may be provided on the door 352 such that the elongate member 438b may engage the unlocking mechanism to unlock the door. In various cases, this may allow the handle assembly to be used for automatically opening and emptying the contents of the cyclone's internal dirt collection chamber 172a.

Alternatively, or in addition, rather than using the elongate member 438 to open the end wall 352, the cleaning member 420 may be used for pushing open the openable door 352 (e.g., moving a door that has been unlocked by the elongate member or unlocked by a user). For instance, as exemplified, the cleaning member 420 may be attached proximal the second end 438b of the elongate member, and the cleaning member 420 may be used for pushing open the door 352 from inside of the cyclone chamber. In still other embodiments, the door 352 may not extend to underlie the elongate member 438, and the cleaning member 420 alone may be used to unlock and push open the door 352. In these cases, the cleaning member 420 may be attached at any point along the axial length of the elongate member 432.

Optionally, the handle assembly 436 may include a handle 440 (e.g., a grip portion). The handle 440 may facilitate the axial movement of the elongate member 438. Preferably, the handle 440 is positioned at, or near, the first end 438a of the elongate member 438. The handle 440 may be attached to the elongate member 438 via a bolt or rivet 440a (e.g., FIG. 94B).

As exemplified in FIGS. 94 and 95, the handle 440 may be configurable to move (e.g., rotate) between a storage position (e.g., FIG. 94) and an in-use position (e.g., FIG. 95). In the storage position, the handle 440 may be recessed toward the cyclone unit 170. Optionally, a resting member 504 may be located on the track 430 to receive (e.g., rest) the handle 440 in the storage position. Preferably, the resting member 504 is positioned such that when the handle 440 is rested thereon, the cleaning member 420 is also positioned in the storage position (e.g., proximal the first cyclone end). The resting member may protect the handle from being accidentally actuated while the surface cleaning apparatus is in use. The handle may accordingly be moved outwardly into an in-use position (e.g., FIG. 95) whereby the handle 440 is usable to axially move the handle assembly. In various cases, a gap may extend axially along the track 430 to accommodate axial movement of the handle 430.

While the illustrated embodiments have exemplified the handle assembly 436 as being provided external to the cyclone chamber, it will be appreciated that in other embodiments, the handle assembly 436 may also be provided inside of the cyclone chamber 176. For example, the elongate member 438 may extend through an aperture located on the first cyclone end 240 such that the second end 480b of the elongate member connects to the cleaning member 420. In this manner, the elongate member 438 may move the cleaning member 420 inside the cyclone chamber in a manner analogous to a plunger.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A vacuum cleaner having an air flow path from a dirty air inlet to a clean air outlet with a cyclone positioned in the air flow path, the cyclone comprising:
   (a) a cyclone chamber having a cyclone axis of rotation, an axial length, a first end, an axially spaced apart second end comprising a second end wall, a cyclone sidewall extending between first and second axially spaced apart end walls, a cyclone air inlet, a cyclone air outlet provided at the first end of the cyclone chamber and comprising a porous member;
   (b) a cleaning member positioned in an annular region that is located between an inner surface of the cyclone sidewall and an outer surface of the porous member, the cleaning member is axially translatable in the annular region along an axial length of the porous member; and,
   (c) an emptying handle assembly drivingly connected to the cleaning member, the emptying handle assembly comprising a handle positioned exterior to the cyclone chamber and a portion of the emptying handle assembly that is drivingly connected to the cleaning member extends inwardly to the cleaning member.

2. The vacuum cleaner of claim 1 wherein the cleaning member is moveably mounted between a storage position in which the cleaning member is positioned adjacent the first end of the cyclone air outlet and an emptying position in which the cleaning member is positioned adjacent the second end of the cyclone chamber.

3. The vacuum cleaner of claim 1 wherein the cyclone air outlet comprises an outlet conduit extending axially into the cyclone chamber, the conduit comprising an air impermeable portion and, when the cleaning member is in the first position, the cleaning member is positioned at an axial elevation of the air impermeable portion.

4. The vacuum cleaner of claim 1 wherein the cleaning member engages at least a portion of the radial outer surface of the porous member as the cleaning member is translated in the annular region towards the second end of the cyclone chamber.

5. The vacuum cleaner of claim 1 wherein the vacuum cleaner comprises a track, wherein at least a portion of the track is positioned between the cyclone air outlet and the second end of the cyclone chamber, and a portion of the emptying handle assembly travels in the track.

6. The vacuum cleaner of claim 5 wherein the at least a portion of the track is provided on the cyclone sidewall.

7. The vacuum cleaner of claim 1 further comprising a dirt collection chamber exterior to the cyclone chamber and the cyclone comprises a dirt outlet provided at the first end of the cyclone chamber.

8. The vacuum cleaner of claim 7 wherein the cleaning member is moveably mounted between a storage position in which the cleaning member is positioned adjacent the first end of the cyclone air outlet and an emptying position.

9. The vacuum cleaner of claim wherein the dirt outlet has an axial length extending axially between a first end and an axially spaced apart second end and the first end of the dirt outlet is positioned closer to the first end of the cyclone chamber than the second end of the dirt outlet and, when the cleaning member is in the storage position, the cleaning member is located closer to the first end of the dirt outlet than the second end of the dirt outlet of the dirt outlet.

10. The vacuum cleaner of claim 1 wherein the cyclone chamber has a first portion at the first end of the cyclone chamber, a second portion at the second end of the cyclone chamber and a medial portion between the first and second portions and the cyclone air inlet is provided in the medial portion.

11. The vacuum cleaner of claim 1 wherein at least one vertically extending member is axially positioned within the cyclone chamber between the cyclone air outlet and the second end of the cyclone chamber and the cleaning member travels along at least a portion of an axial length of the vertically extending member as the cleaning member travels to the second end of the cyclone chamber.

12. The vacuum cleaner of claim 1 wherein the second end wall is openable, the second end wall is securable in a closed position by a door lock and at least one of the emptying handle assembly and the cleaning member is operatively engageable with the door lock.

13. The vacuum cleaner of claim 1 wherein the emptying handle assembly is reconfigurable between an emptying configuration and a storage configuration in which the handle is recessed towards the cyclone.

14. A vacuum cleaner having an air flow path from a dirty air inlet to a clean air outlet with a cyclone positioned in the air flow path, the cyclone comprising:
   (a) a cyclone chamber having a cyclone axis of rotation, an axial length, a first end, an axially spaced apart second end comprising a second end wall, a cyclone sidewall extending between first and second axially spaced apart end walls, a cyclone air inlet, a cyclone air outlet provided at the first end of the cyclone chamber and comprising a porous member, the axially spaced apart second end wall is moveable between a closed position and an open position in which the cyclone chamber is emptyable;
   (b) a cleaning member positioned in an annular region that is located between an inner surface of the cyclone sidewall and an outer surface of the porous member, the cleaning member is moveably mounted in the cyclone chamber and axially translatable in the annular region along an axial length of the porous member to the second end of the cyclone chamber;

(c) an emptying handle assembly drivingly connected to the cleaning member, the emptying handle assembly comprising a handle positioned exterior to the cyclone chamber and a portion of the emptying handle assembly extends through the cyclone sidewall to the cleaning member; and, (d) a door lock securing the openable second end wall in a closed position and at least one of the emptying handle assembly and the cleaning member is operatively engageable with the door lock.

15. The vacuum cleaner of claim 14 wherein the cleaning member is moveable mounted between a storage position in which the cleaning member is positioned adjacent the first end of the cyclone chamber and an emptying position in which the cleaning member is positioned adjacent the second end of the cyclone chamber.

16. The vacuum cleaner of claim 14 wherein the vacuum cleaner comprises a track, wherein at least a portion of the track is positioned between the cyclone air outlet and the second end of the cyclone chamber, and a portion of the emptying handle assembly travels in the track.

17. The vacuum cleaner of claim 16 wherein the at least a portion of the track is provided on the cyclone sidewall.

18. The vacuum cleaner of claim 14 further comprising a dirt collection chamber exterior to the cyclone chamber and the cyclone comprises a dirt outlet provided at the first end of the cyclone chamber.

19. The vacuum cleaner of claim 18 wherein the cleaning member is moveable mounted between a storage position in which the cleaning member is positioned adjacent the first end of the cyclone chamber and an emptying position.

20. The vacuum cleaner of claim 14 wherein the cyclone chamber has a first portion at the first end of the cyclone chamber, a second portion at the second end of the cyclone chamber and a medial portion between the first and second portions and the cyclone air inlet is provided in the medial portion.

21. The vacuum cleaner of claim 14 wherein at least one vertically extending member is axially positioned within the cyclone chamber between the cyclone air outlet and the second end of the cyclone chamber and the cleaning member travels along at least a portion of an axial length of the vertically extending member as the cleaning member travels to the second end of the cyclone chamber.

22. The vacuum cleaner of claim 14 wherein the emptying handle assembly is reconfigurable between an emptying configuration and a storage configuration in which the handle is recessed towards the cyclone.

23. A vacuum cleaner having an air flow path from a dirty air inlet to a clean air outlet with a cyclone positioned in the air flow path, the cyclone comprising:

(a) a cyclone chamber having a cyclone axis of rotation, an axial length, a first end, an axially spaced apart second end, a cyclone sidewall extending between first and second axially spaced apart end walls, a cyclone air inlet, a cyclone air outlet provided at the first end of the cyclone chamber and comprising a porous member;

(b) a cleaning member positioned in an annular region that is located between an inner surface of the cyclone sidewall and an outer surface of the porous member, the cleaning member is moveably mounted in the cyclone chamber and axially translatable in the annular region along an axial length of the porous member towards the second end of the cyclone chamber;

(c) an emptying handle assembly drivingly connected to the cleaning member, the emptying handle assembly comprising a handle positioned exterior to the cyclone chamber and a portion of the emptying handle that is drivingly connected to the cleaning member extends inwardly to the cleaning member; and, (d) at least one vertically extending member axially positioned within the cyclone chamber between the cyclone air outlet and the second end of the cyclone chamber and the cleaning member travels along at least a portion of an axial length of the vertically extending member as the cleaning member travels towards the second end of the cyclone chamber.

* * * * *